United States Patent
Bastoul et al.

(10) Patent No.: US 8,930,926 B2
(45) Date of Patent: Jan. 6, 2015

(54) SYSTEM, METHODS AND APPARATUS FOR PROGRAM OPTIMIZATION FOR MULTI-THREADED PROCESSOR ARCHITECTURES

(75) Inventors: Cedric Bastoul, Voisins-le-Bretonneux (FR); Richard A. Lethin, New York, NY (US); Allen K. Leung, New York, NY (US); Benoit J. Meister, New York, NY (US); Peter Szilagyi, Medina, NY (US); Nicolas T. Vasilache, New York, NY (US); David E. Wohlford, Portland, OR (US)

(73) Assignee: Reservoir Labs, Inc., New York, NY (US)

( * ) Notice: Subject to any disclaimer, the term of this patent is extended or adjusted under 35 U.S.C. 154(b) by 1255 days.

(21) Appl. No.: 12/762,281

(22) Filed: Apr. 16, 2010

(65) Prior Publication Data

US 2010/0218196 A1 Aug. 26, 2010

Related U.S. Application Data

(63) Continuation-in-part of application No. 12/365,780, filed on Feb. 4, 2009, and a continuation-in-part of application No. 12/561,152, filed on Sep. 16, 2009, now Pat. No. 8,572,590.

(60) Provisional application No. 61/170,261, filed on Apr. 17, 2009, provisional application No. 61/065,294, filed on Feb. 8, 2008, provisional application No. 61/097,799, filed on Sep. 17, 2008.

(51) Int. Cl.
*G06F 9/45* (2006.01)

(52) U.S. Cl.
USPC ........... 717/151; 717/119; 717/149; 717/150; 717/161

(58) Field of Classification Search
USPC .............. 717/119, 149–151, 160; 712/1–300; 718/1–108; 709/201–253; 710/1–269; 711/1–221
See application file for complete search history.

(56) References Cited

U.S. PATENT DOCUMENTS 5,442,699 A   8/1995 Arnold et al.
5,442,797 A * 8/1995 Casavant et al. .............. 717/149

(Continued)

OTHER PUBLICATIONS

NPL Xavier Vera, Mälardalens Högskola and Jaume Abella, Josep Llosa, and Antonio Gonzalez—An Accurate Cost Model for Guiding Data Locality Transformations—Politecnica de Catalunya-Barcelona University—Sep. 2005.*

(Continued)

*Primary Examiner* — Lewis A Bullock, Jr.
*Assistant Examiner* — Francisco Aponte
(74) *Attorney, Agent, or Firm* — Goodwin Procter LLP

(57) ABSTRACT

Methods, apparatus and computer software product for source code optimization are provided. In an exemplary embodiment, a first custom computing apparatus is used to optimize the execution of source code on a second computing apparatus. In this embodiment, the first custom computing apparatus contains a memory, a storage medium and at least one processor with at least one multi-stage execution unit. The second computing apparatus contains at least two multi-stage execution units that allow for parallel execution of tasks. The first custom computing apparatus optimizes the code for parallelism, locality of operations and contiguity of memory accesses on the second computing apparatus. This Abstract is provided for the sole purpose of complying with the Abstract requirement rules. This Abstract is submitted with the explicit understanding that it will not be used to interpret or to limit the scope or the meaning of the claims.

54 Claims, 34 Drawing Sheets

(56) References Cited

U.S. PATENT DOCUMENTS

| | | | |
|---|---|---|---|
| 5,613,136 A * | 3/1997 | Casavant et al. | 712/28 |
| 5,742,814 A * | 4/1998 | Balasa et al. | 1/1 |
| 5,920,854 A | 7/1999 | Kirsch et al. | |
| 5,953,531 A * | 9/1999 | Megiddo et al. | 717/160 |
| 6,006,033 A * | 12/1999 | Heisch | 717/158 |
| 6,018,735 A | 1/2000 | Hunter | |
| 6,038,398 A | 3/2000 | Schooler | |
| 6,131,092 A | 10/2000 | Masand | |
| 6,279,113 B1 | 8/2001 | Vaidya | |
| 6,327,699 B1 * | 12/2001 | Larus et al. | 717/128 |
| 6,338,057 B1 | 1/2002 | Weeks | |
| 6,651,246 B1 * | 11/2003 | Archambault et al. | 717/160 |
| 6,754,650 B2 | 6/2004 | Cho et al. | |
| 6,772,415 B1 | 8/2004 | Danckaert et al. | |
| 6,785,677 B1 | 8/2004 | Fritchman | |
| 6,792,546 B1 | 9/2004 | Shanklin et al. | |
| 6,880,087 B1 | 4/2005 | Carter | |
| 6,912,526 B2 | 6/2005 | Akaboshi | |
| 6,952,694 B2 | 10/2005 | Mathur et al. | |
| 6,952,821 B2 * | 10/2005 | Schreiber | 717/151 |
| 7,086,038 B2 * | 8/2006 | Cronquist et al. | 717/136 |
| 7,185,327 B2 | 2/2007 | Scales | |
| 7,225,188 B1 | 5/2007 | Gai et al. | |
| 7,260,558 B1 | 8/2007 | Cheng et al. | |
| 7,594,260 B2 | 9/2009 | Porras et al. | |
| 7,634,566 B2 * | 12/2009 | Turner et al. | 709/226 |
| 7,757,222 B2 * | 7/2010 | Liao et al. | 717/140 |
| 8,087,010 B2 * | 12/2011 | Eichenberger et al. | 717/150 |
| 8,108,845 B2 * | 1/2012 | Little et al. | 717/149 |
| 8,230,408 B2 | 7/2012 | Eng | |
| 8,250,550 B2 * | 8/2012 | Luszczek et al. | 717/149 |
| 8,255,890 B2 * | 8/2012 | Luszczek et al. | 717/149 |
| 8,307,347 B2 | 11/2012 | Austin et al. | |
| 2002/0021838 A1 | 2/2002 | Richardson et al. | |
| 2003/0097652 A1 * | 5/2003 | Roediger et al. | 717/160 |
| 2004/0034754 A1 * | 2/2004 | Schreiber | 711/165 |
| 2004/0068501 A1 | 4/2004 | McGoveran | |
| 2005/0114700 A1 | 5/2005 | Barrie et al. | |
| 2006/0048121 A1 * | 3/2006 | Blainey et al. | 717/160 |
| 2006/0048123 A1 * | 3/2006 | Martin | 717/160 |
| 2006/0085858 A1 | 4/2006 | Noel et al. | |
| 2007/0033367 A1 | 2/2007 | Sakarda et al. | |
| 2007/0074195 A1 | 3/2007 | Liao et al. | |
| 2007/0192861 A1 | 8/2007 | Varghese et al. | |
| 2008/0010680 A1 | 1/2008 | Cao et al. | |
| 2009/0037889 A1 | 2/2009 | Li et al. | |
| 2009/0083724 A1 * | 3/2009 | Eichenberger et al. | 717/160 |
| 2009/0119677 A1 * | 5/2009 | Stefansson et al. | 719/313 |
| 2009/0259997 A1 * | 10/2009 | Grover et al. | 717/136 |
| 2009/0307673 A1 * | 12/2009 | Eichenberger et al. | 717/160 |
| 2010/0050164 A1 * | 2/2010 | Van De Waerdt et al. | 717/159 |
| 2010/0162225 A1 | 6/2010 | Huang et al. | |

OTHER PUBLICATIONS

An Accurate Cost Model for Guiding Data Locality Transformations Xavier Vera MäLardalens Högskola and Jaume Abella, Josep Llosa, and Antonio González Universitat Politècnica de Catalunya-Barcelona ACM Transactions on Programming Languages and Systems, vol. 27, No. 5, Sep. 2005.*

Impact of Memory Hierarchy on Program Partitioning and Scheduling—Wesley K. Kaplowt William A. Maniatty, and Boleslaw K. Szymanski Department of Computer Science Rensselaer Polytechnic Institute, Troy, N.Y.—Proceedings of the 28th Annual Hawaii International Conference on System Sciences—1995.*

Semi-Automatic Composition of Loop Transformations for Deep Parallelism and Memory Hierarchies—Sylvain Girbal, Nicolas Vasilache, Cédric Bastoul, Albert Cohen, David Parello, Marc Sigler, and Olivier Temam—International Journal of Parallel Programming, vol. 34, No. 3, Jun. 2006.*

Bondhugula et al, Toward Effective Automatic Parallelization for Multi\par core Systems, In proceeding of 22nd IEEE International Symposium on Parallell and Distributed Processing, (IPDPS 2008), Miami, Florida USA, Apr. 14, 2008.

International Search Report and the Written Opinion dated Nov. 26, 2010 for PCT Application No. PCT/US2010/031524.

International Search Report and Written Opiniion dated Dec. 1, 2010 for PCT/US2010/033049.

International Report on Patentability dated Mar. 31, 2011 for PCT Application No. PCT/US2009/057194.

International Preliminary Report on Patentability dated Jan. 6, 2009 for PCT Application No. PCT/US2007/72260.

International Preliminary Report on Patentability dated Nov. 1, 2011 for PCT Application No. PCT/US2010/033049.

Jonsson et al., "Verifying Safety Properties of a Class of Infinite-State Distributed Algorithms", Lecture Notes in Computer Science, 1995, vol. 939, pp. 42-53.

Mahajan et al., "Zchaff2004: An Efficient SAT Solver", LNCS, 2005, pp. 360-375.

Ahmed et al, Synthesizing Transformations for Locality Enhancement of Imperfectly-nested Loops Nests, ACM ICS 2000, pp. 141-152.

Ahmed et al, Tiling Imperfectly-nested Loop Nests, IEEE 2000, 14 pgs.

Aho et al, Compilers: Principles, Techniques, & Tools, 2nd Edition, 2006, pp. 173-186.

Aho et al, Efficient String Matching: An Aid to Bibliographic Search, Communications of the ACM, vol. 18, No. 6, Jun. 1975, pp. 333-340.

Aigner et al, An Overview of the SUIF2 Compiler Infrastructure, Computer Systems Laboratory, Standford University, 1999, pp. 1-14.

Aldwairi et al, Configurable String Matching Hardware for Speeding Up Intrusion Detection, ACM SIGARCH Computer Architecture News, Vo. 33, No. 1, Mar. 2005, pp. 99-107.

Allen et al, Conversion of Control Dependence to Data Dependence, ACM 1983, pp. 177-189.

Ancourt et al, Scanning Polyhedra with DO Loops, Proceedings of the third ACM SIGPLAN symposium on Principles and practice of parallel programming, Apr. 21-24, 12 pgs. 1991.

Appel, A.W., Deobfuscation is in NP, Princeton University, Aug. 21, 2002, 2 pgs.

Ayers et al, Aggressive Inlining, PLDI '92 Las Vegas, NV, USA.

Ball et al, Branch Prediction for Free, Technical Report #1137, University of Wisconsin, 1993, 29 pgs.

Barak et al, On the (Im)possibility of Obfuscating Programs, Advances in Cryptology, CRYPTO 2001, vol. 2139, pp. 1-18.

Barthou et al, Maximal Static Expansion, International Journal of Parallel Programming, vol. 28, No. 3, 2000, 20 pgs.

Bastoul et al, Putting Polyhedral Loop Transformations to Work, INRIA, No. 4902, Jul. 2003.

Bastoul, C., Generating Loops for Scanning Polyhedra: CLooG User's Guide, First Version, Rev. 1.6, Apr. 8, 2004, pp. 1-30.

Bastoul, Code Generation in the Polyhedral Model Is Easier Than You Think, Proceedings of the 13th International Conference on Parallel Architecture and Compilation Techniques, 2004.

Bastoul, Efficient Code Generation for Automatic Parallelization and Optimization, Proceedings of the Second International Symposium on Parallel and Distributed Computing, 2003.

Bednara et al, Synthesis for FPGA Implementations From Loop Algorithms, In Proceedings of the Int. Conf. on Engineering of Reconfigurable Systems and Algorithms (ERSA), Jun. 2001.

Berkelaar et al, The lpSolve Package, Sep. 21, 2007, pp. 1-9.

Bik et al, Implementation of Fourier-Motzkin Elimination, Technical Report 94-42, Department. of Computer Science, Leiden University, 1994.

Bondhugula et al, A Practical Automatic Polyhedral Parallelizer and Locality Optimizer, PDLI '08, Jun. 7-13, 2008.

Bondhugula et al, Automatic Mapping of Nested Loops to FPGAs, OSU, Mar. 19, 2007.

Boulet et al, (Pen)-ultimate tiling?, Laboratoire de l'Informatique du Parallelisme, Research Report No. 93-96, Nov. 1993, pp. 1-17.

Boulet et al, Scanning polyhedra without Do-loops, Parallel Architectures and Compilation Techniques, 1998, Proceedings 1998 International Conference on Oct. 12-18, 1998, pp. 4-11.

Briggs et al, Effective Partial Redundancy Elimination, Sigplan PLDI, Jun. 1994, pp. 1-12.

(56) References Cited

OTHER PUBLICATIONS

Brumley et al, Towards Automatic Generation of Vulnerability-Based Signatures, Proceedings of the 2006 IEEE Symposium on Security and Privacy, pp. 1-15.
Burger et al, Scaling to the End of the Silicon with EDGE Architectures, Computer, Jul. 2004, pp. 44-55.
Burke et al, Flow-Insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.
Cifuentes, C., A Structuring Algorithm for Decompilation, XIX Conferencia Latinoamericana de Inforamatica, Buenos Aires, Argentina, Aug. 2-6, 1993, pp. 267-276.
Cifuentes,Structuring Decompiled Graphs, Department of Computer Science, University of Tasmania, 1994, 15 pgs.
Clauss et al, Automatic Memory Layout Transformations to Optimize Spatial Locality in Parameterized Loop Nests, ACM SIGARCH Computer Architecture News, vol. 28, No. 1, 2000, pp. 1-9.
Clauss et al, Deriving Formulae to Count Solutions to Parameterized Linear Systems using Ehrhart Polynomials: Applications to the Analysis of Nested-Loop Programs, Apr. 10, 1997.
Clearspeed—Accelerator Technology Primer, ClearSpeed Technology Primer, ClearSpeed Technology, Inc., 2006.
Clearspeed—ClearSpeed Programming Model: An introduction, ClearSpeed Technology Inc. 2007.
Clearspeed—ClearSpeed Programming Model: Card-side Libraries, ClearSpeed Technology Inc. 2007.
Clearspeed—ClearSpeed Programming Model: Optimizing Performance, ClearSpeed Technology Inc. 2007.
Clearspeed—CSX Processor Architecture Whitepaper, ClearSpeed Technology Plc., 2006.
Clearspeed—Introduction to ClearSpeed Acceleration, ClearSpeed Technology Inc., 2007, 27 pages.
Clearspeed—Introduction to ClearSpeed Acceleration, Powerpoint presentation, ClearSpeed Technology Plc, 2007, 133 pgs.
Clearspeed—Overview of Architecture: System Level (host) Architecture and ClearSpeed Architecture, ClearSpeed Technology Inc., 2007.
Clearspeed Introductory Programming Manual—The ClearSpeed Software Development Kit, ClearSpeed Technology Inc. 2007.
Clearspeed Programming Model: Case Study, ClearSpeed Technology Inc., 2007.
Clearspeed Technical Training: Software Development, ClearSpeed Technology Inc., 2007.
Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Automatic Generation of Data Parallel Code, Proceedings of the Fourth International Workshop on Compilers for Parallel Computers, Dec. 1993.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/-Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.
Cytron et al, Efficiently Computing Static Single Assignment Form and The Control Dependence Graph, Mar. 7, 1991, pp. 1-52.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM CASES'03, pp. 298-308, 2003.
Darte et al, Lattice-Based Memory Allocation, IEEE Transactions on Computers, vol. 54, No. 10, Oct. 2005, pp. 1242-1257.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.
Ezick et al, Alef: A SAT Solver for MPI-Connected Clusters, Technical Report, Aug. 13, 2008, 21 pgs.
Featurier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feautrier, Dataflow Analysis of Array and Scalar References, Laboratoire MASI, Universite P. et M. Curie, Sep. 1991.
Feautrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Griebl et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Gu et al, Symbolic Array Dataflow Analysis for Array Privatization and Program Parallelization, Proceedings of Supercomputing '95, pp. 1-19, 1995.
Gustafson et al, ClearSpeed—Whitepaper: Accelerating the Intel® Math Kernel Library, ClearSpeed Technology Inc., 2006.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Search Report and the Written Opinion dated Mar. 18, 2010 for PCT Application No. PCT/US2009/057194.
International Search Report and the Written Opinion of the International Searching Authority dated Jan. 17, 2008 for PCT Application No. PCT/US2007/72260.
Irigoin et al, Supernode Partitioning, Proceedings of the 15th Annual ACM SIGACT-SIGPLAN Symposium on Principles of Programming Languages, San Diego, CA, Jan. 1988.
Jimenez et al, Register Tiling in Nonrectangular Iteration Spaces, ACM Transactions on Programming Languages and Systems, vol. 24, No. 4, pp. 409-453, Jul. 2002.

(56) References Cited

OTHER PUBLICATIONS

Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.
Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Le Verge, H., A Note on Chernikova's Algorithm, Research Report, Jul. 27, 1994, pp. 1-25.
Lengauer et al, A Fast Algorithm for Finding Dominators in a Flowgraph, ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyheadral Mapper, XPCA Review, Feb. 6, 2007.
Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, 24th Annual ACM SIGPLAN-SIGACT Symposium on Principles of Programming Languages, Paris, France, Jan. 1997.
Loechner et al, Precise Data Locality Optimization of Nested Loops, The Journal of Supercomputing, 21, pp. 37-76, 2002.
Maydan et al, Array Data-Flow Analysis and its Use in Array Privatization, ACM-20th PoPL-1, 1993, pp. 2-15.
McWhirter et al, Normalised Givens Rotations for Recursive Least Squares Processing, VLSI Signal Processing, VIII, 1995, IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Meister et al, Static Software Tools to Optimize BMD Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operations, Publication Interne No. 1330, IRISA, Publication No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.

Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quinton et al, On Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.
Sankaralingam et al, Distributed Microarchitectural Protocols in the TRIPS Prototype Processor, International Symposium on Microarchitecture, Proceedings of the 39th Annual IEEE/ACM International symposium on Microarchitecture, 2006, 12 pgs.
Schreiber et al, Near-Optimal Allocation of Local Memory Arrays, HP Laboratories Palo Alto, HPL-2004-24, Feb. 17, 2004.
Schwartz et al, VSIPL 1.1 API, 2002, pp. 1-739.
Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM CASES'06, 2006, pp. 74-82.
Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
Springer et al, An Architecture for Software Obfuscation—Final Technical Report for Phase 1 SBIR, Jul. 30, 2007.
Springer et al, An Architecture for Software Obfuscation, PowerPoint presentation, 2007.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003. Springer-Verlag, 15 pgs.
Tu et al, Automatic Array Privatization, Lecture Notes in Computer Science, vol. 1808, 2001, 22 pgs.
Tu, P., Thesis, Automatic Array Privatization and Demand-Driven Symbolic Analysis, University of Illinois, 1995, pp. 1-144.
Udupa et al, Deobfuscation—Reverse Engineering Obfuscated Code, Proceedings of the 12th Working Conference on Reverse Engineering (WCRE'05), 10 pgs. 2005.
Vangal et al, An 80-Tile 1.28TFLOPS Network-on-Chip in 65Nm CMOS, ISSCC 2007, Session 5, Microprocessors/5.2, 3 pgs.
Vasilache et al, Polyhedral Code Generation in the Real World, Compiler Construction, vol. 3923, 2006, 15 pgs.
Vasilache, Scalable Program Optimization Techniques in the Polyhedral Model, Thesis, Universite de Paris-SUD, UFR Scientifique d'orsay Inria Futures, Sep. 28, 2007.
Verdoolaege et al, Counting Integer Points in Parametric Polytopes using Barvinkok's Rational Functions, Algorithmica, 2007, pp. 1-33.
Wang, C., Dissertation—A Security Architecture for Survivability Mechanisms, University of Virginia, 2000, pp. 1-209.
Wegman et al, Constant Propagation with Conditional Branches, ACM Transactions on Programming Languages and Systems, vol. 13, No. 2, Apr. 1991, pp. 181-210.

(56) References Cited

OTHER PUBLICATIONS

Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.

Whaley et al, An Efficient Inclusion-Based Points-To Analysis for Strictly-Typed Languages, Lecture Notes in Computer Science, vol. 2477, 2002, 16 pgs.

Wilde, D. K., A Library for Doing Polyhedral Operations, IRISA, Publication No. 785, 1993, pp. 1-48.

Wolf et al, A Data Locality Optimizing Algorithm, Proceedings of the ACM SIGPLAN '91 Conference on Programming Language Design and Implementation, Jun. 26-28, 1991, pp. 30-44.

Wu et al, Static Branch Frequency and Program Profile Analysis, 27th IEEE/ACM International Symposium on Microarchitecture (MICRO-27), 1994, 11 pgs.

Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.

International Preliminary Report on Patentability dated Oct. 27, 2011 for PCT Application No. PCT/US2010/031524.

Aloul et al, Solution and Optimization of Systems of Pseudo-Boolean Consraints, IEEE Transactions on Computers, vol. 56, No. 1 0, Oct. 2007, pp. 1415-1424.

Chang et al, Parallel sparse supports for array intrinsic functions of Fortran 90, J. Supercomput, 18(3):305-339, (2001).

Davis, Direct Methods for Sparse Linear Systems. SIAM, 2006 (100 pgs.).

Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.

Gustavson, Two Fast Algorithms for Sparse Matrices: Multiplication and Permuted Transposition, ACM Transactions on Mathematical Software, 4(3): 250-269, 1978.

Kolda et al, Scalable Tensor Decompositions for Multiaspect Data Mining, in ICDM 2008: Proceedings of the 8th IEEE International Conference on Data Mining, Dec. 2008, pp. 363-372.

Lathauwer et al, On the Best Rank-1 and Rank-$(R_1,R_2,\ldots,R_N)$ Approximation of Higher-Order Tensors, SIAM J. Matrix Anal. Appl., 21:1324-1342, Mar. 2000.

Lin et al, Efficient data compression methods for multidimensional sparse array operations based on the EKMR scheme, IEEE Trans, Comput., 52(12):1640-1646, 2003.

Lin et al, Efficient Representation Scheme for Multidimensional Array Operations, IEEE Transactions on Computers, 51:327-345, 2002.

Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.

\* cited by examiner

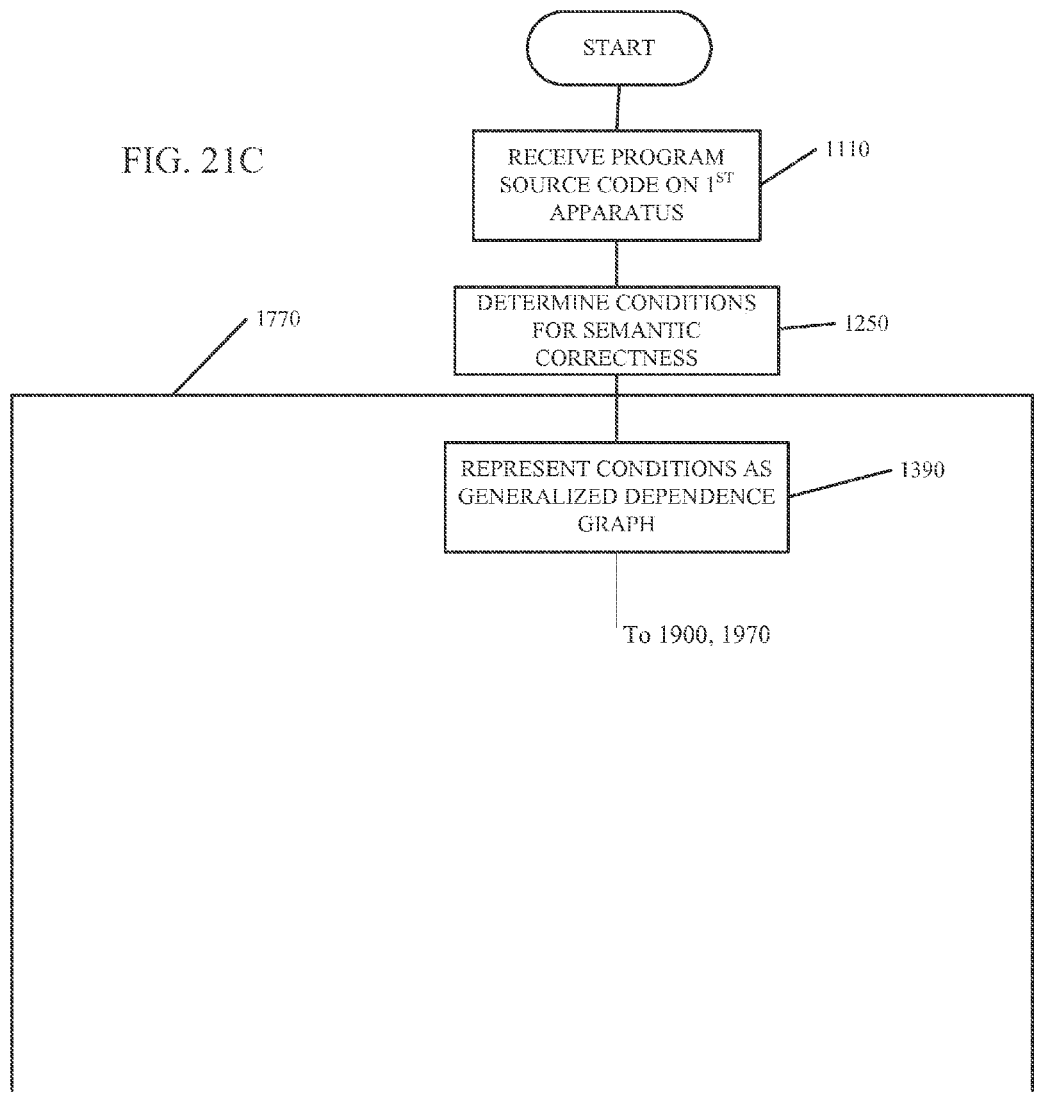

SYSTEM, METHODS AND APPARATUS FOR PROGRAM OPTIMIZATION FOR MULTI-THREADED PROCESSOR ARCHITECTURES

CROSS REFERENCE TO RELATED APPLICATIONS

This application is a continuation-in-part of U.S. application Ser. No. 12/365,780 entitled "METHODS AND APPARATUS FOR LOCAL MEMORY COMPACTION", filed Feb. 4, 2009, which claims priority to U.S. Provisional Application Ser. No. 61/065,294 filed, Feb. 8, 2008. Additionally, this application is a Continuation-in-part of U.S. application Ser. No. 12/561,152 entitled "METHODS AND APPARATUS FOR JOINT PARALLELISM AND LOCALITY OPTIMIZATION IN SOURCE CODE COMPILATION" filed, Sep. 16, 2009, which claims priority to U.S. Provisional Application Ser. No. 61/097,799 filed, Sep. 17, 2008. Further, this application is related to and claims the benefit of priority to U.S. Provisional Application Ser. No. 61/170,261 entitled "AUTOMATIC CUDA MAPPING IN THE R-STREAM COMPILER", filed Apr. 17, 2009. Priority is claimed to each of the above applications which are incorporated by reference herein in their entirety.

GOVERNMENT INTEREST

This invention was made with Government support under contract no. DE-FG02-08ER85149 awarded by the Department of Energy, contract no. F30602-03-C-0033 and W31P4Q-07-C-0147 awarded by the .Defense Advanced Research Projects Agency, contract no. W9113M-07-C-0072 and W9113M-08-C-0146 awarded by the Missile Defense Agency, and contract no. FA8650-07-M-8129 awarded by the Office of the Secretary of Defense. The Government has certain rights in the invention.

FIELD OF THE INVENTION

The present invention generally concerns computer programming. More particularly, the invention concerns a system, methods, and apparatus for source code compilation.

BACKGROUND OF THE INVENTION

The progression of the computer industry in recent years has illustrated the need for more complex processor architectures capable of processing large volumes of data and executing increasingly complex software. A number of systems resort to multiple processing cores on a single processor. Other systems include multiple processors in a single computing device. Additionally, many of these systems utilize multiple threads of execution per processing core. One limitation that these architectures experience is that the current commercially available compilers cannot efficiently take advantage of the increase of computational resources.

In the software design and implementation process, compilers are responsible for translating the abstract operational semantics of the source program into a form that makes efficient use of a highly complex heterogeneous machine. Multiple architectural phenomena occur and interact simultaneously; this requires the optimizer to combine multiple program transformations. For instance, there is often a tradeoff between exploiting parallelism and exploiting locality to reduce the ever widening disparity between memory bandwidth and the frequency of processors: the memory wall. Indeed, the speed and bandwidth of the memory subsystems have always been a bottleneck, which worsens when going to multi-core. This memory wall is further exacerbated by non-contiguous memory accesses.

On many architectures, the order in which memory locations are read and written has a profound effect on how they are issued in hardware. Bad memory access patterns may result in multiple factors of loss of memory bandwidth. Since optimization problems are associated with huge and unstructured search spaces, the combinational task of optimizing a program balancing these hardware requirements is poorly achieved by current compilers, resulting in weak scalability and disappointing sustained performance.

Even when programming models are explicitly parallel (threads, data parallelism, vectors), they usually rely on advanced compiler technology to relieve the programmer from scheduling and mapping the application to computational cores, understanding the memory model and communication details. Even provided with enough static information or annotations (OpenMP directives, pointer aliasing, separate compilation assumptions), compilers have a hard time exploring the huge and unstructured search space associated with these mapping and optimization challenges. Indeed, the task of the compiler can hardly been called optimization anymore, in the traditional meaning of reducing the performance penalty entailed by the level of abstraction of a higher-level language. Together with the run-time system (whether implemented in software or hardware), the compiler is responsible for most of the combinatorial code generation decisions to map the simplified and ideal operational semantics of the source program to the highly complex and heterogeneous machine.

Current trends in computer architecture amplify the utilization of multiple processor cores on a chip. Modern multiple-core computer architectures that include general purpose multi-core architectures and specialized parallel architectures such as the Cell Broadband Engine and Graphics Processing Units (GPUs) have very high computation power per chip. Current and future architectures are increasingly evolving towards heterogeneous mixes of general purpose and specialized parallel architectures. One architectural concept of particular interest is the massively multi-threaded execution model. In this model, a large number of virtual threads of execution are mapped to a multiplicity of physical execution units. These virtual threads can be quickly switched in and out of the execution unit by the hardware runtime. In particular, when a long latency memory access is requested, another thread is scheduled to hide the latency of the memory access. Such an execution model comes with the need for the application to exhibit enough parallelism. Increased parallelism may be obtained by explicitly writing programs with more parallelism or by using auto-parallelizing compilers.

While programming such systems by hand has been demonstrated for a range of applications, this is a difficult and costly endeavor; likely one to be revisited to allow the application to port to rapidly arriving new generations and configurations of heterogeneous architectures and programming abstractions that change the optimization tradeoffs. Recent programming models and abstractions include but are not limited to Partitioned Global Address Space (PGAS), Compute Unified Device Architecture (CUDA) and Open Computing Language (OpenCL). The application developer is also confronted to a programmability wall in addition to the memory wall and is responsible for writing a correct parallel application using one of these recent programming abstractions. Obtaining reasonable performance is an additional difficult task best left to a compiler.

The polyhedral model is a powerful framework to unify coarse grained and fine-grained parallelism extraction with locality and communication contiguity optimizations. To date, this promise has not yet been completely fulfilled as no existing affine scheduling, fusion and communication contiguity technique can perform all these optimizations in a unified (i.e., non-phase ordered) and unbiased manner. Typically, parallelism optimization algorithms optimize for degrees of parallelism, but cannot be used to optimize both locality and contiguity of communications. In like manner, algorithms used for locality optimization cannot be used both for extracting parallelism and optimizing the contiguity of communications. Additional difficulties arise when optimizing source code for the particular architecture of a target computing apparatus.

Therefore there exists a need for improved source code optimization methods and apparatus that can optimize parallelism, locality and contiguity of memory accesses at multiple level of the heterogeneous hardware hierarchy.

SUMMARY OF THE INVENTION

The present invention provides a system, apparatus and methods for overcoming some of the difficulties presented above. Various embodiments of the present invention provide a method, apparatus, and computer software product for optimization of a computer program on a first computing apparatus for execution on a second computing apparatus.

In an exemplary provided method computer program source code is received into a memory on a first computing apparatus. In this embodiment, the first computing apparatus' processor contains at least one multi-stage execution unit. The source code contains at least one arbitrary loop nest. The provided method produces program code that is optimized for execution on a second computing apparatus. In this method the second computing apparatus contains at least two multi-stage execution units. With these units there is an opportunity for parallel operations. In its optimization of the code, the first computing apparatus takes into account the opportunity for parallel operations and locality and analyses the tradeoff of execution costs between parallel execution and serial execution on the second computing apparatus. In this embodiment, the first computing apparatus minimizes the total costs and produces code that is optimized for execution on the second computing apparatus.

In another embodiment, a custom computing apparatus is provided. In this embodiment, the custom computing apparatus contains a storage medium, such as a hard disk or solid state drive, a memory, such as a Random Access Memory (RAM), and at least one processor. In this embodiment, the at least one processor contains at least one multi-stage execution unit. In this embodiment, the storage medium is customized to contain a set of processor executable instructions that, when executed by the at least one processor, configure the custom computing apparatus to optimize source code for execution on a second computing apparatus. The second computing apparatus, in this embodiment, is configured with at least two multi-stage execution units. This configuration allows the execution of some tasks in parallel, across the at least two execution units and others in serial on a single execution unit. In the optimization process the at least one processor takes into account the tradeoff between the cost of parallel operations on the second computing apparatus and the cost of serial operations on a single multi-stage execution unit in the second computing apparatus.

In a still further embodiment of the present invention a computer software product is provided. The computer software product contains a computer readable medium, such as a CDROM or DVD medium. The computer readable medium contains a set of processor executable instructions, that when executed by a multi-stage processor within a first computing apparatus configure the first computing apparatus to optimize computer program source code for execution on a second computing apparatus. Like in the above described embodiments, the second computing apparatus contains at least two execution units. With at least two execution units there is an opportunity for parallel operations. The configuration of the first computing apparatus includes a configuration to receive computer source code in a memory on the first computing apparatus and to optimize the costs of parallel execution and serial execution of tasks within the program, when executed on the second computing apparatus. The configuration minimizes these execution costs and produces program code that is optimized for execution on the second computing apparatus.

BRIEF DESCRIPTION OF THE DRAWINGS

Various embodiments of the present invention taught herein are illustrated by way of example, and not by way of limitation, in the figures of the accompanying drawings, in which:

FIGS. 21A-D illustrate an embodiment of a provided method; and

Figure 1:
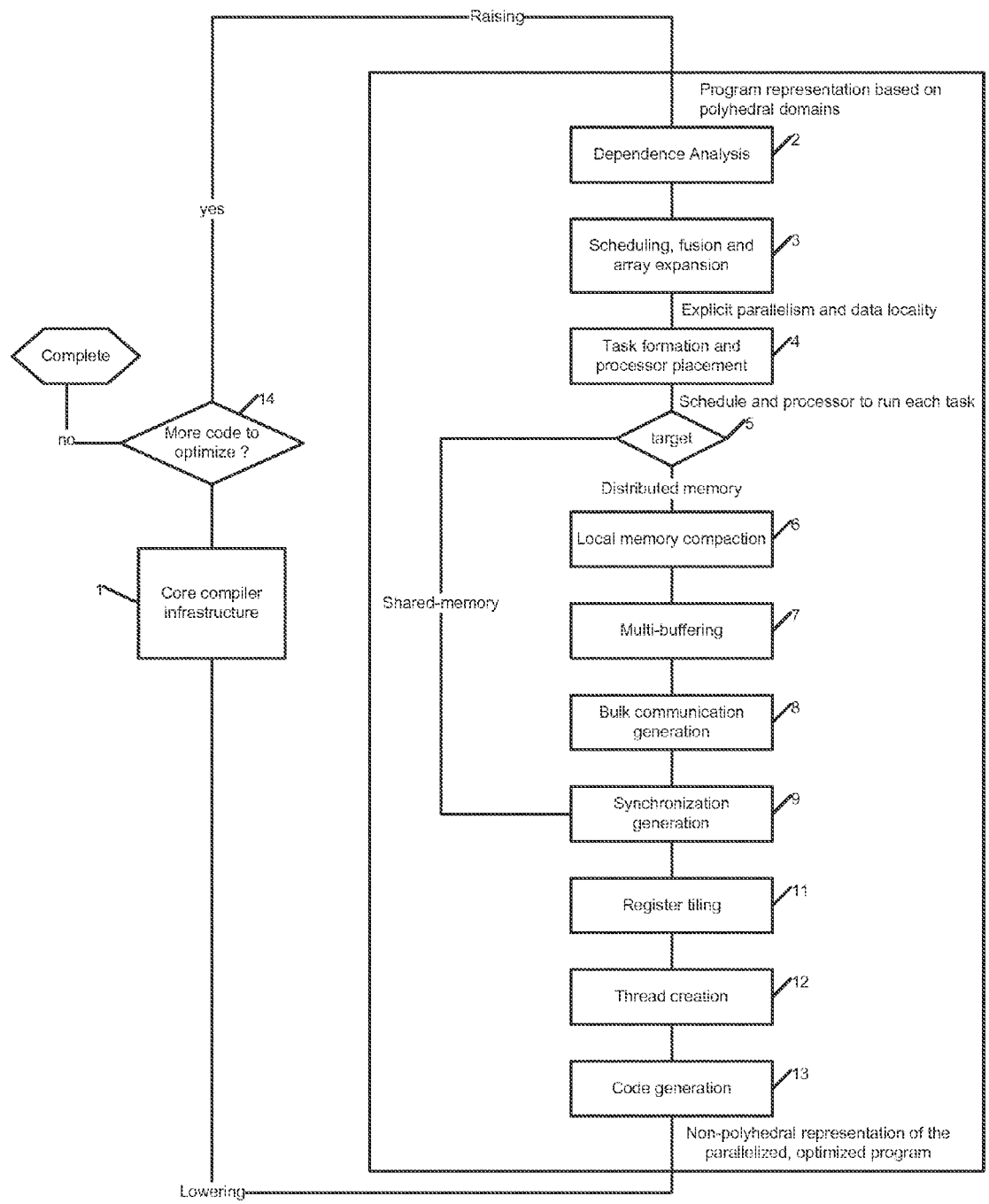
FIG. 1 is an overview of an exemplary compiler architecture consistent with provided embodiments.

It will be recognized that some or all of the figures are schematic representations for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The trend of increasing the frequency at which processors perform computations seems to have come to an end. Power consumption and control complexity have reached such high levels that manufacturers are backing out of this design path. Current machines have evolved to multiprocessor architectures on a chip with increasingly many cores per chip and multiple threads per core. This trend is expected to dramatically increase, reaching thousands of cores per chip in the next few years. Thus, modern computers increasingly need to exploit parallelism at different levels to provide sustained performance. On the other hand, parallel programming techniques have not evolved at the same speed and the gap between theoretical machine speed and actual utilization continues to increase.

Compilers are responsible for translating the abstract operational semantics of the source program, i.e., a text description of what the program's execution is supposed to perform, into an executable form that makes efficient use of a highly complex heterogeneous machine. Multiple architectural phenomena occur and interact simultaneously within the targeted computer during the execution of the program; this requires the optimizing compiler to combine multiple program transformations in order to define a program execution that takes advantage of those architectural phenomena. For instance, when targeting computers that have multiple processing elements (multi-core computers), there is often a trade-off between exploiting more processing elements simultaneously (parallelism) and exploiting data access locality to reduce memory traffic. Indeed, the speed and bandwidth of the memory subsystems are almost always a bottleneck. The problem is typically worse for multi-core computers. Since, in traditional compilers, optimization problems are associated with huge and unstructured search spaces, this combinational task is poorly achieved in general, resulting in poor scalability and disappointing sustained performance of the supposedly optimized program.

Generating efficient code for deep parallelism and deep memory hierarchies with complex and dynamic hardware components is a difficult task: the compiler (and run-time system) has to take the burden of tasks that only expert programmers would be able to carry. In order to exploit parallelism the first necessary step is to compute a representation which models the producer/consumer relationships of a program as closely as possible. The power of an automatic optimizer or parallelizer greatly depends on its capacity to decide whether two portions of the program execution may be interchanged or run in parallel. Such knowledge is related to the task of dependence analysis which aims at precisely disambiguating memory references. The issue is to statically form a compact description of the dynamic properties of a program. Forming a precise description is generally undecidable and approximations have to be made.

Once dependence analysis has been computed, a compiler performs program transformations to the code with respect to different, sometimes conflicting, performance criteria. Any program transformation must ultimately respect the dependence relations in order to guarantee the correct execution of the program. A class of transformations targeting the loop nests of a program (such as "DO" loops in the FORTRAN language, and "for" and "while" loops in languages derived from the C language) are known to account for the most compute intensive parts of many programs. The polyhedral model is a representation of a program's structure particularly suited for expressing complex sequences of loop nests, complex sequences of loop nest transformations, and other relevant information such as for instance dependences, communications, and array layouts.

A polyhedron is defined as a set of points verifying a set of affine inequalities and equalities on a number of variables. There exist alternate but equivalent definitions for polyhedrons, such as the one based on a combination of vertices, rays and lines proposed by Minkowski. There are also alternate representations, often based on the alternate definitions. While the present disclosure teaches using one of those definitions and representations to illustrate the various embodiments, various embodiments are in no way restricted to a particular definition or representation.

A polyhedral domain is defined as a finite union of polyhedrons. One of the main interests in using polyhedral domains is that they provide a precise representation of sets and relations among sets, on which many optimization problems can be phrased and solved using a rich set of algorithms, which are mostly available in the literature. Some embodiments of the sets in question represent loop iterations, mono- and multi-dimensional data sets, sets of processing elements, data transfers, synchronizations, and dependences. Thus, essential characteristics of the execution of a program can be summarized into compact mathematical objects, polyhedrons, which can be manipulated and transcribed into an executable program that has desired execution properties.

By considering a subset of the variables of a polyhedron as symbolic constants, also called "parameters", it is possible to perform program optimizations and parallelization as a function of the symbolic constants. Hence, programs involving loops that depend on a constant value that is not known at the time when compilation is performed, but only when the program is executed, can be modeled using polyhedrons that are defined as a function of those constant values. A polyhedron involving parameters is called a parametric polyhedron. Similarly, a parametric polyhedral domain is defined by a finite union of parametric polyhedrons. For instance, the set of values that the counters of a loop nest reach during the execution of the loop nest is represented by the loop nest's "iteration domain". The iteration domain of the following loop nest (using the C language's syntax, where F is a C function call) can be written as the parametric domain

```
P(n) : {(i, j) ∈ Z² | 5 ≤ i ≤ n;0 ≤ j ≤ 10; j ≤ i} :
for (i=5; i<=n; i++) {
    for (j=0; j<=i && j<=10; j++) {
        F(i,j);
    }
}
```

The set of iterations of such a loop nest depends directly upon the value of the parameters. The parametric domain that represents the set of iterations is called a "parametric iteration domain". It has to be noted that the values of the loop counters are integer. Hence, the set of values of i and j also lie on a regular lattice of integer points (the standard lattice $Z^2$ in the current example). However, it is possible to represent the fact that a set belongs to a polyhedral domain as well as the fact that it also belongs to a regular lattice of points using polyhedral domains exclusively. While alternate, equivalent representations exist (for instance those based on "Z-polyhedrons", which are an explicit intersection of a polyhedral domain and a lattice of integer points), various embodiments of the present invention are in no way restricted to exclusively using polyhedral domains. The use parametric polyhedral domains as a means to illustrate various provided embodiments. In some embodiments, either or both polyhedrons and Z-polyhedrons can be used as a representation, and there exist conversion methods between both representations.

While most of the transformations applied to the polyhedral representation of a program are defined for any element of the polyhedral domain to transform, a class of more complex and precise transformations is obtained by partitioning the vector space in which the polyhedral domain is defined into sub-polyhedrons, and by defining a different transformation for each polyhedron of the partition. The resulting transformation is called a "piecewise" transformation. For example, consider the transformation that takes two numbers i and j and computes three numbers x, y, and z as: {x=2i+1; y=(i+j)/2; z=−3j+4} when i is greater than j and {x=i; y=i−j+3; z=2j} when i is less than or equal to j. It is a piecewise affine function since it has different definitions for each set of values, {i>j} and {i≤j}, which define a partition of the (i,j) vector space.

The context of various embodiments, the use of polyhedral representations to perform complex optimizations on programs, either independently or within a system of optimizing components. An exemplary embodiment of such a system is illustrated in FIG. 1, where it is described as being part of a compiler. Flow of the exemplary embodiment starts in block 1, where the compiler is processing a program. Flow continues in block 14, where the compiler analyzes the program to decide if there are portions of the program that should be optimized and mapped using a polyhedral system. If it is the case, the flow goes to block 2, where the compiler provides the system of optimizing components with a polyhedral representation of a portion of the program to be optimized. If not, the compiler continues to process the program without using the system of optimizing components and completes. The components of the system are in charge of a part of the global optimization of the input program. In the flow of the embodiment illustrated in FIG. 1, the polyhedral representation of the input code is analyzed in block 2 to produce dependence information. Flow continues in block 3 where such information is used in a local memory compaction component or module that modifies array layouts in a way that removes some dependencies, schedules loop iterations in a way that exposes loops that scan independent iterations, and schedules the execution of operations using a same data to be executed within a close time interval. Flow continues in block 4, where the modified polyhedral representation of the program is processed by another optimizing component, which partitions the represented loop operations into entities called tasks, which have good data locality properties (they access a data set that involves an optimized use of the memory subsystem of the target computer), and assigns a processing element of the target machine to each task. In this exemplary embodiment, the flow continues to decision block 5, which decides which block is next in the flow as a function of the target machine. If the target machine requires the execution of explicit communication commands to transfer data to and from its processing elements, flow goes to block 6, where the representation of the program thus modified is then processed by a series of optimizing modules which define a new layout for data that is transferred to a processing element's local memory. Otherwise, the flow goes to block 9. From block 6, flow continues to block 7, where a representation of the explicit communications is produced, based on polyhedrons, and then to block 8, where the execution of the communications are scheduled for parallel execution with the tasks, using multi-buffering. Whether the target machine requires explicit communications or not, the flow continues to block 9, where an optimizing component processes the polyhedral representation of the program obtained from the previous components by inserting a polyhedral representation of synchronization operations, which ensure that the execution of the modified program produces the same results or similar results as the original input program. The flow of the exemplary embodiment then goes to block 11, where an optimizing component partitions the tasks into subtasks whose execution reduces traffic between the processing elements' memories and their registers. Then, in block 12, a polyhedral representation of commands that trigger the execution of a series of tasks on the different processing elements of the target machine and that wait for the completion of those, is generated by the next optimizing component. Finally, in block 13, the polyhedral representation of the optimized program is transformed by polyhedral code generation component into a representation (Abstract Syntax Tree, high-level language code, or a compiler's internal representation) that can be either processed by a compiler or processed further by the user. In the exemplary embodiment, the flow continues back to block 1, where it may cycle again through the whole flow if there is more code to be optimized using the system of optimizing components.

In contrast to compilers based on polyhedral domains, traditional loop-oriented optimizing compilers typically perform syntactic transformations. As a result, many interesting optimizations are often not available, such as fusion of loops with different bounds or imperfectly nested loop tiling.

In some embodiments, the optimizing components or modules comprise processor executable code that when executed by a processor, convert source code into other forms of source code, or in some instances machine code. In other embodiments, various modules may be implemented in hardware such as monolithic circuits, Application Specific Integrated Circuits (ASIC), or Field Programmable Gate Arrays (FPGA). These modules may comprise software, hardware, firmware, or a combination of these implementations. It is important to note that various embodiments are illustrated in specific programming languages, these illustrations are mere examples and the scope is not therefore limited to any particular programming language.

Figure 2:
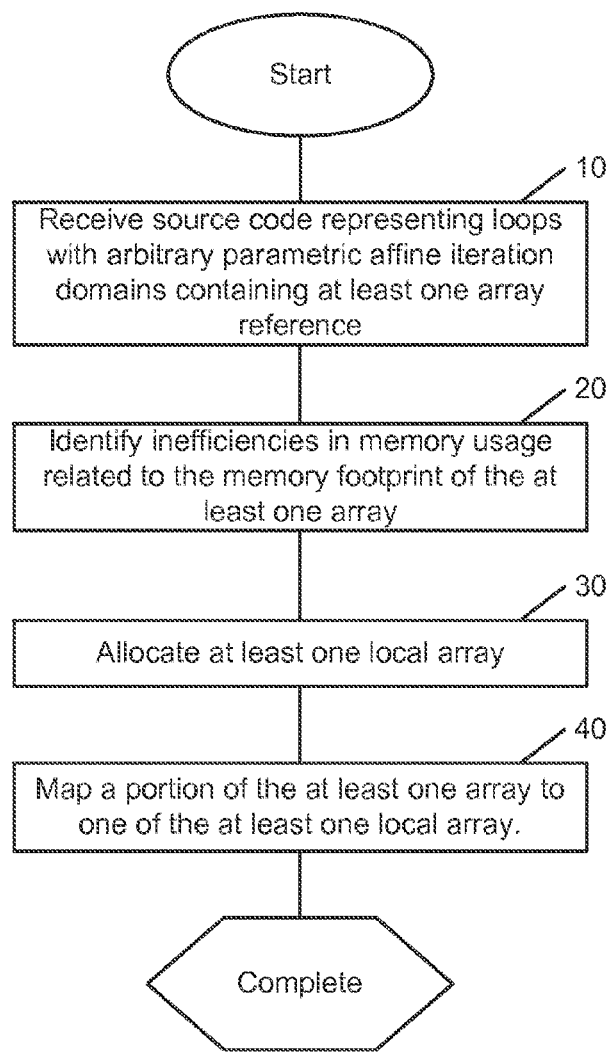
FIG. 2 illustrates the operational flow of one embodiment of a provided local memory compaction module.

Embodiments of a provided optimization module, described above as local memory compaction are illustrated in FIGS. 2-8. FIG. 2 illustrates the flow of a provided method for local memory compaction. Flow begins in block 10 where source code is received into memory. In this embodiment, the source code represents loops with arbitrary parametric affine iteration domain and contains at least one array reference. An array reference is an operation that represents an access, typically a read or a write, to an array. Such a reference represents, either explicitly or implicitly, for instance by using programming language conventions, a function to retrieve the memory address of an element of the array. In loop programs, that function is typically a direct or indirect function of the loop indices and of some loop-constant values. For instance, in C, arrays are typically referenced through mono- and multi-dimensional affine functions of some input values. In the C language, the declaration of an array includes parameters called "array size", which implicitly define the address of an array element as a function of the input values to references to this array declaring "char A[100][200]" allocates an array of 20000 elements (100×200), named A, and defines that for any two integer values x and y, the memory address of the element of A referenced through A[x][y] is b+200x+y, where b is a value called the "base address" of array A. b is constant for each array and is determined at some point in the compilation process. Flow continues to block 20 where inefficiencies in memory usage in the at least one array are identified. In one embodiment, the inefficiencies are related to access and memory footprint of the array. Flow then continues to block 30 where at least one local array is allocated, and in block 40 a portion of the array with inefficient memory usage is mapped into the local array. The mapping portion of the module outputs code that is more efficient than the original code in terms of the memory size requirements of the local array versus the original array. In some embodiments the accessed data is arbitrarily complex. In further embodiments, the mapping produces a piecewise affine index function for the local arrays. Other embodiments include the rendering of a visualization of the optimized code on a monitor.

Arrays are typically allocated sets of contiguous memory blocks. Some loop operations may access only portions of the allocated memory. When reorganizing the data layout for a specific processor, there is an opportunity to take advantage of the inefficiencies in memory access requirements versus the actual utilization of the array. For example, given the following code fragment, 900,000 contiguous memory blocks are allocated, but only 100 are accessed in this operation. Furthermore, access to the array is not contiguous, but contains gaps, and thus will have less than optimal locality. Thus keeping the original data layout (and array size) in a remote processor is extremely inefficient. Moreover, if there are less than 900,000 blocks available in the local memory, the local memory cannot hold the entirety of the array and the program cannot be executed properly. In the provided code fragments, we are using "..." to elude other operations which do not have any specific illustrative purpose.

```
double A[300][300];
for (i=0; i<100; i++) {
    ... = ... A[2*i+100][3*1]; }
```

One embodiment of a provided method, illustrated in FIG. 2, would map this code fragment into a local array with 100 elements. An exemplary mapping would produce the following pseudo-code fragment, in which the storage requirement of a local array is reduced from 300×300 elements to the optimal 100 elements.

```
double A_local[100]; //local memory
transfer A[2*i+100][3*1] to A_local[i], i=0, 1, ... 99;
for (i=0; i<100; i++) {
    ... = ... A_local[i]; }
```

One feature of this embodiment is that it provides a method of compacting local memory in a computing apparatus. This method provides a more efficient memory structure in terms of both access to the elements and the amount of memory occupied by the data that is actually accessed. The memory requirements are reduced from the initial allocation to an allocation that is large enough to contain the data that is actually used in the operations. In contrast to other methods, the provided method handles loops whose iteration domains are non-rectangular, and loops that have a parametric iteration domain. In this document we refer to polyhedral iteration domains that are either non-rectangular or parametric or both as "arbitrary parametric iteration domains". In addition, the provided methods handle non-convex accessed data sets. The provided embodiments are very useful in image and video processing. Imaging applications typically utilize significant multi-dimensional arrays where data representations of physical objects and systems are stored. Many image processing steps, such as discrete wavelet transforms for example, only utilize discrete portions of the stored data. In these situations, various embodiments provide significant optimizations to local data storage.

Figure 3:
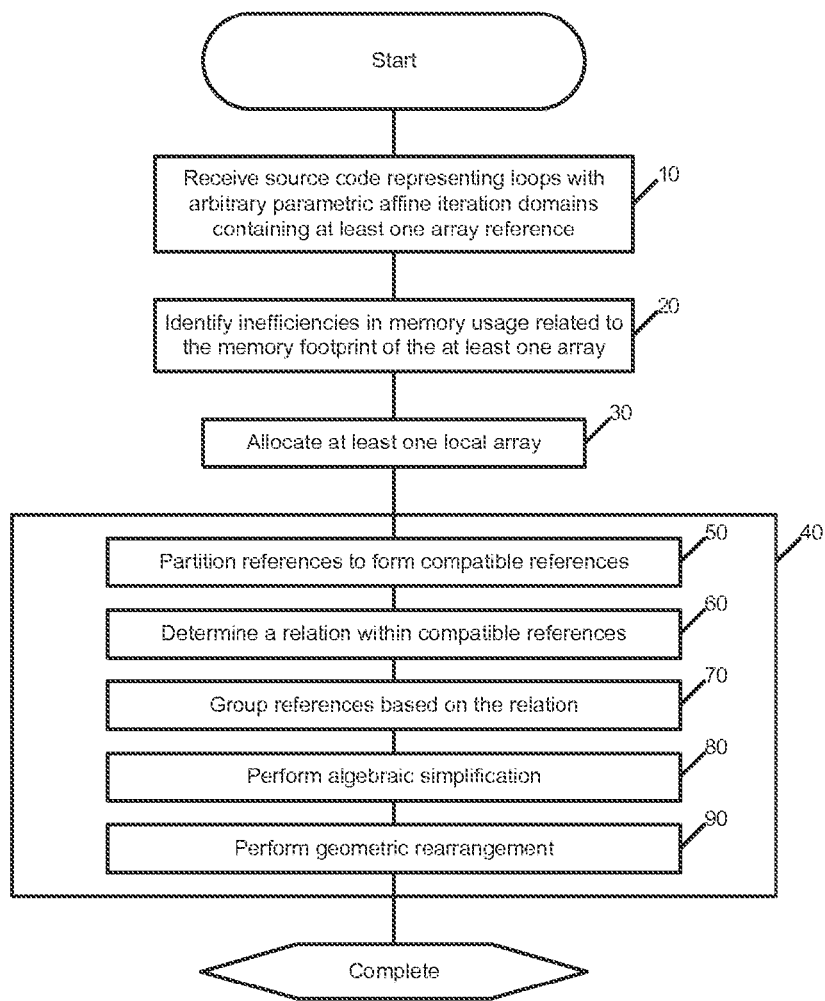
FIG. 3 illustrates the operational flow of another provided local memory compaction module, in which array references are partitioned into groups and algebraic and geometric data re-indexing functions are computed.

Another embodiment of a provided method is illustrated in FIG. 3. In this embodiment, flow begins in block 10 where source code is received in memory. Similar to the above embodiment, the source code contains loops with arbitrary parametric iteration domain and contains at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this embodiment, mapping block 40 includes partitioning references to form compatible references in block 50; determining a relation within compatible references in block 60; grouping compatible references based on the relation in block 70; performing algebraic simplification in block 80; and performing geometric arrangement through re-indexing the elements of the local array in block 90. In some embodiments the set of references partitioned are references that access a portion of the array. The following pseudo-code example illustrates this embodiment.

```
float A[256] [256] ;
doall (l=128*j+16*P; 1 <= min(-i+254,128*j+16*P+15); 1++)
   doall (m = 16*k; m <= min(-i+254, 16*k+15); m++)
      A[1+i+m] [1+i+1] -= A[1-i+m] [i] * A[i] [1+i+1];
```

In this case, all three references to array A are disjoint in that they access disjoint portions of the array. In this case, they are transformed into three local arrays $A\_2$, $A\_3$ and $A\_4$ in the following manner.

```
float A_2[16] [16]; // a triangular subregion of A
float A_3[16]; // a column of A
float A3 [16]; // a row of A
doall (1 = 0; 1 <= min(15, -i-128*j-16*P+254); 1++)
   doall (m = 0; m <= min(-i-16*k+254, 15); m++)
      A_2[m] [1] -= A_3[m] * A_4[1];
```

Performing transformations of the way data are allocated in memory, i.e., transforming the data layouts, has a combinational aspect, since the data sets accessed through each array reference may overlap with one or more data sets accessed by other array references. Since each one of those overlaps entail constraints in the way that data layouts can be transformed, analyzing all the combinations of overlaps for all the references is a source of high computational complexity. Hence, references are grouped into sets in such a way that data accessed through one set of references does not overlap data accessed through another set of references. In this embodiment, references of the same set are called "compatible references". Since there is no overlap among sets of compatible references, the following parts of the memory layout transformation, which consider the overlaps, can be applied independently to each set of compatible references. In particular, they will decide if the overlapping data sets accessed by a set of compatible references should be partitioned further and how.

In some embodiments, compatible references are identified by overlapping memory footprints during the execution of a particular subset of loop iterations. In an exemplary embodiment, the provided method identifies array references having overlapping memory footprints; duplicates a portion of the identified references; and associates each of the duplicates with disjoint subsets of the memory footprint. An example pseudo-code illustrates this embodiment.

```
double A[100] [100];
for (j = 0; j < 100; j++) {
   ... = A[i] [j] * A[j] [i];
}
```

The two references A[i] [j] and A[j] [i] overlap when i=j. However, if the references are allocated together, it is impossible to reduce the local memory usage using only affine transformations. This is because the data footprint of the two references is a 2-dimensional set (a cross), while the data footprints of the individual references are both 1-dimensional. In order to compute better allocations in situations like this, one embodiment first estimates how much overlapping is in the references. If the references are read-only, and if the overlapping data set is a small percentage of the overall data set, the embodiment splits the references into two distinct references to one-dimensional data sets. In the above example, the embodiment will generate the following local memory allocation. Note that the center element of the data foot print, A[i][i], has been replicated and put into the locations $A\_1$ [i] and $A\_2$ [i].

```
double A_1[100];
double A_2[100];
Transfer A[i] [j] to A_1[i], i = 0 ... 99
Transfer A[j] [i] to A_2[i], i = 0 ... 99
for (j 0; j < 100; j++)
   ... A_1[j] * A_2[j];
```

The geometric re-arrangements provided by a further exemplary embodiment are defined by a piecewise affine transformation. In other words, the transformation applied to the references is defined as a set of functions, each element of the set being valid within a polyhedral domain of the loop values, the parameters and the coordinates of the data accessed through the set of compatible references. In an exemplary embodiment, when some of the data accessed by a set of compatible references are written by some of the references, the written data subset and a subset of the data set that is only read define a partition for the piecewise affine transformation. Consider the program represented by the following pseudo-code:

```
double A[100][100];
for (j = 0; j < 99; j++) {
   A[i] [j+1] = ... A[j] [i];
}
```

In this example, the data set accessed by the both references to array A form a two-dimensional set, while the data sets accessed through each reference are one-dimensional. The data accessed through both references overlap in A[i][i]. In the exemplary embodiment, a piecewise transformation of A is applied, which separates A into two subsets, one for each one-dimensional data set, and marks one of them as receiving the updates (let us call it the "writing reference") to the duplicated data. In the example, the duplicated data is A[i][i] and the iteration domain is partitioned into three polyhedral domains, $\{0 \leq j < i\}$, $\{j=i\}$ and $\{i<j<99\}$, in order to take into account the fact that only one of the data subsets is updated. Such a partition of the iteration domain is obtained by defining the iterations accessing duplicate data through "non-writing" references and replacing those accesses with an access through the writing reference. The resulting piecewise affine transformation is $\{(A[i][j-1]=A\_1[j], A[j][i]=A\_2[j])$ for $0 \leq i < 100$, $0 \leq j < i$ or $i < j < 100$; and $(A[i][j-1]=A\_1[j], A[j][i]=A\_1[j])$ for $0 \leq i < 100$, $i=j\}$. The result of the piecewise affine transformation can be represented by the following pseudo-code, which uses only two arrays as a replacement for the original array A, has quasi-optimal memory requirements (198 memory cells, while the optimal would be 197):

```
double A_1[99], A_2[99]
for (int j=0; j<i; j++) {
   A_1[j] = ... A_2[j];
}
A_1[i] = ... A_1[i-1]; // the updated value of A[j][i] is in A_1 [j] when j=i
for (int j=i+1; j< 99; j++) {
   A_1[j] = ... A_2[j];
}
```

In other exemplary embodiments, the geometric rearrangement is a piecewise affine transformation that defines a partition of the iteration domain and of the data sets in such a way that the number of references to a local array varies from one element of the partition to another. In the following example, in which the possible values of variable i are {0≤i≤99900}, the data sets accessed through reference A[j] and A[i+j] overlap when i is less than 100. Otherwise, they do not overlap.

```
double A[10000];
for (j =0; j< 100; j++) {
    A[i] = ... * A[i+j]
}
```

Since those data sets overlap for some values of i, both references are put in the same group of compatible references. If the accessed data sets are allocated as a single local array, the amount of memory necessary to contain the array is 10000 memory cells. On the other hand, if they are allocated as two separate arrays, some of the data would have to be duplicated and the iteration domain (the j loop here) would have to be partitioned as in the previous exemplary embodiment. The amount of overlap when i is less than 100 may not be small enough and it may not be profitable to perform the duplication. The geometric rearrangement provided by the embodiment is a piecewise affine transformation that defines a partition of the set of parameters (in the current example, i): {(A_1[j]=A[j]) for 0≤i<100, and (A_1[j]=A[j], A_2[j]=A[i+j]) for i≤100}. The maximum amount of memory that has to be allocated for any value of i is 200 memory cells (as compared to 10000), and it is 100+i when i is less than 100. The resulting transformation can be represented as pseudo-code as follows:

```
if (i <100) {
    double A_1[100+i];
    for (j=0; j< 100; j++) {
        A_1[j] = ... * A_1[i+j]
    }
}
else {
    double A_1[100];
    double A_2[100];
    for (j=0; j<100; j++) {
        A_1[j] = ... *A_2[j];
    }
}
```

One advantage of the geometric rearrangement that is performed by this exemplary embodiment is that the j loops are not partitioned. Partitioning the loops into smaller loops is often a factor of performance degradation, which is avoided in this exemplary embodiment. The partition of i is obtained by computing the domain in which both data sets intersect, by projecting the intersection onto the vector space of the parameters (in the current example, the parameter is i and the projected domain is {i<100}.

Figure 4:
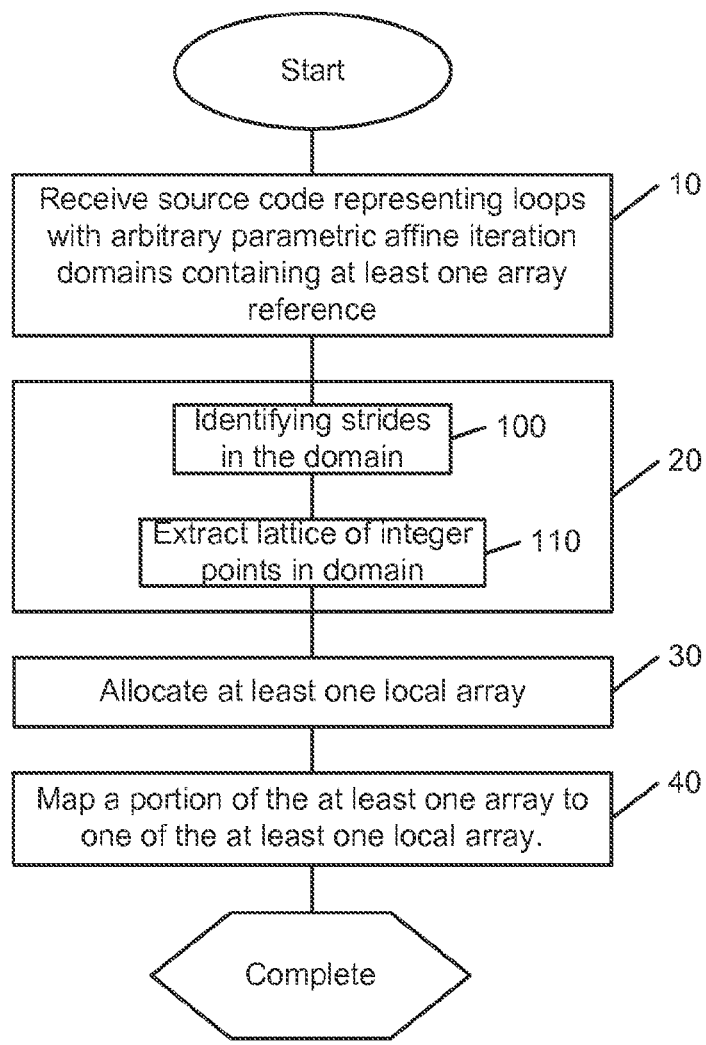
FIG. 4 illustrates the operational flow of an additional local memory compaction module in which inefficiencies in memory usage are determined using lattices of integer points.

The operation flow of a further provided embodiment of a local memory compaction module is illustrated in FIG. 4. In this embodiment, flow begins at block 10 where source code is received in memory. Similar to the above embodiment, the source code represents loops with arbitrary parametric affine iteration domains and contain at least one array reference. Flow continues to block 20 where inefficiencies in memory usage in the at least one array are identified. In this embodiment, the identification of inefficiencies includes block 100 where strides in the polyhedral domain that defines the accessed dataset are identified, and block 110 where a lattice of integer points within the domain is extracted from the domain. These integer points indicate that only a regular subset of the accessed data region is accessed. In this manner, more efficient allocation of local arrays is accomplished because portions of the array that are not accessed are identified and excluded from the mapping from the array to the local array.

Figure 5:
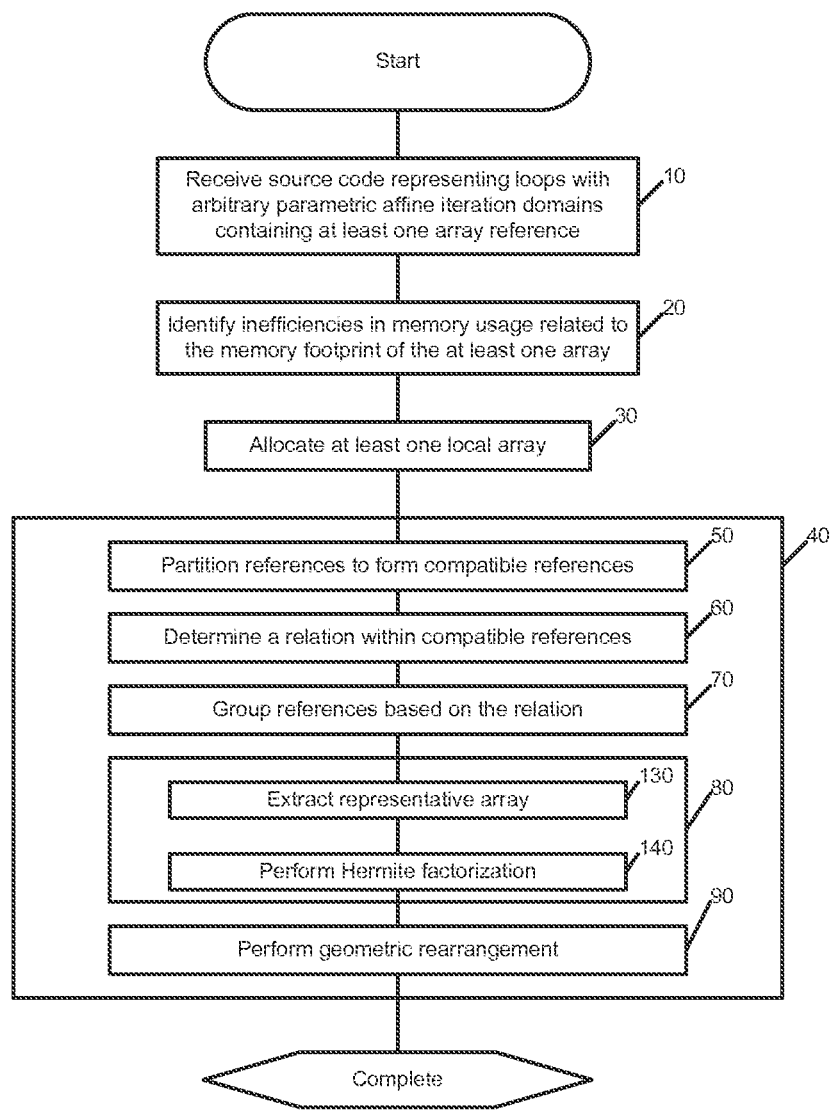
FIG. 5 illustrates the operational flow of an additional local memory compaction module for reducing the inefficiencies in local memory usage by extracting representative array references and producing re-indexing functions using Hermite factorizations.

An additional provided embodiment is illustrated in FIG. 5. In this embodiment, like earlier embodiments flow begins at block 10 where source code is received in memory. Similar to the above embodiment, the source code represents loops with arbitrary parametric affine iteration domain and contains at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this embodiment, like in the embodiment illustrated by FIG. 3, mapping block 40 includes partitioning references to form compatible references in block 50; determining a relation within compatible references in block 60; grouping compatible references based on the relation in block 70; performing algebraic simplification in block 80; and performing geometric arrangement in block 90. The algebraic simplification block 80 includes block 130 where a representative array reference is extracted from a set of references accessing a portion of the array. In some embodiments, the representative array reference represents a set of references which access polyhedral datasets whose accessed points all lie on a lattice of integer points that is not the standard lattice, on which any integer point lies. These embodiments take advantage of the fact that array references represent affine functions, which can be represented as matrices called "access matrices". In the exemplary embodiment, the flow within block 40 goes from block 130 to block 140 where a Hermite factorization is performed for the access matrix representing the representative array reference. The Hermite factorization produces a piecewise affine index function.

One purpose of Hermite factorization is to reduce the dimension of the reference to the actual geometric dimension of the data footprint. In addition, if the access pattern contains strides, i.e., regular intervals between accessed data, using the non-unimodular matrix that results from the Hermite factorization in the transformation removes these strides in the resulting local references. For example, given an affine access function f(x, y) on loop indices x and parameters y, we first decompose it into the sum of g(x)+h(y), where g(x) is a linear function on x and h(y) is an affine function on y. This decomposition is an algebraic simplification that makes it possible to perform further computations on the part of f(x,y) that involves variables only. Function g(x) can be decomposed into g(x)=HU, where H=[H'0] is the Hermite Normal Form of g(x) and U is unimodular matrix. Let $$U = \begin{bmatrix} U_1 \\ U_2 \end{bmatrix}$$

where HU=H'U1•The following mapping from global to local indices is then performed f(x, y) f→U1x.

Hermite factorizations have many uses is lattice computations. The Hermite factorization of a matrix G, written G=HU, writes matrix G as the product of two matrices, H and U. H, called the "Hermite normal form", is a canonical representation of the lattice (also) represented by G. U is a unimodular matrix, which entails that U, when used as a transformation, always transforms any point that has integer coordinates into another point that has integer coordinates. Also, any point that has integer coordinates can be obtained by transforming a point with integer coordinates using a unimodular transformation. This is important since most programming language conventions enforce that data elements, and particularly array elements, must have integer coordinates.

Figure 6:
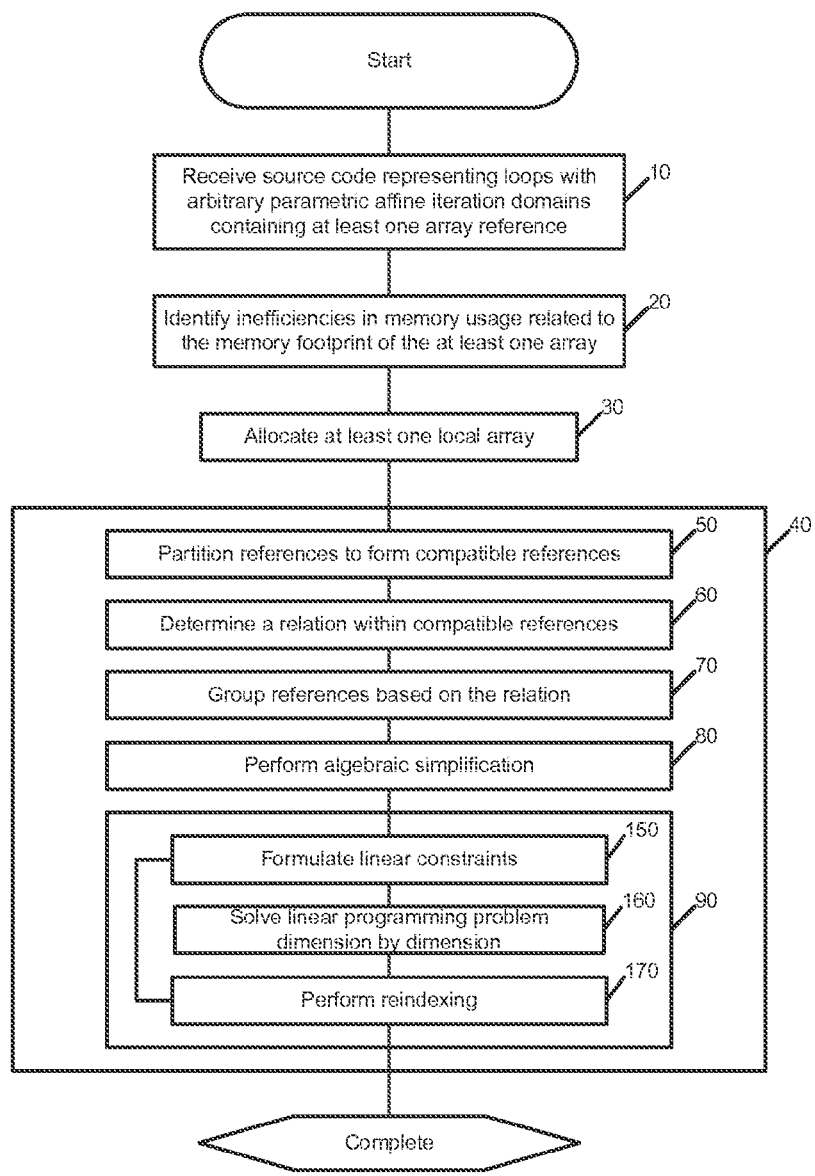
FIG. 6 illustrates the operational flow of an additional local memory compaction module for computing data re-indexing functions by producing linear constraints and solving a series of linear programming problems.

The flow of a still further provided embodiment is illustrated in FIG. 6. In this embodiment, like previous embodiments, flow begins at block 10 where source code is received in memory. Similar to the above embodiment, the source code represents loops with arbitrary parametric affine iteration domain and contain at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this embodiment, mapping block 40 includes partitioning references to form compatible references in block 50; determining a relation within compatible references in block 60; grouping compatible references based on the relation in block 70; performing algebraic simplification in block 80; and performing geometric arrangement in block 90. Geometric rearrangement 90 contains blocks 150 where linear constraints are formed, block 160 where sets of linear programming problems are formed from the linear constraints and solved, and block 170 where a data reindexing is computed. In some embodiments, the flow goes back to block 150. In such embodiments, geometric rearrangements are applied iteratively until no reindexing function is found that reduces memory requirements.

Most modern programming languages abide by the convention that multi-dimensional arrays are allocated in memory as if they were canonical rectangular parallelotopes. In a space of d dimensions, a parallelotope is a finite polyhedron defined by 2d faces, and whose faces are pair-wise parallel. A canonical rectangular parallelotope is a parallelotope for which the normal vectors to its faces are either a canonical vector or the negation of a canonical vector. Examples of rectangular parallelotopes are a cube (in a 3-dimensional space) and a rectangle (in a 2-dimensional space). In an exemplary embodiment, the transformation is a unimodular reindexing of the accessed data that minimizes the size of the smallest canonical rectangular parallelotope that encloses the accessed dataset. The smaller the enclosing rectangular parallelotope, the smaller the amount of memory that has to be allocated for the dataset.

In some embodiments, this is accomplished by formulating a first set of linear constraints through the use of Farkas Lemma. This first set of linear programming constraints is decomposed dimension by dimension to form a set of integer linear programming problems. This set of problems is then solved to provide the data reindexing function which can then be applied to the at least one local array. Unimodular reindexings transform integer points into integer points. Hence, the convention that data elements have integer coordinates is preserved by such a reindexing. In the case of affine transformations, the linear part of the transformation can be represented by a unimodular matrix.

Farkas lemma is a basic linear algebra theorem which is often used to obtain, from a set of affine constraints (i.e., inequalities and equalities) on variables with unknown coefficients, constraints that apply to the unknown coefficient themselves. In this embodiment, it is used to obtain a set of constraints involving the coefficients of the unimodular data reindexing function (which is represented as a matrix) and the width of the enclosing rectangular parallelotope along each dimension. From those obtained constraints, the method embodiment finds values of the coefficients of the unimodular data reindexing function for which the width is minimal, using integer linear programming. For example, the data set accessed through reference B[i+j][j] in the following pseudo-code can be reindexed so as to occupy only 100 memory cells:

```
Double A[n+10][n+10];
Double B[[2n+20][n+10];
For (i=n; i<n+10; i++) {
    For (j=n; j<n+10; j++) {
        A[i][j] = ... B[i+j][i];
    }
}
```

The coordinates $(x_1, x_2)$ of the elements of array B accessed by that loop node are defined by the constraints D:$\{n \le x_2 < n+10; n \le x_1 < n+10\}$. The embodiment finds values of the coefficients of a matrix U such that U is unimodular and the coordinates $x'_1$ and $x'_2$ of the reindexed data are defined by:

$$\begin{bmatrix} x'_1 \\ x'_2 \end{bmatrix} = U \begin{bmatrix} x_1 \\ x_2 \end{bmatrix} + \begin{bmatrix} t_1 \\ t_2 \end{bmatrix} n + \begin{bmatrix} t_{01} \\ t_{02} \end{bmatrix}$$

The set of possible values of the coefficients of U, as well as the possible values of t1, t2, $t_{01}$ and $t_{02}$ are defined from the set of constraints D and the constraints that the data $(x'_1, x'_2)$ are enclosed in a rectangular parallelotope of size $(s_1, s_2)$ using Farkas lemma. Then, a value for those coefficients is computed for which the size of the smallest enclosing rectangular parallelotope ($s_1$, $s_2$ in our example) is minimal. Those values are computed by solving, dimension by dimension of the data set, an integer linear programming problem.

An integer linear programming problem defines a linear function of a set of variables, called the "objective function" and whose minimal (or, alternatively, maximal) value over a polyhedral domain called the "feasible set", is looked for. Solvers for such problems typically return a polyhedral domain, within the feasible set, for which the value of the objective function is minimal. In the running example, the embodiment finds:

$$\begin{bmatrix} x'_1 \\ x'_2 \end{bmatrix} = \begin{bmatrix} 1 & -1 \\ 0 & 1 \end{bmatrix} \begin{bmatrix} x_1 \\ x_2 \end{bmatrix} + \begin{bmatrix} -1 \\ -1 \end{bmatrix} n + \begin{bmatrix} 0 \\ 0 \end{bmatrix}$$

The following pseudo-code represents the program resulting from the data reindexing of array B in our running example:

```
Double A[10][10];
Double B[[2n+20][n+10];
For (i=n; i<n+10; i++) {
    For (j=n; j<n+10; j++) {
        A[i][j] = ... B[j-n][i-n];
    }
}
```

The data footprint of the re-indexed array B is now reduced to 100 memory cells, instead of $n^2+20n+100$ initially.

In one of the exemplary embodiments, the unimodular nature of the reindexing matrix U is obtained by forcing U to be triangular and forcing the absolute value of the diagonal elements to be one. In another embodiment, the unimodular nature of the reindexing matrix is obtained by composition of an upper triangular unimodular and a lower triangular unimodular matrix. The advantage of that other embodiment is that the class of unimodular reindexing functions produced is not limited to the reindexing functions represented by a triangular matrix. Finding those two matrices is equivalent to reindexing data twice, first by finding an upper triangular reindexing matrix as described above and applying the reindexing, and then by finding a lower triangular reindexing matrix for the reindexed set and by applying that second reindexing. Yet another embodiment produces, in the same way, a unimodular reindexing by composition of an upper triangular unimodular matrix, a permutation matrix and a lower triangular unimodular matrix. The advantage of the embodiment is that the class of reindexing function that can be produced is the whole class of integer unimodular matrices.

Figure 7:
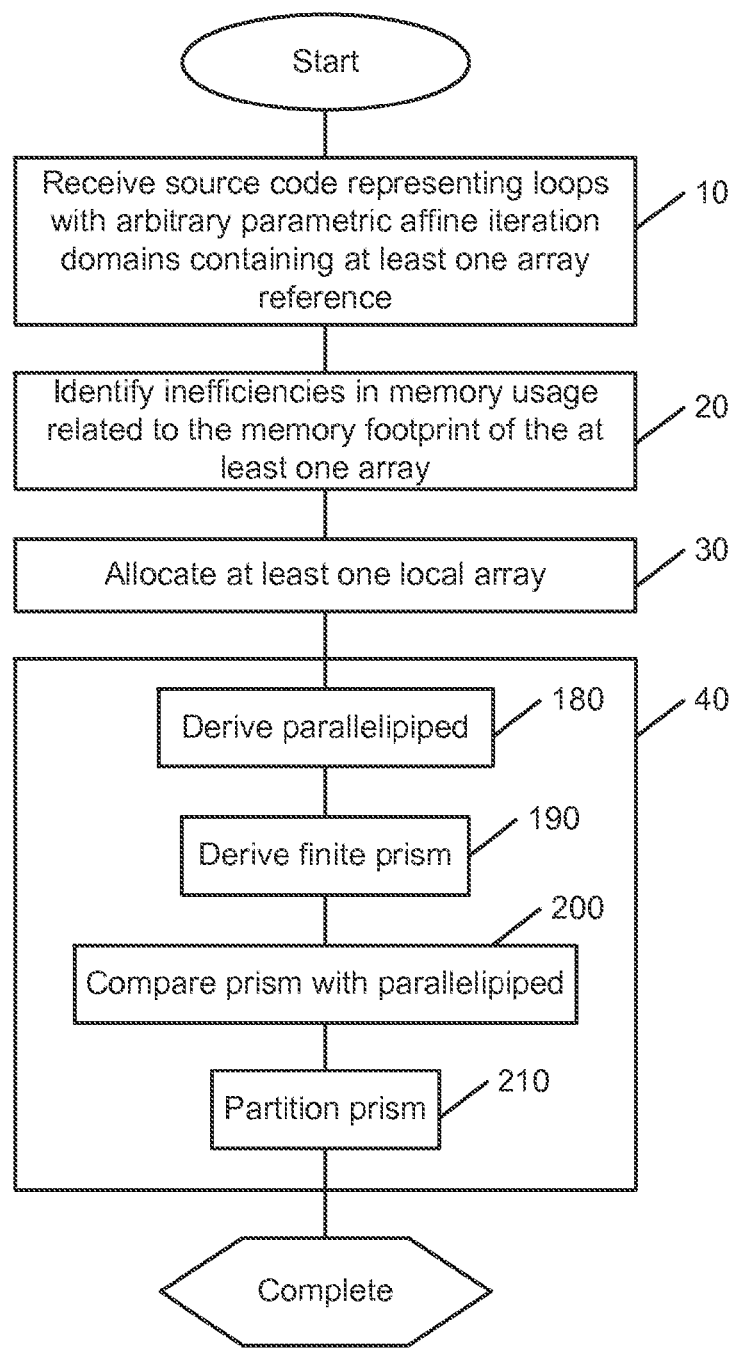
FIG. 7 illustrates the operational flow of an additional local memory compaction module for computing data re-indexing functions by finding a prism of triangular base that encloses the accessed data set and reducing the memory requirements of the enclosed data region by transforming the data elements that lie within a subset of the prism of triangular base.

Turning to FIG. 7 which illustrates another embodiment of a provided method, like the previous embodiments, flow begins in block 10 where source code is received in memory. Similar to the above embodiment, the source code represents loops with arbitrary parametric affine iteration domain and contains at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. In this illustration, block 40 contains block 180 where a parallelotope of minimal volume is derived this parallelotope enclosing the domain of the data set accessed by the local arrays. Block 40 additionally contains block 190 where a finite prism of triangular base is derived.

As used herein, a finite prism is a polyhedron defined by a set of translations of a "base" polyhedron, which lies in a subspace of the considered space, by a finite convex set of linear combinations of vectors of the complementary subspace. Since they are finite, it is possible to characterize the maximum extent of a finite prism along the directions of the complementary subspace. In this document, those extents are called "height" of the prism (there is one height along every direction of the complementary subspace). A triangular prism is a prism whose base polyhedron is a triangle. In two dimensions, it is just a triangle. In one embodiment, this finite prism has a minimum volume that encloses the data footprint domain. In block 200 the prism is compared to the parallelotope. In block 210 the prism is partitioned into two prisms. One of the two is then transformed using a central symmetry such that the union of the transformed prism and the non-transformed prism has a smaller memory footprint than the enclosing parallelotope. One advantage of that embodiment is that it provides data layouts that have smaller memory requirements, for a class of accessed datasets for which methods based on parallelotopes are not optimal.

For instance, the dataset accessed by the program represented by the following pseudo-code through reference B is triangular:

```
For (i=0; i< 10; i++) {
   For (j=0; j< i; j++) {
      ... = ... B[i][j];
   }
}
```

The embodiment finds three constraints that enclose the accessed data set, in a similar way as in the embodiment depicted in FIG. 6, using the Farkas lemma. The minimal volume for a parallelotope that encloses the dataset would be about twice the volume of the triangle. Hence, using such a parallelotope to determine the memory allocation of the dataset is bound to be sub-optimal. Instead, the current embodiment, depicted in FIG. 7, defines a tighter enclosing polyhedron using three inequalities (it is then a prism of triangular base). Using the enclosing prism, the data set is partitioned in two subsets, say A and B, and subset A is re-indexed in such a way that both the array elements in B and the re-indexed elements are enclosed in a smaller parallelotope than the original parallelotope. The volume of the new parallelotope is about the volume of the prism of triangular base. Since there is a parallelotope of smaller volume enclosing the reindexed data set, its memory requirements are smaller. The result is a piecewise affine array reindexing, which typically partitions the loop iterations into the iterations that access A, and the ones that access B.

In the current embodiment, the three inequalities {(a): $aI+a_0 \geq 0$; (b): $bI+b_0 \geq 0$; (c): $cI+c_0 \geq 0$} that define the triangular prism P, where I is the vector of data coordinates are used to devise the partitioning. Let $x_w$ a point in the intersection of (b) and (c) and let $w=ax_w I+a_0$. The prism is partitioned into A and B as follows:

$$A = P \cap \left\{ aI + a0 - \frac{w+1}{2} \geq 0 \right\}$$

and B=P−A. A point, $x_0$, is defined that is in the domain {$aI+a_0-w+1<0$; $bI+b_0<0$} whose coordinates are a multiple of ½60 and whose "height" in the prism is about half of the height of the prism. Array elements that are defined by A are transformed using a central symmetry of center $x_0$. In the program represented by the following pseudo-code, the tightest enclosing parallelotope, defined by {0≤x1≤9; 0≤x2≤9}, where x1 represents the first dimension of array C and x2 its second dimension, includes 100 array elements.

```
Double C[10][10];
For (i=0; i< 10; i++) {
   For j=0; j< i; j++) {
      ...C[i,j] ...;
   }
}
```

The tightest enclosing triangle, defined by {0≤x1; 0≤x2; x1+x2≤9}, by comparison, includes 55 elements, which is about half the number of elements required for the enclosing parallelotope. Since the number of array elements in the enclosing triangle is less than the number of array elements in the enclosing parallelotope, the embodiment considers the tightest enclosing triangle and partitions the enclosed data into data subsets A: {0≤$x_1$; 5≤$x_2$; $x_1+x_2 \leq 9$} and B: {0≤$x_1$; 0≤$x_2 \leq 4$; $x_1+x_2 \leq 9$}. Point $$x_0 = \left(5, \frac{9}{2}\right)$$

is selected as center of symmetry and the elements of A are then transformed into a new array subset A' as follows:

$$\left\{ x'_1 = (2*5) - x_1; x'_2 = \left(2*\frac{9}{2}\right) - x_2 \right\}.$$

where $(x'_1, x'_2)$ are the new array element coordinates. The resulting program can be represented by the following code:

```
Double C[11][5];
For (i=0; i< 10; i++) {
    For (j=0; j<=4 && j<i; j++) {
        ...C[i][j]...;
    }
    For (j=5; j<i; j++) {
        ...C[10–i][9–*j]...;
    }
}
```

The accessed data set is included in the parallelotope $\{0 \leq x1 < 11, 0 \leq x2 < 5\}$, whose memory requirements are of 55 memory cells, i.e., about half of the parallelotope before the transformation. Other data layout optimizations, which are optimal when there is a tight parallelotope enclosing the accessed dataset, will then be more optimal than if applied straightforwardly to the original dataset that can be enclosed more tightly with a triangular prism.

Figure 8:
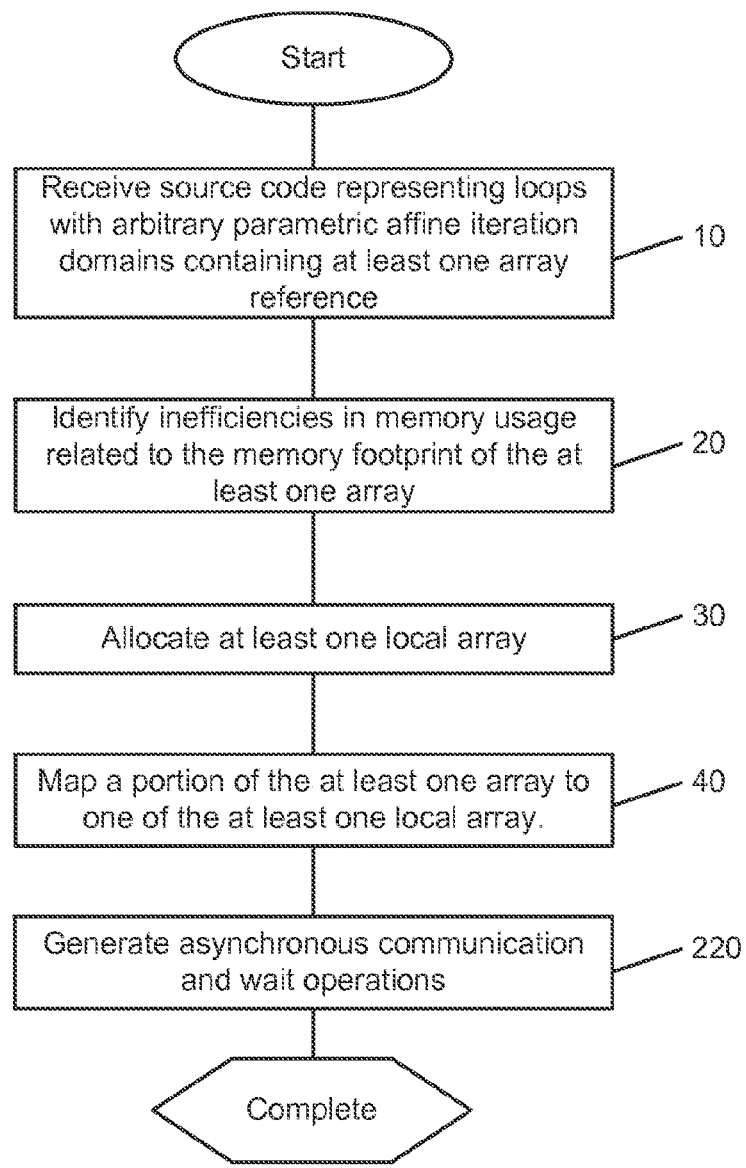
FIG. 8 illustrates the operational flow of an additional local memory compaction module using data re-indexing information to produce abstract communication commands and schedule computations and communications for the program in such a way that their executions overlap.

FIG. 8 illustrates a further embodiment of a provided method. In this embodiment, flow begins in block 10 where source code is received in memory. Similar to the above embodiment, the source code contains loops with arbitrary parametric affine iteration domain and contain at least one array reference. Flow continues to block 20 where inefficiencies in memory usage in the at least one array are identified. Flow then continues to block 30 where at least one local array is allocated, and in block 40 a portion of the array with inefficient memory usage is mapped into the local array. Flow then continues to block 220 where asynchronous communications and wait operations are generated. The exemplary embodiment uses the mapping between local memory elements and the elements of the original arrays, in conjunction with a description of the data that are needed as input and produced as output of the tasks to be executed, to produce an abstract representation of the transfers between the original arrays and the local memory elements. In an exemplary embodiment, the generation of these communications and wait operations includes the use of multi-buffering for overlapping communication and computation operations.

Many computers that contain processors that have an explicitly managed local memory also have the ability to transfer data at the same time as they are performing other computations. Such transfers are called "asynchronous". The main reason for using that feature is that the typical time necessary for such transfers is often comparable to the time taken to perform computations between two consecutive transfers of input data. Since doing both transfer and computation at the same time takes less time than doing one after another, the effect of overlapping them is to improve the overall program execution time. The use of several memory zones, specialized to either execution, reception or sending of data, makes the overlap possible. Such a use is called "multi-buffering". The specialization of the buffers is also modified at certain times. Such a modification is called a "rotation of the buffers", since a buffer is cyclically assigned the same specialization.

One embodiment computes a local memory mapping, adds a polyhedral representation of the communications and schedules communications and computations in a multi-buffering scheme for the program represented by the following pseudo-code. In this pseudo-code, every iteration of the k loop works on a distinct instance of local memory:

```
for (k = 0; k <= 7; k++) {
    for (l = 0; l <= 15; l++) {
        for (m = 0; m <= 15; m++) {
            for (n = 16 * k; n <= 16 * k + 15; n++) {
                C[l][m] = C[l][m] + A[l][n] * B[n][m];
            }
        }
    }
}
```

This results in a program that can be represented by the following pseudo-code:

```
for (k = –1; k <= 8; k++) {
    if (k <= 7 && k >= 0) {
        wait(tag=0);
        rotate(vars=[C_l, A_l, B_l]);
    }
    if (k <= 6) {
        for (l = 0; l <= 15; l++) {
            for (m = 0; m <= 15; m++) {
                get(src=&B[l][16 + 16 * k + m], dst=&B_l<1>[l][m], tag=0);
            }
        }
    }
    for (l = 0; l <= 15; l++) {
        for (m = 0; m <= 15; m++) {
            get(source=&A[l][m], destination=&A_l<1>[l][m], tag=0);
        }
    }
    for (l = 0; l <= 15; l++) {
        for (m = 0; m <= 15; m++) {
            get(src=&C[l][16 + 16 * k + m, tag=0);
        }
    }
    if (k >= 1) wait(tag=1);
    if (k <= 7 && k >= 0) {
        for (l = 0; l <= 15; l++){
            for (m = 16 * k; m <= 16 * k + 15; m++) {
                for (n = 0; n <= 15; n++) {
                    C_l[l][–16 * k + m] = C_l[l][–16 * k +m] + B_l[n][–16 * k + m] * A_l[l][n];
                }
            }
        }
    }
}
```

-continued

```
        }
    }
    for (l = 0; l <= 15; l++) {
        for (m = 0; m <= 15; m++) {
            put(src=&C_l[l][m], dst=&C[l][16 * k + m], tag=1);
        }
    }
  }
}
```

In the code example, "Get" operations are transfers from an original array to a re-indexed array in local memory. "Put" operations are transfers from local memory to original array. While the values of k in the original program were going from 0 to 7, in the multi-buffered version produced by the embodiment they are going from −1 to 8. At iteration k=−1, the first "get" transfers are issued. At iteration k=8, the last "put" transfers are issued. "Wait" operations, which wait for the completion of a series of transfers, were also inserted to ensure that a transferred data set is completed at that point of the program's execution. In the embodiment, a tag system is used to identify the transfers whose completion is to be waited upon. The "rotate" operations operate the buffer rotation.

Figure 9:
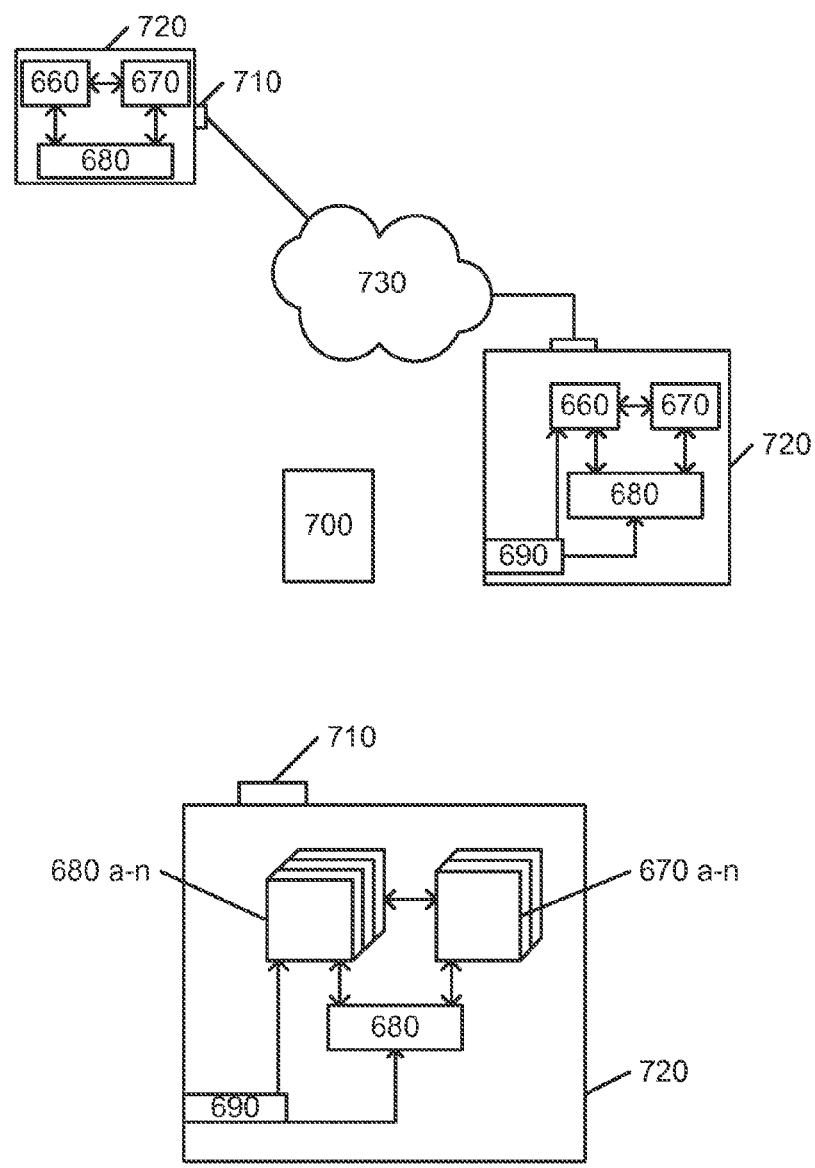
FIG. 9 illustrates a computing apparatus and computer software product consistent with provided embodiments.

Illustrated in FIG. 9 are computing apparatus and computer software products consistent with provided embodiments. Computing apparatus 720 includes processor 660, memory 670, storage medium 680, and in some embodiments input port 690 and network interface 710. In many provided embodiments, storage medium 680 contains a set of processor executable instructions that when executed by processor 660 configure computing apparatus 720 to implement the modules and methods described herein. In one embodiment, storage medium 680, containing the set of processor executable instructions resides in another computing apparatus 720 across network 730. In an embodiment of a computer software product, computer software product 700 is a computer readable storage medium containing processor executable instructions sufficient that when executed by processor 660 configure computing apparatus 720 to implement the above described modules and methods. Further, computer software product, in some embodiments consists of a physical medium configured to interface with input port 690 to allow its contents to be copied to storage medium 680. In other embodiments, computer software product 700 is an internal storage medium, such as 680. An additional embodiment of computing apparatus 720 includes a plurality of processors 680(a-n), a plurality of memories 670(a-n), a storage medium 680 and in some embodiments input port 690 and network connection 710. In some embodiments, one or more processors 680(a-n) is a host, while others are modeled in the form of a grid.

Figure 10:
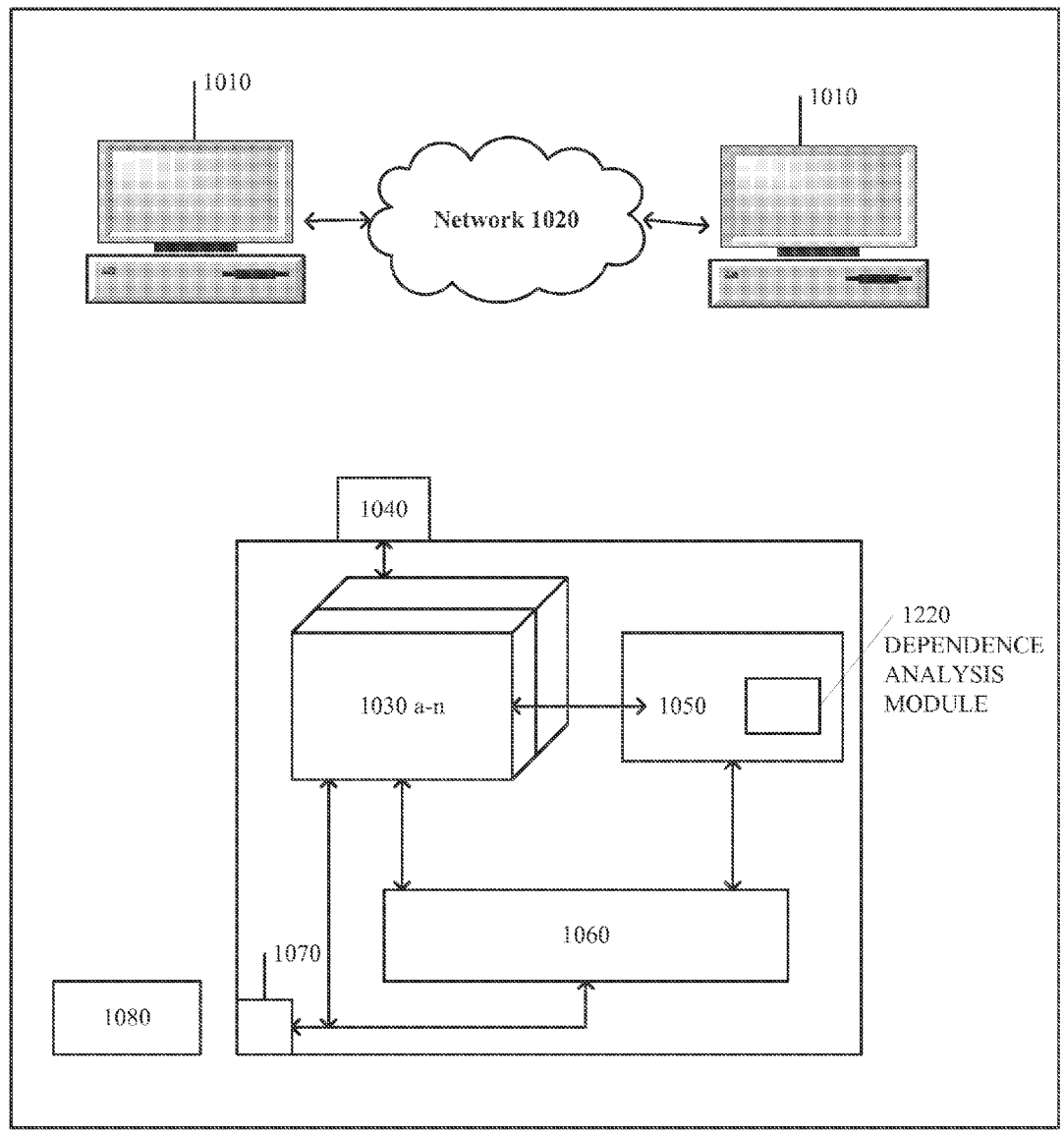
FIG. 10 illustrates a computer network and a computing apparatus consistent with provided embodiments.

Other embodiments of the present invention provide a custom computing apparatus, illustrated in FIG. 10, that is configured to optimize computer source code for operation on a second computing apparatus. As illustrated, first custom computing apparatus 1010(a) is configured to communicate with second computing apparatus 1010(b) across network 1020. A further illustration of computing apparatus 1010 is provided in FIG. 10. In this illustration custom computing apparatus 1010(a) contains at least one processor 1030(a-n), a communication port 1040 communicating with the at least one processor 1030(a-n). Custom computing apparatus 1010(a) additionally includes memory 1050, which in some embodiments includes dependence analysis module 1220. Custom computing apparatus 1010(a), in some embodiments, additionally includes drive 1070 configured to accept external storage medium 1080. In some embodiments, external storage medium 1080 is a CD, in others a DVD. In these embodiments, drive 1070 is configured to accept the appropriate external storage medium 1080. While CD and DVD are specifically enumerated in these embodiments, there are many external storage media that can be used to practice various aspects of the invention therefore some embodiments are not limited to the particular drive 1070 configuration or external media 1080. Custom computing apparatus 1(a) additionally includes storage medium 1060. Storage medium 1060 in some embodiments is a hard-disk drive, and in others is a solid state drive. In some embodiments, storage medium 1060 contains a set of processor executable instructions that when executed by the at least one processor 30(a-n) configure custom computing apparatus 1010(a) to optimize computer code for execution on computing apparatus 1010(b). While custom computing apparatus 1010(a) and computing apparatus 1010(b) are illustrated in FIG. 10 communicating over network 1020, various embodiments of the invention do not require this inter-computer communication.

Figure 11:
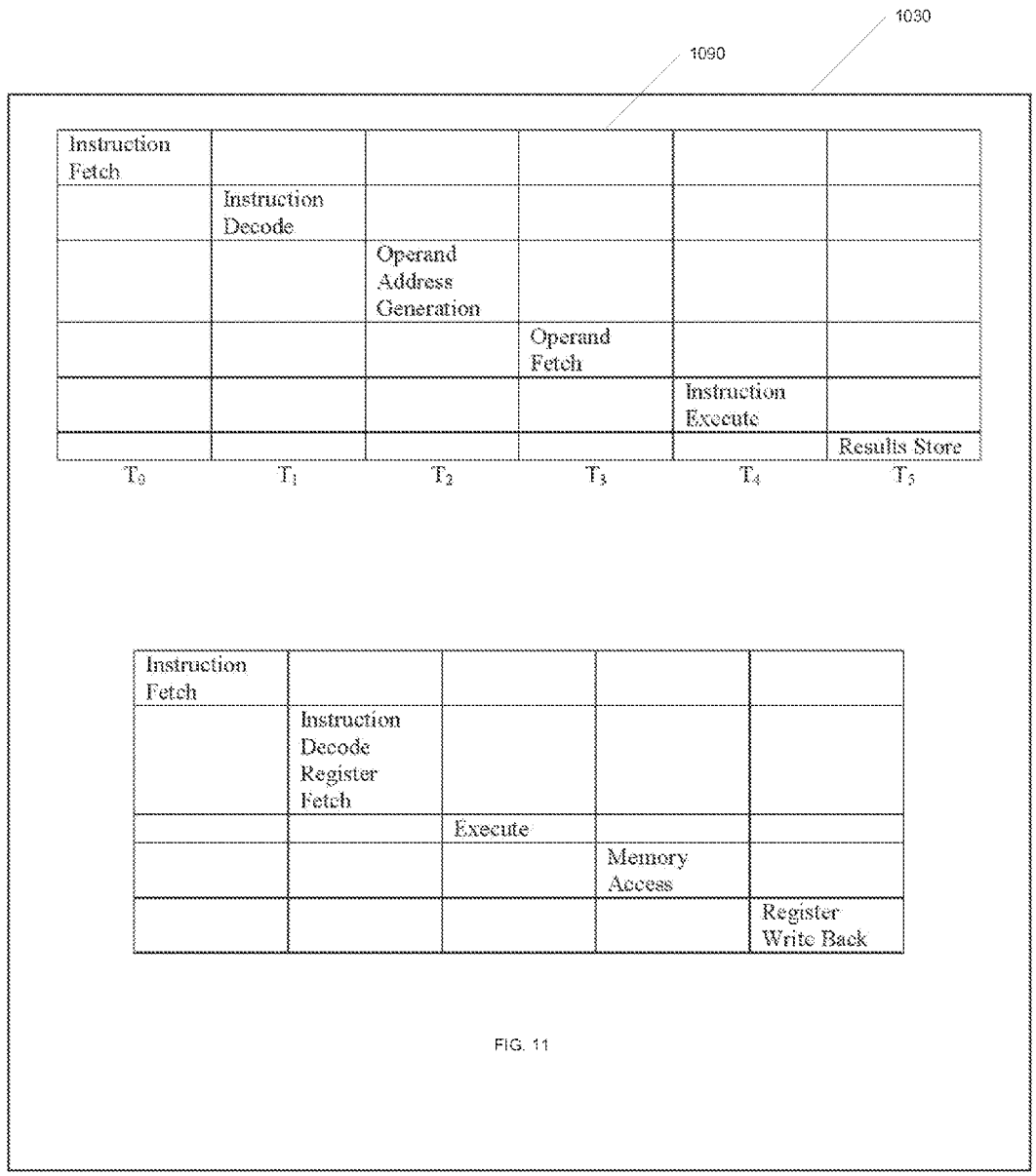
FIG. 11 illustrates processors with multi-stage execution units.

Various embodiments of the present invention are directed to processors containing multi-stage execution units, and in some embodiments multiple execution units. By way of example and not limitation to the particular multi-stage execution unit, FIG. 11 illustrates exemplary multi-stage execution units 90. In one embodiment, a 6-stage execution unit is utilized. In this embodiment, the stages may include instruction fetch, instruction decode, operand address generation, operand fetch, instruction execute, and result store. In another depicted multi-stage architecture, the stages include instruction fetch, instruction fetch & register decode, execute, memory access and register write-back. During routine operation of a multi-stage execution unit instructions are processed sequentially moving from stage to stage. In scheduling operations on multi-stage execution unit processors there are inherent difficulties that arise. For example, one instruction in one stage of the pipeline may attempt to read from a memory location while another instruction is writing to that location. This is problem is confounded in the instance of multiple processing cores. Additionally, in multiple processor and/or multiple core architectures, the locality of data to the execution unit attempting access can create significant delays in processing.

Figure 12:
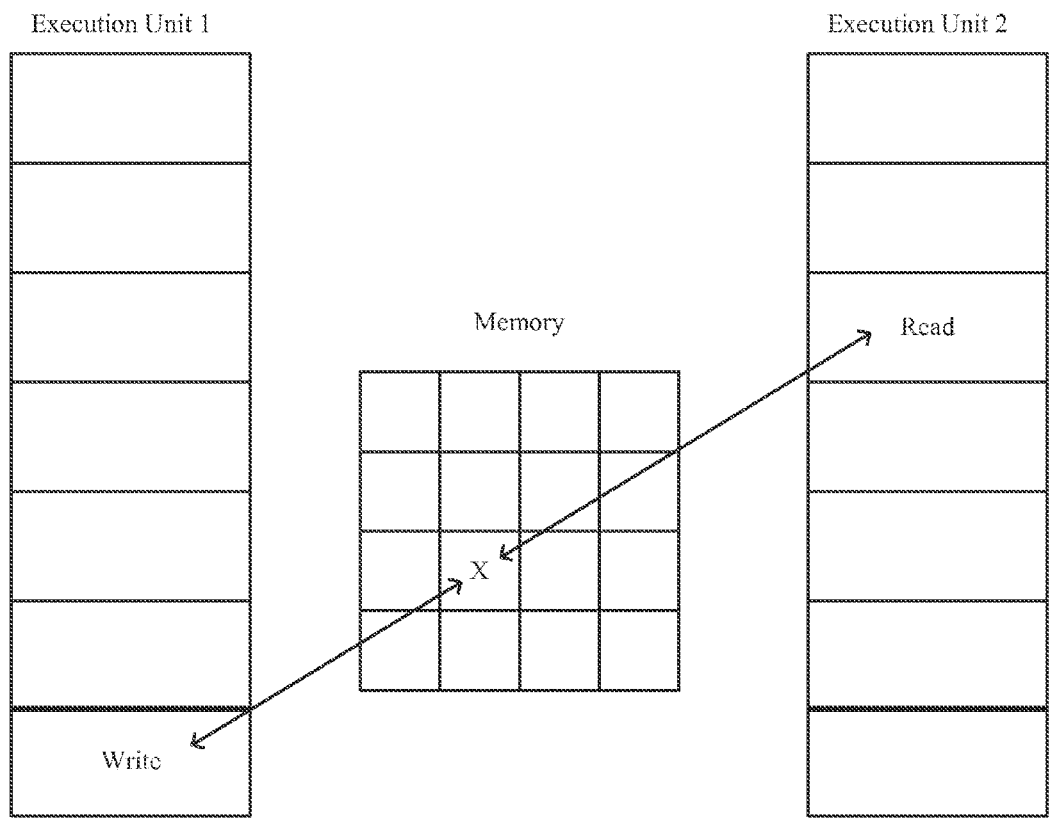
FIG. 12 illustrates a processor with multiple multi-stage execution units.

A further illustration of a multiple execution unit system is depicted in FIG. 12. In this illustration, a first execution unit (Execution Unit 1) is attempting to write to a specific memory location while a second execution unit (Execution unit 2) is attempting to read from that same location. When both read and write occur at the same time, this causes a condition known in the art as a conflicting access which can significantly impact the speed and the correctness of execution. While it may appear that parallel execution of instructions across multiple execution units and/or processors would produce an optimal result this is not always the case. Further, as previously discussed optimization, of source code for parallelism may result in code that is poor in terms of locality or communications. In the prior approaches to code optimization, the converse is additionally true. Optimization of code for locality can result in poor parallelism and under utilization of computing resources. It is therefore an object of embodiments of the present invention to provide a customized computing apparatus, methods, and computer software product that simultaneously optimizes a computer program for execution on a particular computing device with multiple execution units. It is another object of the invention to provide embodiments of methods which can explore the complete solution space for legal schedules for potential solutions. It is a further object of the invention to provide methods containing new formulations that encode the tradeoffs between locality and parallelism directly in the constraints and the objective functions of an optimization problem. It is a further object of the invention to automatically generate conditional synchronizations between execution units at different levels in the hierarchy of multiple execution units.

The following code example illustrates loop fusion. Given the following code:

```
int i, a[100], b[100];
for (i = 0; i < 100; i++) {
    a[i] = 1;
}
for (i = 0; 1 < 100; i++) {
    b[i] = 2;
}
```

The effect of loop fusion is to interleave the execution of the first loop with the execution of the second loop.

```
int i, a[100], b[100];
for (i = 0; i < 100; i++) {
    a[i] = 1;
    b[i] = 2;
}
```

A consequence of loop fusion is that memory locations a[i] and b[i] referenced by the former 2 loops are now accessed in an interleaved fashion. In the former code, memory locations were accessed in the order a[0], a[1], . . . a[100] then b[0], b[1], . . . b[100]. In the code comprising the fused loops, the memory locations are now accessed in the order a[0], b[0], a[1], b[1], . . . a[100], b[100]. Loop fusion can lead to better locality when multiple loops access the same memory locations. It is common general knowledge in the field of compilers that better locality reduces the time a processing element must wait for the data resident in memory to be brought into a local memory such as a cache or a register. In the remainder of this document, we shall say that loops are fused or equivalently that they are executed together when such a loop fusion transformation is applied to the received program to produce the optimized program.

Loop fusion can change the order in which memory locations of a program are accessed and require special care to preserve original program semantics:

```
int i, a[100], b[100];
for (i = 0; i < 100; i++) {
    a[i] = 1;
}
for (i = 0; i < 100; i++) {
    b[i] = 2 + a[i+1];
}
```

In the previous program, the computation of b[i] depends on the previously computed value of a[i+1]. Simple loop fusion in that case is illegal. If we consider the value computed for b[0]=2+a[1], in the following fused program, b[0] will read a[1] at iteration i=0, before a[1] is computed at iteration i=1.

```
int i, a[100], b[100];
for (i = 0; i < 100; i++) {
    a[i] = 1;
    b[i] = 2 + a[i+1];
}
```

It is common general knowledge in the field of high-level compiler transformations that enabling transformations such as loop shifting, loop peeling, loop interchange, loop reversal, loop scaling and loop skewing can be used to make fusion legal.

The problem of parallelism extraction is related to the problem of loop fusion in the aspect of preserving original program semantics. A loop in a program can be executed in parallel if there are no dependences between its iterations. For example, the first program loop below can be executed in parallel, while the second loop must be executed in sequential order:

```
int i, a[100], b[100];
for (i = 0; i < 100; i++) {
    a[i] = 1;
}
for (i = 1; i < 100; i++) {
    b[i] = 2 + b[i-1];
}
```

It is common knowledge in the field of high-level compiler transformations that the problems of fusion and parallelism heavily influence each other. In some cases, fusing 2 loops can force them to be executed sequentially.

Loop permutability is another important property of program optimizations. A set of nested loop is said permutable, if their order in the loop nest can be interchanged without altering the semantics of the program. It is common knowledge in the field of high-level compiler optimization that loop permutability also means the loops in the permutable set of loops dismiss the same set of dependences. It is also common knowledge that such dependences are forward only when the loops are permutable. This means the multi-dimensional vector of the dependence distances has only non-negative components. Consider the following set of loops:

```
int i,j, a[100][100], b[100][100];
for (i = 0; i < 99; i++) {
    for (j = 0; j < 99; j++) {
        a[i+1][j+1] = a[i][j] + a[i][j+1];    // statement S
    }
}
```

There are 2 flow dependences between the statement S and itself. The two-dimensional dependence vectors are: (i−(i−1), j−(j−1))=(1,1) and (i−(i−1), j−j)=(1, 0). The components of these vectors are nonnegative for all possible values of i and j. Therefore the loops I and j are permutable and the loop interchange transformation preserves the semantics of the program. If loop interchange is applied, the resulting program is:

```
int i,j, a[100][100], b[100][100];
for (j = 0; j < 99; j++) {
    for (i = 0; i < 99; i++) {
        a[i+1][j+1] = a[i][j] + a[i][j+1];    // statement S
    }
}
```

Loop permutability is important because it allows loop tiling (alternatively named loop blocking). Loop tiling is a transformation that changes the order of the iterations in the program and ensures all the iterations of a tile are executed before any iteration of the next tile. When tiling by sizes (i=2, j=4) is applied to the previous code, the result is:

```
int i,j,ii,jj a[100][100], b[100][100];
for (j = 0; j < 99; j+=4) {
    for (i = 0; i < 99; i+=2) {
        for (jj = 4*j; jj < 4*j+4; jj++) {
            for (ii = 2*i; ii < 2*i+2; ii++) {
                a[ii+1][jj+1] = a[ii][jj] + a[ii][jj+1];    // statement S
            }
        }
    }
}
```

Consider the memory locations written by the statement S. Before tiling, the locations are written in this order: a[1][1], a[1][2] ... a[1][99], a[2][1], a[2][2] ... a[2][99], a[3][1] ... After tiling, the new order of writes is the following: a[1][1], a[2][1], a[1][2], a[2][2] ... a[1][4], a[2][4], a[4][1], a[5][1], a[4][2], a[5][2] ... a[4][4], a[5][4] ... It is additionally common knowledge that loop tiling results in better locality when the same memory locations are written and read multiple times during the execution of a tile.

Loop tiling is traditionally performed with respect to tiling hyperplanes. In this example, the tiling hyperplanes used are the trivial (i) and (j) hyperplanes. In the general case, any linearly independent combination of hyperplanes may be used for tiling, provided it does not violate program semantics. For example, (i+j) and (i+2*j) could as well be used and the resulting program would be much more complex.

In reference to some embodiments, the following terminology is used: the doall and reduction indicate potential parallelism rather than actual usage of parallelism. In this case, doall indicates that a loop may be executed in a data parallel manner, while reduction indicates that a loop is a reduction, i.e., its order of execution may be permuted. We additionally decorate loop by the comment "//perm" if they can be legally permuted in the optimized program.

Another important loop transformation is loop skewing. It is common knowledge that loop permutability combined with loop skewing results in the production of parallelism. In the following permutable loops, the inner loop can be executed in parallel after loop skewing:

```
int i,j a[100][100], b[100][100];
for (i = 0; i < 100; i++) {
    for (j = 0; j < 100; j++) {
        a[i+1][j+1] = a[i][j] + a[i][j+1];
    }
}
```

After loop skewing the code is the following and the inner loop j is marked for parallel execution:

```
int i,j a[100][100], b[100][100];
for (i = 0; i < 197; i++) {
    doall (j = max(0, i-98); j <= min(98,i); j++) {
        a[i+1-j][j+1] = a[i-j][j] + a[i-j][j+1];
    }
}
```

The skewing transformation helps extract parallelism at the inner level when the loops are permutable. It is also common knowledge that loop tiling and loop skewing can be combined to form parallel tiles that increase the amount of parallelism and decrease the frequency of synchronizations and communications in the program.

The following code example illustrates contiguity of memory accesses. Given the following code:

```
int i, k, a[100][100];
doall (i = 0; i < 100; i++) {
    doall (k = 0; k < 100; k++) {
        a[k][i] = 1;
    }
}
```

The memory accesses to the array a are performed in this order a[0][0], a[1][0], ... a[99][0], a[0][1], ... a[99][1], ... a[0][99], ... a[99][99]. If the storage mode of arrays in memory is row major, then successive accesses are not contiguous in memory and may result in very long latencies of accesses.

Transformations such as loop permutations and loop skewing result in modified memory access order that can make accesses contiguous. For instance, interchanging loop i and k, assuming row major storage mode:

```
int i, k, a[100][100];
doall (k = 0; k < 100; k++) {
    doall (i = 0; i < 100; i++) {
        a[k][i] = 1;
    }
}
```

The memory accesses are now a[0][0], a[0][1], ... a[0][99], a[1][0], ... a[1][99], ... a[99][0], ... a[99][99] and the latencies of accesses are generally reduced.

The problem of jointly optimizing parallelism and, locality and contiguity of loop references by means of loop fusion, parallelism, loop permutability, loop tiling and loop skewing is a non-trivial tradeoff. It is one of the further objects of this invention to jointly optimize this tradeoff.

In certain situations, this combined tradeoff has no good solutions because trying to enforce all contiguity constraints is unfeasible. Some provided embodiments therefore relax the constraints on contiguity and exploit the hierarchical structure of the memories and execution units by creating explicit copies of the data to a memory in which latency penalties arising from non-contiguity are less expensive or inexistent. As simple illustration, consider the case of a matrix multiplication code:

```
int i, j, k, a[100][100], b[100][100], c[100][100];
for (i = 0; i < 100; i++) {
    for (i = 0; i < 100; i++) {
        for (k = 0; k < 100; k++) {
            c[i][j] = c[i][j] + a[i][k]*b[k][j];
        }
    }
}
```

All accesses to a, b and c cannot be made contiguous because the global problem is unfeasible. If k is chosen as the innermost loop, accesses to a are contiguous but not accesses to b and c. If j is chosen as the innermost loop, accesses to b and c are contiguous but not accesses to a.

It is one of the further objects of this invention to create explicit memory locations and data transfers into a secondary memory. One possible outcome after such a copy has been inserted for array a and loops j, k have been permuted is the following:

```
int i, j, k, a[100][100], b[100][100], c[100][100];
    shared    int a_1[100][100];
for (i = 0; i < 100; i++) {
    for (ij = 0; ij < 100; ji++) {
        for (kk = 0; kk < 100; kk++) {
            a_1[jj][kk] = a[jj][kk];
        }
    }
    for (k = 0; k < 100; k++) {
        for (i = 0; i < 100; i++) {
            c[i][j] = c[i][j] + a_1[i][k]*b[k][j];
        }
    }
}
```

In other embodiments, the explicit copy from a into a_1 may also change the data layout in a_1. It is a further object of this invention to modify the layout such that accesses to a_1 are contiguous too during the computation. A permutability of the jj and kk dimensions in the data layout makes the accesses to a_1 contiguous in the computation part of the program:

```
int i, j, k, a[100][100], b[100][100], c[100][100];
    shared    int a_1[100][100];
for (i = 0; i < 100; i++) {
    for (ij = 0; ij < 100; ji++) {
        for (kk = 0; kk < 100; kk++) {
            a_1[kk][jj] = a[jj][kk];
        }
    }
    for (k = 0; k < 100; k++) {
        for (i = 0; i < 100; i++) {
            c[i][j] = c[i][j] + a_1[k][j]*b[k][j];
        }
    }
}
```

In other embodiments, the execution model for the target hierarchy of execution units and memories requires explicit copying of the data in a secondary memory. It is a further object of the invention to comply with this requirement by creating explicit copies of the data to the secondary memory.

When considering high-level loop transformations, it is common practice to represent dependences in the form of affine relations. The first step is to assign to each statement in the program an iteration space and an iteration vector. Consider the program composed of the 2 loops below:

```
for (i = 1; i <= n; i++) {
    for (j = 1; j <= n; j++) {
        a[i][j] = a[i][-1 + j] + a[j][i];    // statement S
    }
}
```

The iteration domain of the statement S is D={[i, j] in Z2|1≤i≤n, 1≤j≤n}. The second step is to identify when two operations may be executed in parallel or when a producer consumer relationship prevents parallelism. This is done by identifying the set of dependences in the program. In this example, the set of dependences is: R={[[i, j], [i', j']]|i=i', j=j'-1, [i, j] in D, [i', j] in D, <S, [i, j]><<<S, [i', j']>} union {[[i, j], [i', j']]|i=j', i=j', [i, j] in D, [i', j'] in D, <S, [i, j]><<<S, [i', j']>}, where << denoted multi-dimensional lexicographic ordering. This relationship can be rewritten as: a[i,j] a[j,i] {([i, j], [j, i])|1≤j, i≤n,-j+i-1≥0} union a[i,j] a[i,j-1] {([i, j+1], [i, j])|1≤j≤n-1, 0≤i≤n}.

It is common practice to represent the dependence relations using a directed dependence graph whose nodes represent the statements in the program and whose edges represent the dependence relations. In the previous example, the dependence graph has 1 node and 2 edges. It is common practice to decompose the dependence graph in strongly connected components. Usually, strongly connected components represent loops whose semantics require them to be fused in the optimized code. There are many possible cases however and one of the objects of this invention is also to perform the selective tradeoff of which loops to fuse at which depth. It is common knowledge that a strongly connected component of a graph is a maximal set of nodes that can be reached from any node of the set when following the directed edges in the graph.

Affine Fusion

One embodiment incorporates fusion objectives into affine scheduling constraints. Affine fusion, as used herein means not just merging two adjacent loop bodies together into the same loop nests, but also include loop shifting, loop scaling, loop reversal, loop interchange and loop skewing transformations. This corresponds to general affine scheduling functions that orchestrate the order of operations in the optimized program. In the $\alpha/\beta/\gamma$ convention this means that we would like to have the ability to modify the linear part of the schedule, $\alpha$, instead of just $\beta$ and $\gamma$. Previous fusion works are mostly concerned with adjusting the $\beta$ component (fusion only) and sometimes both the $\beta$ and $\gamma$ components (fusion with loop shifting). One embodiment of the invention, produces a scheduling function used to assign a partial execution order between the iterations of the operations of the optimized program and to produce the resulting optimized code respecting this partial order.

```
for (int i = 0; i <= N; i++) {
    for (int j = 0; j <= M; j++) {
        A[i][j] = f(C[-2 + i][1 + j]);
    }
    for (int j = 0; j <= M; j++) {
        B[i][j] = g(A[i][1 + j], A[i][j], C[-1 + i][j]);
    }
    for (int j = 0; j <= M; j++) {
        C[i][j] = h(B[i][j], A[i][2 + j], A[i][1 + j]);
    }
}
```

Fusion example.

As a simple motivational example demonstrating the power of affine fusion, consider the example above. Dependencies between the loop nests prevents the loops from being fused directly, unless loop shifting is used to peel extra iterations off the first and second loops. The resulting transformation is shown below.

```
if (M >= 0) {
    for (int i = 0; i <= N; i++) {
        for (int j = -2; j <= min(M + -2, -1); j++) {
            A[i][2 + j] = f(C[-2 + i][3 + j]);
        }
        for (int j = 0; j <= M + -2; j++) {
            A[i][2 + j] = f(C[-2 + i][3 + j]);
            B[i][j] = g(A[i][1 + j], A[i][j], C[-1 + i][j]);
            C[i][j] = h(B[i][j], A[i][2 + j], A[i][1 + j]);
        }
        for (int j = max(0, M + -1); j <= M; j++) {
            B[i][j] = g(A[i][1 + j], A[i][j], C[-1 + i][j]);
```

```
        C[i][j] = h(B[i][j], A[i][2 + j], A[i][1 + j]);
      }
    }
  }
```

Result of fusion by shifting.

On the other hand, affine fusion gives a superior transformation, as shown above. In this transformation, the fusion-preventing dependencies between the loop nests are broken with a loop reversal rather than loop shifting, and as a result, no prologue and epilogue code is required. Furthermore, the two resulting loop nests are permutable. Thus we can further apply tiling and extract one degree of parallelism out of the resulting loop nests.

```
if (M >= 0) {
  for (int i = 0; i <= N; i++) /* perm=0 */ {
    for (int j = - M; j <= 0; j++) /* perm=0 */ {
      A[i][ - j] = f(C[-2 + i][1 - j]);
      B[i][ - j] = g(A[i][1 - j], A[i][ - j], C[-1 + i][ - j]);
      C[i][ - j] = h(B[i][ - j], A[i][2 - j], A[i][1 - j]);
    }
  }
}
```

Result of affine fusion.

Many prior art algorithms cannot find this transformation if their restrictions are applied. Some of the restrictions prune out the solution space based on loop reversals, and thus these algorithms can only find the loop-shifting based solutions. Another important criteria is that fusion should not be too greedy, i.e., aggressive fusion that destroys parallelism should be avoided. On the other hand, fusion that can substantially improve locality may sometimes be preferred over an extra degree of parallelism, if we already have obtained sufficient degrees of parallelism to fill the hardware resources. For instance, consider the combined matrix multiply example. This transformation is aggressive, and it gives up an additional level of synchronization-free parallelism that may be important on some highly parallel architectures. It is a further object of this invention to model the tradeoff between benefits of locality and parallelism for different hardware configurations.

The code below shows the result of only applying non-parallelism destroying fusion. The two inner i-loops are fissioned in this transformation, allowing a second level of synchronization-free parallelism.

```
      doall (int i = 0; i <= n + -1; i++) {
        doall (int j = 0; j <= n + -1; j++) {
          C[j][i] = 0;
          for (int k = 0; k <= n + -1; k++) {
            C[j][i] = C[j][i] + A[j][k] * B[k][i];
          }
        }
        doall (int j = 0; j <= n + -1; j++) {
          for (int k = 0; k <= n + -1; k++) {
            D[j][i] = D[j][i] + C[k][i] * E[j][i];
          }
        }
      }
```

Partially fusing two matrix multiplies.

Affine Fusion Formulation

The tension between fusion and scheduling implies that fusion and scheduling should be solved in a unified manner.

For any loop p, we compute a cost $\omega_p$, which measures the slowdown in execution if the loop is executed sequentially rather than in parallel. Similarly, for each pair of loop nests (p, q), we estimate upq the cost in performance if the two loops p and q remains unfused. The cost $\omega_p$ can be interpreted to be the difference between sequential and parallel execution times, and the cost upq can be interpreted as the savings due to cache or communication based locality. In one embodiment, the cost $\omega_p$ is related to a difference in execution speed between sequential operations of the at least one loop on a single execution unit in the second computing apparatus and parallel operations of the at least one loop on more than one of the at least two execution units in the second computing apparatus. In another embodiment, the cost upq is related to a difference in execution speed between operations where the pair of loops are executed together on the second computing apparatus, and where the pair of loops are not executed together on the second computing apparatus.

In an illustrative example, let the Boolean variable $\Delta_p$ denote whether the loop p is executed in sequence, and let the variable fpq denote whether the two loops p and q remain unfused, i.e. $\Delta_p=0$ means that p is executed in parallel, and fpq=0 means that edge loops p and q have been fused. Then by minimizing the weighted sum $$\sum_p w_p \Delta_p + \sum_{p,q} u_{pq} f_{pq}$$

we can optimize the total execution cost pertaining to fusion and parallelism. In some embodiment, the variable $\Delta_p$ specifies if the loop is executed in parallel in the optimized program. In another embodiment, the variable $f_{pq}$ specifies if the pair of loops are executed together in the optimized program.

In some embodiment, the value of the cost $w_p$ is determined by a static evaluation of a model of the execution cost of the instructions in the loop. In another embodiment, the value of the cost $w_p$ is determined through the cost of a dynamic execution on the second computing apparatus of at least a set of instructions representative of the code in the loop. In a further embodiment, the value of the cost $w_p$ is determined by an iterative process consisting of at least one static evaluation of a model of the execution cost and at least one dynamic execution on the second computing apparatus of at least a set of instructions representative of the code in the loop.

In some embodiment, the value of the cost $u_{pq}$ is determined by a static evaluation of a model of the execution cost of the instructions in the loop pair. In another embodiment, the value of the cost $u_{pq}$ is determined through the cost of a dynamic execution on the second computing apparatus of at least a set of instructions representative of the code in the loop pair. In a further embodiment, the value of the cost $u_{pq}$ is determined by an iterative process consisting of at least one static evaluation of a model of the execution cost and at least one dynamic execution on the second computing apparatus of at least a set of instructions representative of the code in the loop pair.

The optimization can be formulated as follows. In one embodiment, we divide up the generalized dependence graph, GDG G=(V, E) into strongly connected components (SCCs) and consider each SCC to be a separate fusible "loop" candidate. Let G'=(V', E') denote the SCC induced subgraph where V' denotes the SCCs and E' the edges between SCCs. Given a node v ∈ V, let sec(v) denote the component in which v belongs to in the SCC decomposition. Given (p, q) E E', let the Boolean variables $f_{pq}$ denote whether two SCCs has been fused, i.e., $f_{pq}=0$ denotes that the loops corresponding to p and q have been fused.

$$f_{pq} \in \{0,1\}, (p,q) \in E' \quad (5)$$

$$f_{pq}=0 \Leftrightarrow \text{loops p and q are fused} \quad (6)$$

There are multiple possible strategies to encode the restrictions implied by E'. In one embodiment, we directly encode the transitivity relation E' as constraints, i.e. (i) given edges (p,q) and (q,r) and (p,q'), if loops (p,q) or (q,1') is not fused then (p,r) cannot be fused, and (ii) if (p, q) and (q, r) are fused then (p, q) must be fused:

$$f_{pq}, f_{qr} \leq f_{pr}, (p,q),(q,r),(p,r) \in E' \quad (7)$$

$$f_{pq}+f_{qr} \geq f_{pr}, (p,q),(q,r),(p,r) \in E' \quad (8)$$

One potential deficiency of this strategy is that up to $O(|V'|^3)$ constraints are required. In the second embodiment we adopt, involves the encoding of the $\beta$ schedule coordinates directly in the constraints. In this encoding, $\beta_p=\beta_q$ implies that loops p and q have been fused:

$$\beta_p \in \{0,|V'|-1\} \, p \in V' \quad (9)$$

$$\beta_p \geq \beta_q + f_{pq}(p,q) \in E' \quad (10)$$

$$\beta_q - \beta_p \geq -|V'|f_{pq}, (p,q) \in E' \quad (11)$$

Given the constraints on $f_{pq}$ in place, we can now provide a suitable modification to the schedule constraints. The constraints are divided into two types, the first involves edges within the same SCC, and the second involves edges crossing different SCCs:

$$\delta_p(y) \geq \phi_{s(e)}(j,y) - \phi_{t(e)}(i,j) \geq 0, \quad (12)$$

(i,j) $\in R_e(y)$,
p=scc(s(e)),
q=scc(t(e))
  p=q $$\delta_{pq}(y) \geq \phi_{s(e)}(j,y) - \phi_{t(e)}(i,y) \geq -N_{\infty}f_{pq}(y), \quad (13)$$

(i,j) $\in R_e(y)$,
p=scc(s(e)),
q=scc(t(e)),
  p≠q $$f_{pq}(y)=f_{pq}(yl+yk+1) \quad (14)$$

Here, the term $-N_{\infty}f_{pq}(y)$ is defined in such a way that $-N_{\infty}f_{pq}(y)=0$ when $f_{pq}=0$, and is equal to a sufficiently large negative function when $f_{pq=1}$. Thus, $\phi_{s(e)}(j,y)-\phi_{t(e)}(i,y) \geq 0$ only needs to hold only if the edge e has been fused or is a loop-carried edge. The final set of constraints is to enforce the restriction that $\delta_p(y)=\delta_q(y)$ if (p, q) has been fused. The constraints encoding this are as follows:

$$\delta_p(y) - \delta_q(y) + N_{\infty fpq}(y) \geq 0 \, (p,q) \in E' \quad (15)$$

$$\delta_q(y) - \delta_p(y) + N_{\infty fpq}(y) \geq 0 \, (p,q) \in E' \quad (16)$$

$$\delta_{pq}(y) - \delta_p(y) + N_{\infty fpq}(y) \geq 0 \, (p,q) \in E' \quad (17)$$

Some embodiments additionally specify that a schedule dimension at a given depth must be linearly independent from all schedule dimensions already computed. Such an embodiment computes the linear algebraic kernel of the schedule dimensions found so far. In such an embodiment, for a given statement S, h denotes the linear part of $\phi$ S, the set of schedule dimensions already found and J denotes a subspace linearly independent of h. A further embodiment derives a set of linear independence constraints that represent Jh≠0 and does not restrict the search to Jh>0. Such linear independence constraints may be used to ensure successive schedule dimensions are linearly independent. In particular, such an embodiment, that does not restrict the search to Jh>0, exhibits an optimization process that can reach any legal multidimensional affine scheduling of the received program including combinations of loop reversal.

In some embodiments the set of conditions preserving semantics is the union of all the constraints of the form $\phi_{s(e)}(j,y)-\phi_{t(e)}(i,y) \geq 0$. In another embodiment, the optimizing search space that encompasses all opportunities in parallelism and locality is the conjunction of all the constraints (5)-(17).

In further embodiments, the set of affine constraints (12) and (13) is linearized using the affine form of Farkas lemma and is based on at least one strongly connected component of the generalized dependence graph.

In other embodiments, the constraints of the form (12) are used to enforce dimensions of schedules of loops belonging to the same strongly connected component are permutable.

In further embodiments, the constraints of the form (13) are used to ensure that dimensions of schedules of loops that are not executed together in the optimized program do not influence each other. In such embodiments, the constraints of the form (13) use a large enough constant to ensure that dimensions of schedules of loops that are not executed together in the optimized program do not influence each other.

In some embodiments, the linear weighted sum $$\sum_p w_p \Delta_p + \sum_{p,q} u_{pq} f_{pq}$$

can be optimized directly with the use of an integer linear programming mathematical solver such as Cplex. In other embodiments, a non-linear optimization function such as a convex function may be optimized with the use of a convex solver such as CSDP. Further embodiments may devise non-continuous optimization functions that may be optimized with a parallel satisfiability solver.

Boolean $\Delta$ Formulation

The embodiments described so far depend on a term (or multiple terms) $\delta(y)$ which bounds the maximal dependence distance. Another embodiment may opt for the following simpler formulation. First, we assign each SCC p in the GDG a Boolean variable $\Delta_p$ where $\Delta_p=0$ means a dependence distance of zero (i.e., parallel), and $\Delta_p=1$ means some non-zero dependence distance:

$$\Delta_p \in \{0,1\} \, p \in V' \quad (18)$$

Define the functions $\Delta p(y)$ and $\Delta pq(y)$ as:

$$\Delta_p(y)=\Delta_p \times (yl+\ldots+yk+1) \quad (19)$$

$$\Delta_{pq}(y)=\Delta_{pq} \times (yl+\ldots+yk+1) \quad (20)$$

Then the affine fusion constraints can be rephrased as follows:

$$N_{\infty}\Delta_p(y) \geq \phi_{s(e)}(j,y) - \phi_{t(e)}(i,y) \geq 0, \quad (21)$$

(i, j) $\in R_e(y)$,
p=scc(s(e)),
q=scc(t(e))
  if p=q $$N_{\infty}\Delta_{pq}(y) \geq \phi_{s(e)}(j,y) - \phi_{t(e)}(i,y \geq -N_{\infty fpq}(y), \quad (22)$$

(i,j) ∈ $R_e(y)$,
p=scc(s(e)),
q=scc(t(e))
  if p≠q $$F_{pq}(y) = f_{pq}(y1 + \ldots + yk+1) \tag{23}$$

$$\Delta_p - \Delta_q + f_{pq} \geq 0 \; (p,q) \in E' \tag{24}$$

$$\Delta_q - \Delta_p + f_{pq} \geq 0 \; (p,q) \in E' \tag{25}$$

$$\Delta_{pq} - \Delta_p + f_{pq} \geq 0 \; (p,q) \in E' \tag{26}$$

Multi-Dimensional Affine Fusion

Figure 22:
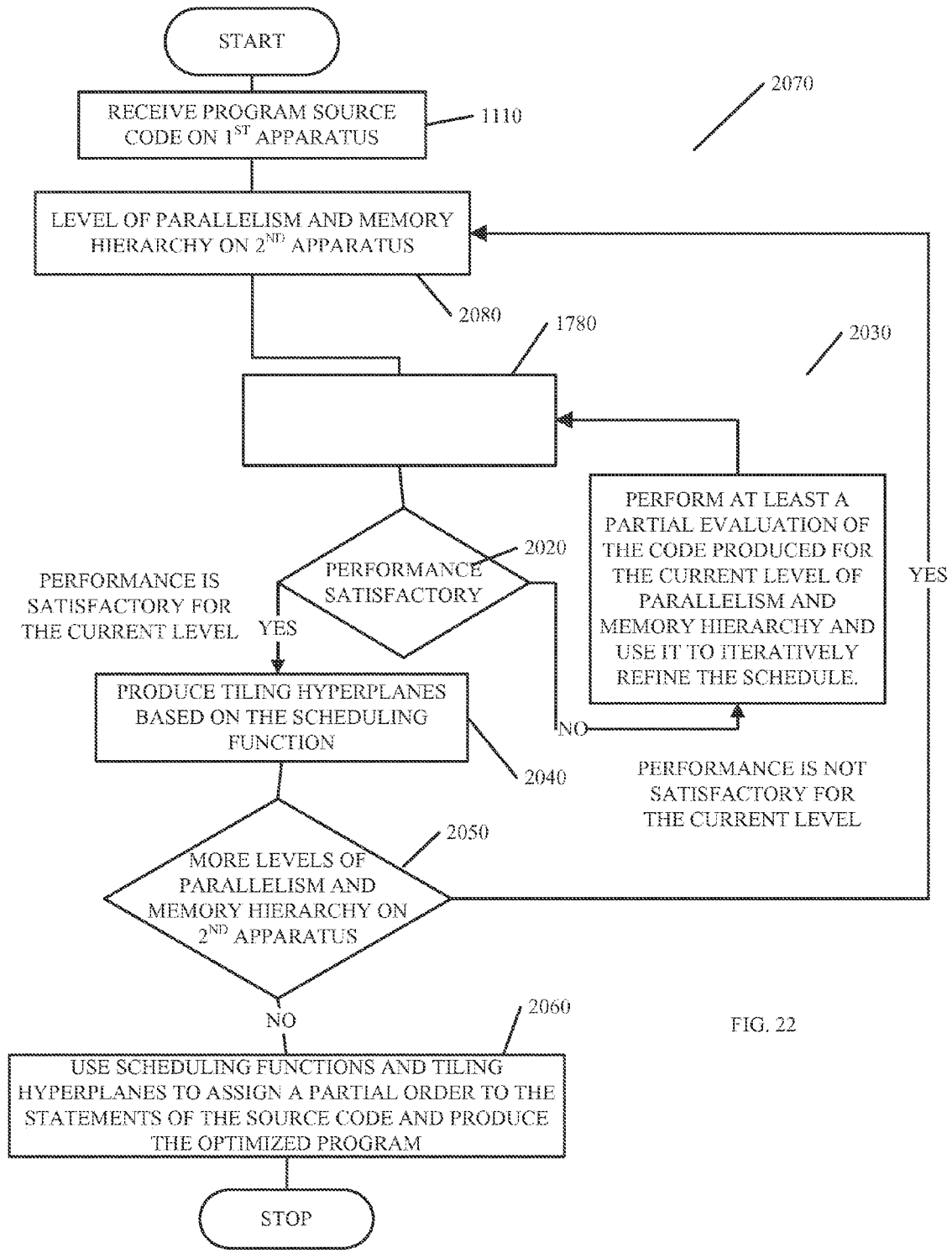
FIG. 22 illustrates an embodiment of a provided method.

Affine fusion formulation is a depth by depth optimization embodiment. A further embodiment described in FIGS. 19A, 19B, 19C, 20A and 20B shows a method to derive scheduling functions for a given hardware parallelism and memory hierarchy. A further embodiment described in FIG. 22 shows a method to derive scheduling functions for multiple levels of hardware parallelism and memory hierarchies, more specifically by formulating and optimizing at least one global weighted parametric function for each level of the parallelism and memory hierarchy of the second computing apparatus. In a further embodiment, it is a further object of the invention to build a single multi-dimensional affine fusion formulation as an alternative or as a supplement to the depth-by-depth affine fusion formulation. The single multi-dimensional fusion formulation relies on a single multi-dimensional convex affine space. More specifically, an embodiment of such a single multi-dimensional convex affine space assigns variables and relations for loops, loops pairs and dependence edges e at each scheduling dimension k.

The variables and their interpretations are:
$\delta_e^k(y)$—the maximal dependence distance for edge e in dimension k.
$\delta^k(y)$—the maximal dependence distance for the loop in which statement a resides, in dimension k. If L is a loop (SCC) in dimension k then for all statements a, b, ∈l, $\delta_a^k(y) = \delta_b^k(y)$.
$\beta_{k_a}$—the strongly connected component index (loop number) in which statement a appears.
$\phi_a^k(i)$—schedule of statement a in dimension k.
$\epsilon_e^k$—equal to 1 if the schedule at dimension k strictly satisfy e, i.e., $\phi_{s(e)}^k(i,y) - \phi_{t(e)}^k(j,y) \geq 1, e \in E$.
$p_e^k$—a Boolean variable, 0 only if $\epsilon_e^{k-1} = \epsilon_e^k = 1$.
$p_a^k$—a Boolean variable, 0 only if the schedules in dimensions k−1 and k are permutable in the loop in which a resides. If a and b belongs to the same loop in dimension k, then $p_a^k = p_b^k$.

$$\delta_e^k(y) \geq \phi_{s(e)}^k(i,y) - \phi_{t(e)}^k(j,y) \geq \epsilon_e^k - N_\infty \left( \sum_{k'<k} \epsilon_e^{k'} \right) \tag{27}$$

$(i, j) \in R_e(y)$ $$\epsilon_e^k \in \{0, 1\} \tag{28}$$
$e \in E$ $$\epsilon_e^e \in \{0\} \tag{29}$$
$e \in E$ The following constraints ensure that $p_e^k = 0$ only if $\epsilon_e^{k-1} = 1$ and $\epsilon_e^k = 1$:

$$p_e^k \in \{0,1\} \; e \in E \tag{30}$$

$$\epsilon_e^{k-1} \epsilon_e^k + 2 p_e^k \geq 2, e \in E \tag{31}$$

The next constraints encode the β component of the schedules.

$$\beta_e^k \in \{0, |V| - 1\} \tag{32}$$

$$\beta_{s(e)}^k - \beta_{t(e)}^k \geq -N_\infty \left( \sum_{k'<k} \epsilon_e^{k'} \right) e \in E \tag{33}$$

The next set of constraints ensures that all $\delta_a^k(y)$ terms are the same for all nodes a which belong to the same loop nest:

$$\delta_{s(e)}^k(y) - \delta_e^k(y) \leq N_\infty(\beta_{s(e)}^k - \beta_{t(e)}^k) \; e \in E \tag{34}$$

$$\delta_s^k(y)(y) - \delta_{s(e)}^k(y) \leq N_\infty(\beta_{s(e)}^k - \beta_{t(e)}^k) \; e \in E \tag{35}$$

$$\delta_{t(e)}^k(y) - \delta_e^k(y) \leq N_\infty(\beta_{s(e)}^k - \beta_{t(e)}^k) \; e \in E \tag{36}$$

$$\delta_e^k(y) - \delta_{t(e)}^k(y) \leq N_\infty(\beta_{s(e)}^k - \beta_{t(e)}^k) \; e \in E \tag{37}$$

$$\delta_{s(e)}^k(y) - \delta_{t(e)}^k(y) \leq N_\infty(\beta_{s(e)}^k - \beta_{t(e)}^k) \; e \in E \tag{38}$$

$$\delta_{t(e)}^k(y) - \delta_{s(e)}^k(y) \leq N_\infty(\beta_{s(e)}^k - \beta_{t(e)}^k) \; e \in E \tag{39}$$

Similarly, the next set of constraints ensure that all $p_a^k$ are identical for all nodes a which belong in the same loop nest.

$$p_{s(e)}^k - p_e^k \leq N_\infty(\beta_{s(e)}^k - \beta_{t(e)}^k) \; e \in E \tag{40}$$

$$p_s^k - p_{t(e)}^k \leq N_\infty(\beta_{s(e)}^k - \beta_{t(e)}^k) \; e \in E \tag{41}$$

$$p_{s(e)}^k - p_{t(e)}^k \leq N_\infty(\beta_{s(e)}^k - \beta_{t(e)}^k) \; e \in E \tag{42}$$

$$p_{t(e)}^k - p_{s(e)}^k \leq N_\infty(\beta_{s(e)}^k - \beta_{t(e)}^k) \; e \in E \tag{43}$$

In some embodiment, the strong satisfaction variable E_{k,e} assigned to each schedule dimension k and each edge e of the at least one strongly connected component is $\epsilon_e^k$ which is equal to 1 when the schedule difference at dimension k strictly satisfies edge e (i.e. when $\phi_{s(e)}^k(i,y) - \phi_{t(e)}^k(j, y) \geq 1$, e∈E), 0 otherwise. In other embodiments, the loop permutability Boolean variable p_{k,e} assigned to each schedule dimension and each edge e of the at least one strongly connected component is $p_e^k$.

In a further embodiment the statement permutability Boolean variable p_{k,a} assigned to each schedule dimension and each statement a of the at least one strongly connected component is $p_a^k$. In another embodiment, constraints of the form (27), (28) and (29) are added to ensure dimensions of schedules of statements linked by a dependence edge in the generalized dependence graph do not influence each other at depth k if the dependence has been strongly satisfied up to depth k−1. In a further embodiment, constraints of the form (30) and (31) are added to link the strong satisfiability variables to the corresponding loop permutability Boolean variables. In another embodiment, constraints of the form (34) to (43) are added to ensure statement permutability Boolean variables are equal for all the statements in the same loop nest in the optimized program. In a further embodiment, the conjunction of the previous constraints forms a single multi-dimensional convex affine search space of all legal multi-dimensional schedules that can be traversed exhaustively or using a speeding heuristic to search for schedules to optimize any global cost function.

One example of an embodiment tailored for successive parallelism and locality optimizations is provided for an architecture with coarse grained parallel processors, each of them featuring fine grained parallel execution units such as SIMD vectors. One such architecture is the Intel Pentium E 5300. The following example illustrates how an embodiment of the invention computes schedules used to devise multi-level tiling hyperplanes and how a further embodiment of the invention may compute different schedules for different levels of the parallelism and memory hierarchy of the second computing apparatus. Consider the following code representing a 3-dimensional Jacobi iteration stencil. In a first loop, the array elements A[i][j][k] are computed by a weighted sum of the 7 elements, B[i][j][k], B[i−1][j][k], B[i+1][j][k], B[i][j−1][k], B[i][j+1][k], B[i][j][k−1] and B[i][j][k+1]. In a symmetrical second loop, the array elements B[i][j][k] are computed by a weighted sum of 7 elements of A. The computation is iterated Titer times.

```
for (t=0; t<Titer; t++) {
    for (i=1; i<N-1; i++) {
        for (j=1; j<N-1; j++) {
            for (k=1; k<M-1; k++) {
                A[i][j][k] = C0*B[i][j][k] + C1*(sum(B[...][...][...]);
                // S0(i,j,k);
            }}}
    for (i=1; i<N-1; i++) {
        for (j=1; j<N-1; j++) {
            for (k=1; k<M-1; k++) {
                B[i][j][k] = C0*A[i][j][k] + C1*(sum(A[...][...][...]));
                // S1(i,j,k); }}}}
```

When computing a schedule for the first level of parallelism (the multiple cores) embodiments may produce the following optimized code in which permutable loops are marked as such.

```
for (i=0; i<=Titer-1; i++) /* perm*/ {
    for (j=0; j<=254; j++) /* perm */ {
        for (k=max(j-253, 2*i); k<=min(2*i+254,j+253); k++) /* perm */ {
            for (l=max(2*i, k+-253, j-253); l<=min(j+254, 2*i+255, k+254);
            l++) /* perm */ {
                if (j<=253 && 2*i-k>=-253 && 2*i-l>=-254) {
                    S0(j+1; k-2*i+1, l-2*i+1);
                }
                if (j>=1 && -2*i+k>=1 && -2*i+l>=1) {
                    S1(j, k-2*i, l-2*i);
}}}}
```

In this form, the loops have been fused at the innermost level on loop l and the locality is optimized. Loop tiling by tiling factors (16, 8, 8, 1) may be applied to further improve locality and the program would have the following form, where the inner loops m, n, o are permutable.

```
for (i=0; i<=floorDiv(Titer -1, 16); i++) { /* perm*/
    for (j=2*i; j<=min(2*i+17, floorDiv(Titer+126, 8)); j++) { /* perm*/
        for (k=max(2*i, j-16); k <= min(floorDiv(Titer+126, 8), j+16,
        2*i+17); k++) { /* perm*/
            for (l=max(16*i, 8*k-127, 8*j-127); l<=min(Titer-1, 8*k+7,
            16*i+15, 8*j+7); l++)
{
/* perm*/
for (m .....) /* perm */
    for (n .....) /* perm */
        for (o .....) /* perm */
            if (condition1) {
                S0(m,n,o)
            }
            if (condition2) {
                S1(m,n,o); }}}}}}}
```

Without further optimization, the loops are fused on all loops i,j,k,l,m,n and o. The program does not take advantage of fine grained parallelism on each processor along the loops m, n and o. Embodiments allow the optimization of another selective tradeoff to express maximal innermost parallelism at the expense of fusion. The selective tradeoff gives a much more important cost to parallelism than locality and embodiments may finds a different schedule for the intra-tile loops that result in a program that may display the following pattern:.

```
for (i=0; i<=floorDiv(Titer -1, 16); i++) { /* perm */
    for (j=2*i; j<=min(2*i+17, floorDiv(Titer+126, 8)); j++) { /* perm */
        for (k=max(2*i, j-16); k <= min(floorDiv(Titer+126, 8), j+16, 2*i+17); k++) { /*
perm */
            for (l=max(16*i, 8*k-127, 8*j-127); l<=min(Titer-1, 8*k+7, 16*i+15, 8*j+7); l++) {
                /* perm */
                if (-8*k+l>=-126) {
                    doall (m = max(0, 16 * j -2 * l); m <= min(16 * j -2 * l + 15, 253); m++) {
                        doall (n = max(0, 16 * k -2 * l); n <= min(16 * k -2 * l + 15, 253); n++) {
                            doall (o = 0; o <= 254; o++) {
                                S0(1 + m,1 + n,1 + o);
}}}}
                doall (m=max(0, 16*j-2*l-1); m<=min(16*j-2*l+14, 253); m++) {
                    doall (n=max(16*k-2*l-1, 0); n <= min(253, 16*k-2*l+14); n++) {
                        doall (o=0; o<=254; o++) {
                            S1(1 + m,1 + n,1 + o);
}}}}}}}
```

The innermost doall dimensions may further be exploited to produce vector like instructions while the outermost permutable loops may be skewed to produce multiple dimensions of coarse grained parallelism.

In a further embodiment, the schedules that produce the innermost doall dimensions may be further used to produce another level of multi-level tiling hyperplanes. The resulting code may have the following structure:

```
for (i=0; i<=floorDiv(Titer -1, 16); i++) { /* perm */
    for (j=2*i; j<=min(2*i+17, floorDiv(Titer+126, 8)); j++) { /* perm */
        for (k=max(2*i, j-16); k <= min(floorDiv(Titer+126, 8), j+16, 2*i+17);
        k++) {
            /* perm */
            for (l=max(16*i, 8*k-127, 8*j-127); l<=min(Titer-1, 8*k+7, 16*i+15,
            8*j+7); l++) {
                /* perm */
                if (-8*k+l>=-126) {
                    doall (m ...) {
                        doall (n ...) {
                            doall (o ...) {
                                doall (p ...) {
                                    doall (q ...) {
                                        doall (r ...) {
                                            S0(1 + p,1 + q,1 + r);
```

```
}}}}}}}
doall (m ...) {
    doall (n ...) {
        doall (o ...) {
            doall (p ...) {
                doall (q ...) {
                    doall (r ...) {
                        S1(1 + p,1 + q,1 + r);
}}}}}}}}}
```

In the following example, dependencies between the loop nests prevent the loops from being fused directly, unless loop shifting is used to peel extra iterations off the first and second loops. The resulting transformation is illustrated in the code below.

```
if (M >= 0) {
    for (int i = 0; i <= N; i++) {
        for (int j = -2; j <= min(M + -2, -1); j++) {
            A[i][2 + j] = f(C[-2 + i][3 + j]);
        }
        for (int j = 0; j <= M + -2; j++) {
            A[i][2 + j] = f(C[-2 + i]J[3 + j]J);
            B[i][j] = g(A[i][1 + j], A[i][j], C[-1 + i][j]);
            C[i] [j] = h(B[i][j], A[i][2 + j], A[i][1 + j]);
        }
        for (int j = max(0, M + -1); j <= M; j++) {
            B[i] [j] = g(A[i] [1 + j], A[i][j], C[-1 + i][j]);
            C[i] [j] = h(B[i] [j], A[i] [2 + j], A[i] [1 + j]);
}}}
```

On the other hand, affine fusion (i.e., fusion combined with other affine transformations) gives a superior transformation, as shown below. In this transformation, the fusion-preventing dependencies between the loop nests are broken with a loop reversal rather than loop shifting, and as a result, no prologue or epilogue code is required. Furthermore, the two resulting loop nests are permutable. In some embodiments, tiling and extraction of one degree of parallelism out of the resulting loop nests is performed.

```
if (M >= 0) {
    for (int i = 0; i <= N; i++) { // permutable
        for (int j = - M; j <= 0; j++) { // permutable
            A[i] [ - j] f(C[-2 + i] [1 - j]);
            B[i][ - j] g(A[i][1 - j], A[i][ - j], C[-1 + i][- j]);
            C[i] [ j] h(B[i] [ - j], A[i] [2 j], A[i] [1 - j]);
}}}
```

In some embodiments loop fusion is limited to not be too greedy, i.e., aggressive fusion that destroys parallelism should be avoided. On the other hand, fusion that can substantially improve locality may sometimes be preferred over an extra degree of parallelism, if we already have; obtained sufficient degrees of parallelism to exploit the hardware resources. For example, given the following code:

```
for (int i = 0; l <= -1 + n; i++{
    for (int j = 0; j <= -1+n j++) {
        C[i] [j] = 0;
}}
for (int i = 0; i <= -1 + n; i++) {
    for (int j = 0; j <= -1 + n; j++) {
        for (int k 0; k <= -1 +n; k++) {
            C[i] [j] = C[i] [j] + A[i] [k] * B[k] [j];
}}}
for (int i = 0; i <= -1 + n; i++) {
```

```
    for (int j = 0; j <= -1 + n; j++) {
        for (int k 0; k <= -1 + n; k++) {
            D[i] [j] = D[i] [j] + C[k] [j] * E[i] [j];
}}}
```

If fusion is applied too aggressively, it gives up an additional level of synchronization-free parallelism.

```
doall (int i = 0; i <= n + -1; i++) {
    for (int j = 0; j <= n + -1; j++) {
        C[j] [i] = 0;
        for (int k = 0; k <= n+-1; k++{
            C[j] [i] = C[j][i] + A[j][k * B[k][i]
        }
        doall (int k = 0; k <= n + -1; k++) {
            D[k] [i] = D[k] [i] + C[j] [i] * E[k] [i] ;
}}}
```

The below code illustrates the result of only applying fusion that does not destroy parallelism. The two inner j-loops are fissioned in this transformation, exposing a second level of synchronization-free parallelism.

```
doall (int i = 0; i <= n + -1; i++) {
    doall (int j = 0; j <= n + -1; j++)
        C[j] [i] = 0;
        for (int k 0; k <= n + -1; k++) {
            C[j] [i] = C[j] [i] + A[j] [k] * B[k] [i];
    }}
    doall (int j = 0; j <= n + -1; j++) {
        for (int k 0; k <= n + -1; k++) {
            D[j] [i] = D[j] [i] + C[k] [i] * E [j] [i];
}}}
```

Figure 13:
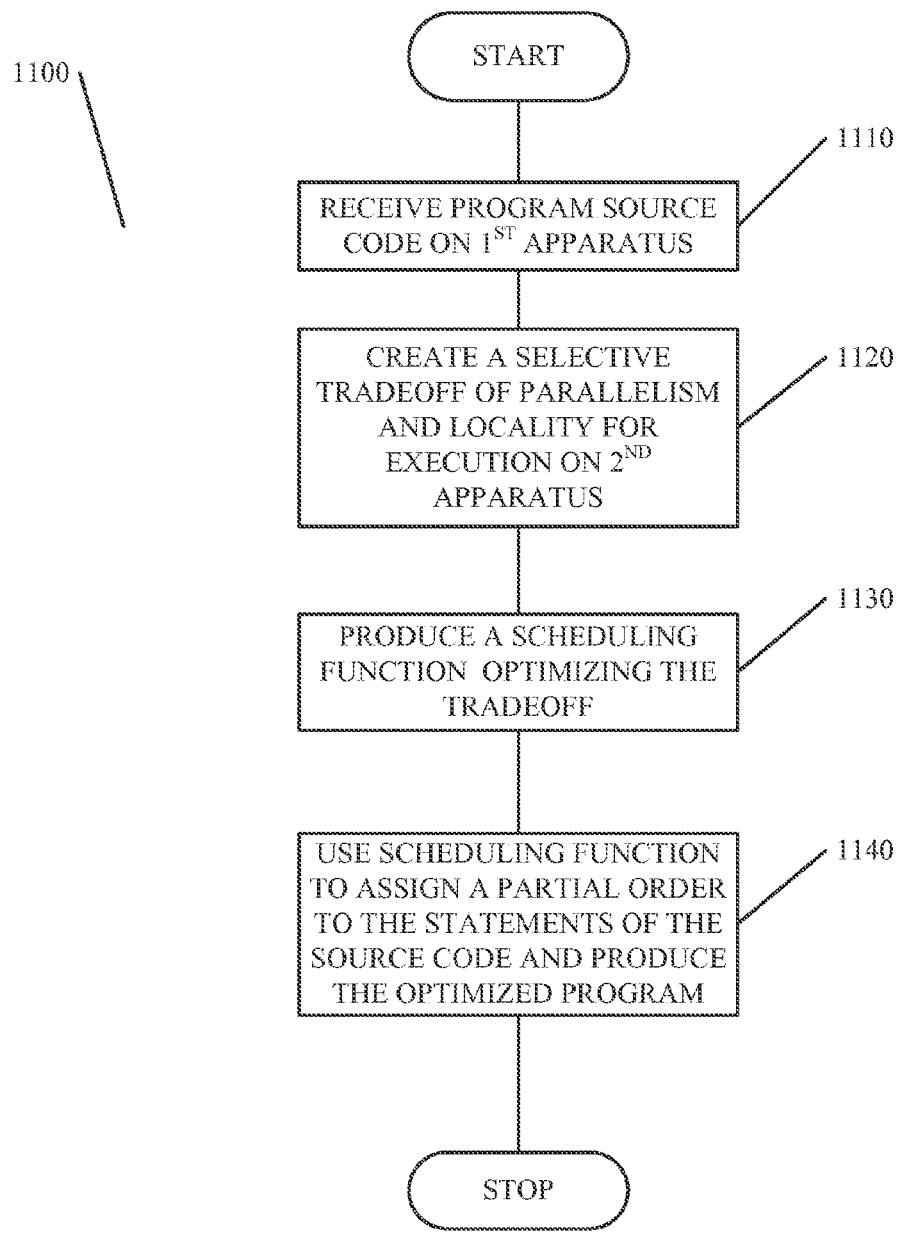
FIG. 13 illustrates an embodiment of a provided method

The above illustrates that this tension between fusion and scheduling implies that fusion and scheduling should be solved in a unified manner. Turning now to FIG. 13 where the flow of provided method 1100 of source code optimization is illustrated. Flow begins in block 1110 where source code is received in memory 1050 on a custom first computing apparatus 1010(a). Flow continues to block 1120 where a selective tradeoff of parallelism and locality is created for execution of the code on the second computing apparatus 1010(b). Flow then continues to block 1130 where a scheduling function is produced which optimizes the selective tradeoff. Flow then continues to block 1140 where the scheduling function is used to assign a partial order to the statements of the source code and an optimized program is produced for execution on the second computing apparatus 1010(b). In one embodiment, the received program code contains at least one arbitrary loop nest. As previously discussed the custom first computing apparatus 1010(a) contains memory 1050, a storage medium 1060 and at least one processor with a multi-stage execution unit.

Figure 14:
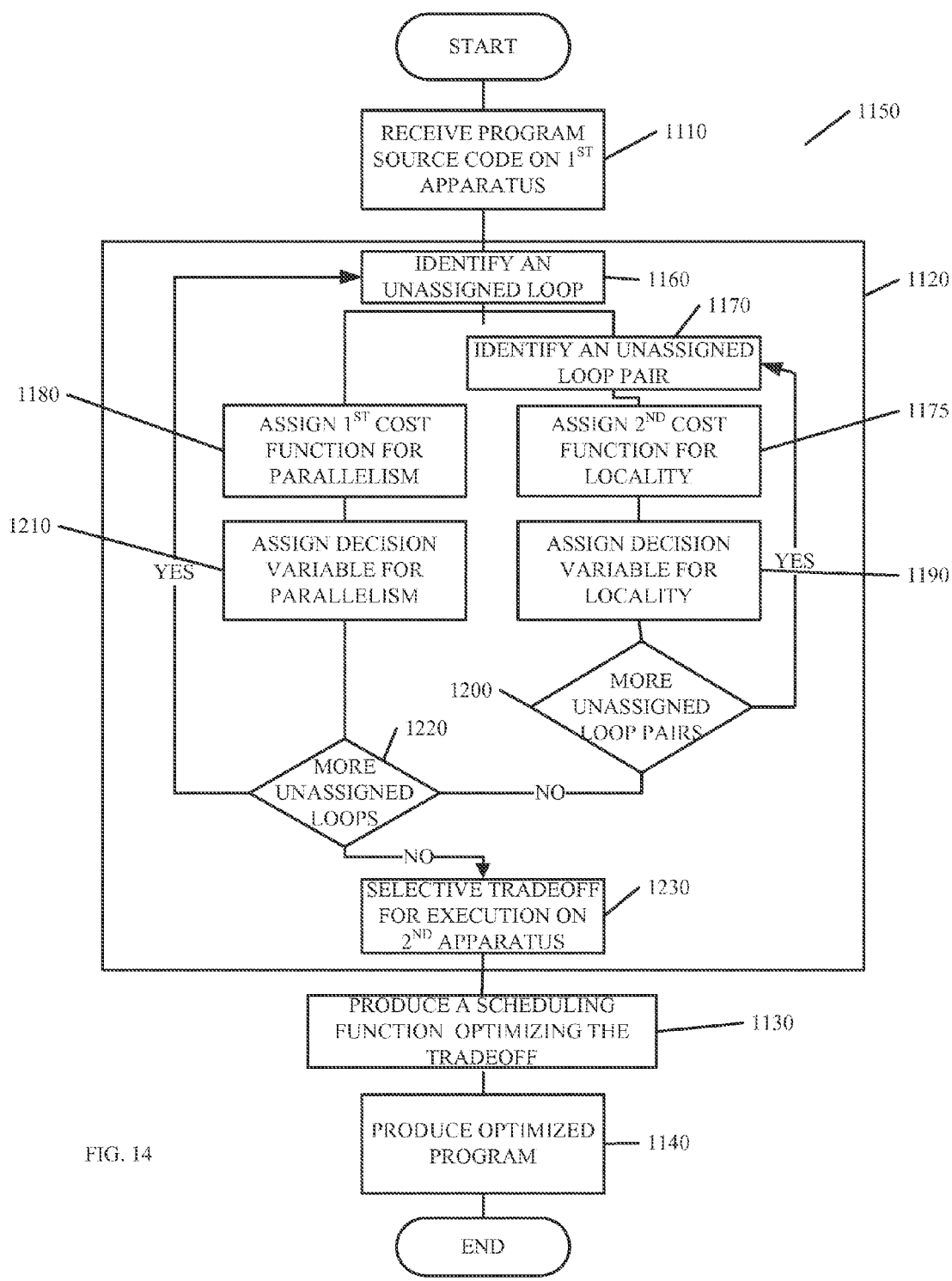
FIG. 14 illustrates an embodiment of a provided method.

A provided method 1150 for source code optimization is illustrated in FIG. 14. In this embodiment, flow begins in block 1110 where source code is received in memory 1050 on a custom first computing apparatus 1010(a). Flow continues to block 1120 where the code is optimized in terms of both locality and parallelism for execution on a second computing apparatus 1010(b). In this embodiment, the optimization block 1120 additionally includes additional functional blocks. Within block 1120 flow begins with block 1160 where an unassigned loop is identified. Flow then continues on two paths. In a first path flow continues to block 1180 where a first cost function is assigned in block 1180. This first cost function is related to a difference in execution speed between parallel and sequential operations of the statements within the loop on second computing apparatus 1010(*b*). Flow then continues to block 1210 where a decision variable is assigned to the loop under consideration, this decision variable indicating whether the loop is to be executed in parallel in the optimized program. In some embodiments the cost is determined through static evaluation of a model of the execution cost of the instructions in the loop under consideration. In other embodiments, the cost is determined through a dynamic execution on the second computing apparatus of at least a set of instructions representative of the code in the loop under consideration. In a further embodiment, the cost is determined by an iterative refining process consisting of at least one static evaluation of a model of the execution cost and at least one dynamic execution on the second computing apparatus of at least a set of instructions representative of the code in the loop under consideration. Flow then continues to decision block 1220 where it is determined if there are additional unassigned loops.

As used herein, "executed together" means fused in the sense of the code examples (0032)-(0037). Specifically executed together means that loops that are consecutive in the original program become interleaved in the optimized program. In particular, loops that are not "executed together" in the sense of loop fusion can be executed together on the same processor in the more general sense. In the second optimization path illustrated in FIG. 14 flow continues from block 160 to block 1170 where an unassigned loop pair is identified. Flow then continues to block 1175 where a second cost function is assigned for locality optimization. This second cost function is related to a difference in execution speed between operations where the loops in the pair of loops are executed together on the second computing apparatus, and where the loops in the pair of loops are not executed together on the second computing apparatus. Flow then continues to block 1190 where a decision variable is assigned for locality. This second decision variable specifying if the loops in the loop pair under consideration are to be executed together in the optimized program. In one embodiment, the second cost is determined through static evaluation of a model of the execution cost of the instructions in the at least one loop pair.

In another embodiment, the second cost is determined through of a dynamic execution on the second computing apparatus of at least a set of instructions representative of the code in the at least one loop pair. In a further embodiment, the cost is determined through an iterative refining process consisting of at least one static evaluation of a model of the execution cost and at least one dynamic execution on the second computing apparatus of at least a set of instructions representative of the code in the at least one loop pair. Flow then continues to decision block 1200 where it is determined if additional unassigned loop pairs exist. If additional unassigned loop pairs exist, flow continues back to block 1170 and the process iterates until no additional unassigned loop pairs are found. When decision block 1200 determines no additional loop pairs are present, flow continues to decision block 1220. If in decision block 1220 it is determined that additional unassigned loops exist, flow continues back to block 1160 and the process iterates until no additional unassigned loops may be identified. Flow then continues to block 1230 where a selective tradeoff is created for locality and parallelism during the execution on second computing apparatus 1010(*b*). Flow then continues to block 1130 where a scheduling function is produced that optimizes the selective tradeoff. Flow then continues to block 1140 where optimized code is produced.

Figure 15:
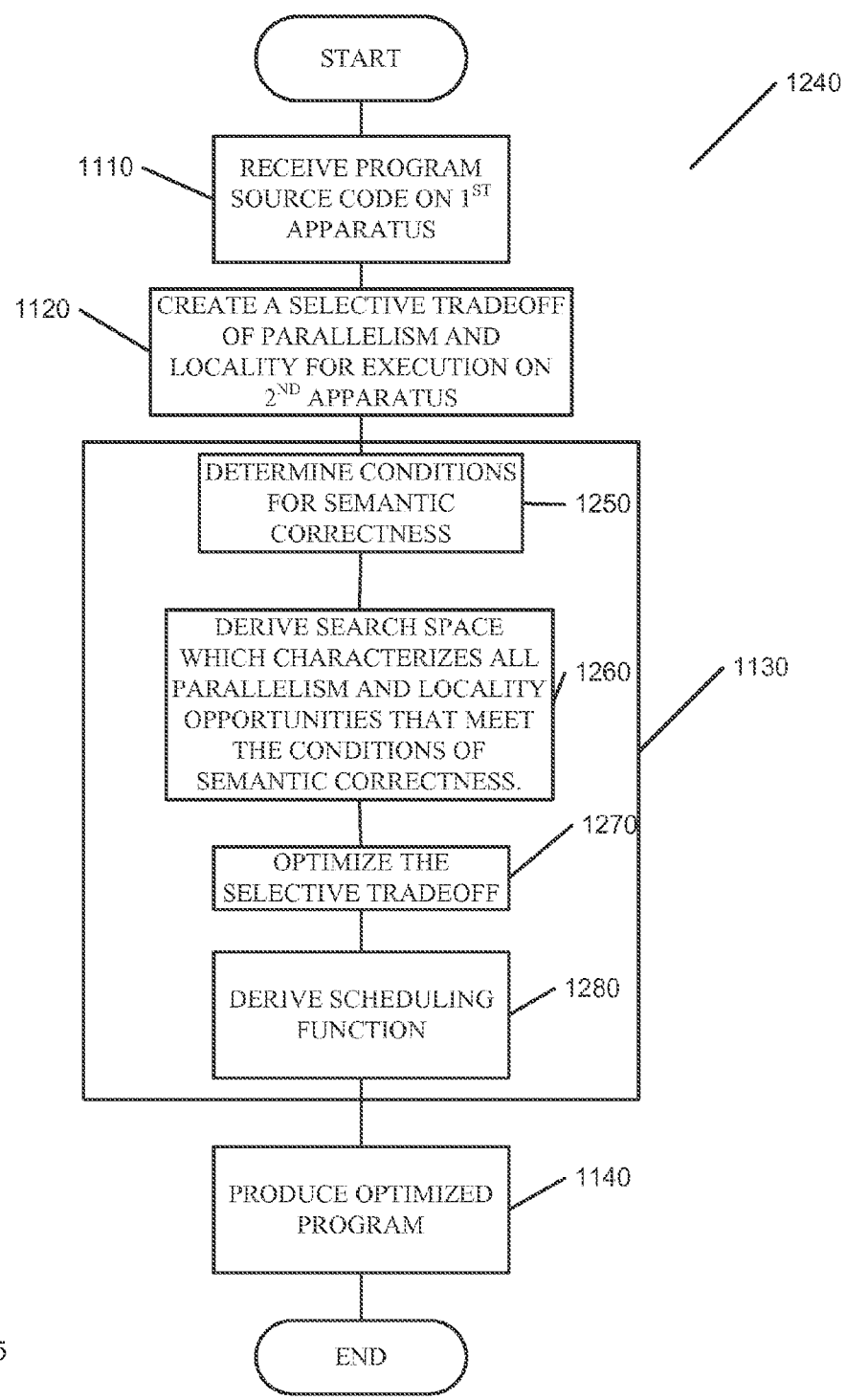
FIG. 15 illustrates an embodiment of a provided method.

The flow of a further provided embodiment of a method 1240 for source code optimization is illustrated in FIG. 15. In this embodiment, flow begins in block 1110 where source code is received in memory 1050 on a custom first computing apparatus 10(*a*). Flow continues to block 1120 where the code is optimized in terms of both locality and parallelism for execution on a second computing apparatus 1010(*b*). Flow then continues to block 1130 where a scheduling function is produced that optimizes the tradeoff. In this embodiment, the scheduling function block 1130 additionally includes additional functional blocks. Within block 1130 flow continues to block 1250 where the conditions for semantic correctness of the program are determined. Flow then continues to block 1260 where a search space is derived that meet the conditions for semantic correctness. In one embodiment, the search space characterizes all parallelism and locality opportunities that meet the conditions of semantic correctness. Flow then continues to block 1270 where the selective trade off is optimized. Flow then continues to block 1280 where the scheduling function is derived from the optimized tradeoff. Flow then continues to block 1140 where optimized code is produced.

Figure 16:
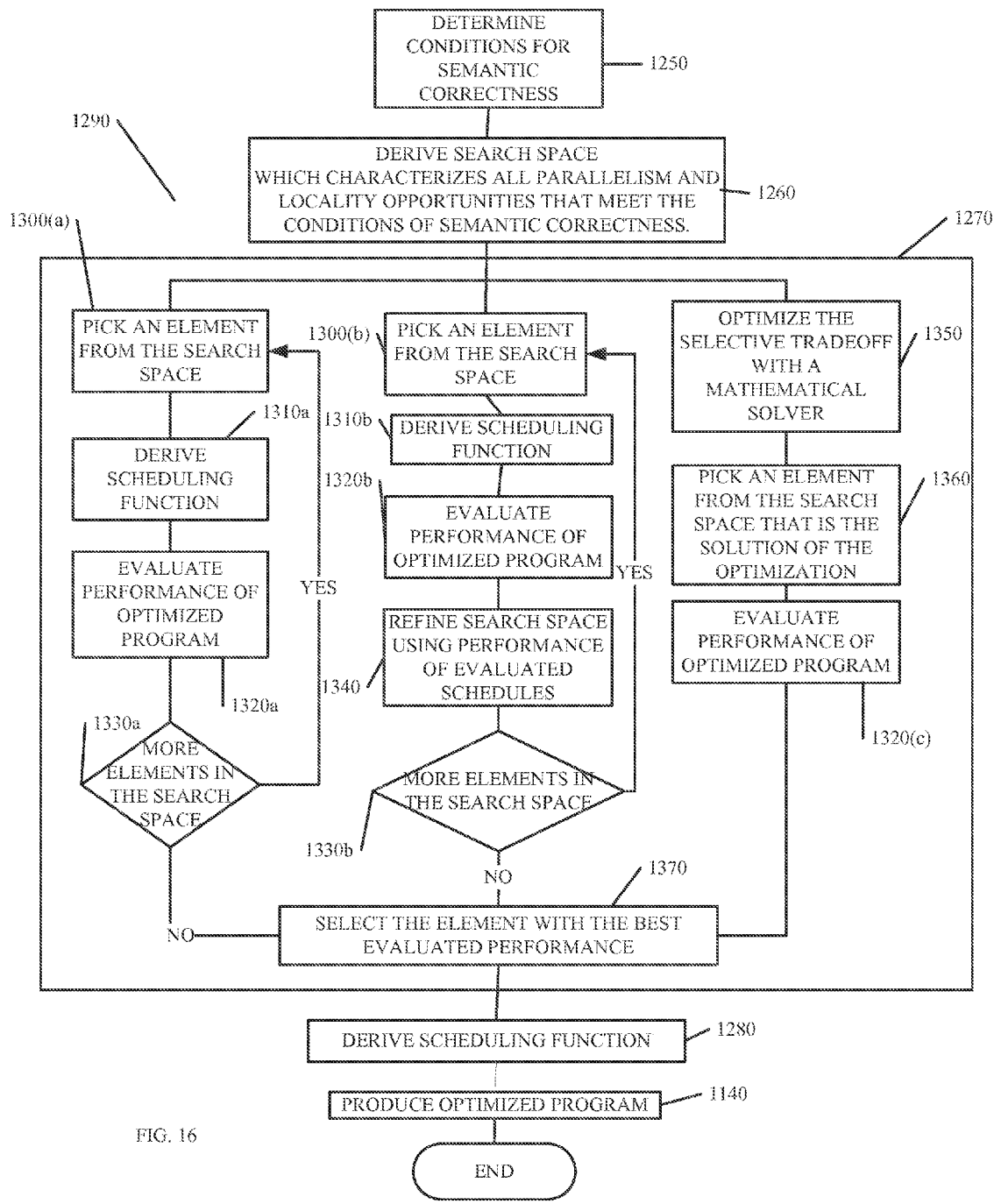
FIG. 16 illustrates an embodiment of a provided method.

The flow of a further provided method is illustrated in FIG. 16. This embodiment illustrates alternate embodiments of the flow within blocks 1130 and 1270 in previous embodiments. As illustrated, flow begins in block 1250 where the conditions for semantic correctness of the program are determined. Flow then continues to block 1260 where a search space is derived that meet the conditions for semantic correctness. In one embodiment, the search space characterizes all parallelism and locality opportunities that meet the conditions of semantic correctness. Like previous embodiments, flow then continues to block 1270 where the selective trade off is optimized. In these embodiments, block 1270 includes additional functionality. Block 1270 as illustrated contains three independent optimization paths that may be present in any given embodiment. In the first embodiment, flow begins at block 1300(*a*) where an element is selected from the search space. Flow then continues to block 1310(*a*) where a potential scheduling function is derived for the element. Flow then continues to block 1320(*a*) where the performance of the potential scheduling function is evaluated. Flow then continues to decision block 1330(*a*) where it is determined if additional elements exist in the search space. If additional elements exist, flow continues back to block 300(*a*). When no additional elements exist in the search space, flow then continues to block 1370 where the element with the best evaluated performance is selected.

In the second illustrated embodiment, flow continues from block 1260 to block 1300(*b*) where an element is selected from the search space. Flow continues to block 1310(*b*) where a potential scheduling function is derived for the element. Flow then continues to block 1320(*b*) where the performance of the potential scheduling function is evaluated. Flow then continues to block 1340 where the search space is refined using the performance of evaluated schedules. Flow then continues to decision block 1330(*b*) where it is determined if additional elements exist in the search space. If additional elements are present flow continues back to block 1330 and the process iterated until no other elements exist in the search space. When no additional elements exist, in the search space, flow then continues to block 1370 where the element with the best evaluated performance is selected.

In the third illustrated embodiment, flow continues from block 1260 to block 1350 where the tradeoff is directly optimized in the search space with a mathematical problem solver. Flow then continues to block 1360 where an element is selected that is a result of the direct optimization. Flow then continues to block 1320(*c*) there the performance of the selected element is evaluated. Flow then continues to block 1370 where the element with the best evaluated performance is selected. As illustrated some embodiments may utilize more than one of these paths in arriving at an optimal solution. From selection block 1370 flow then continues to block 1280 where the scheduling function is derived from the optimized tradeoff. Flow then continues to block 1140 where optimized code is produced.

Figure 17:
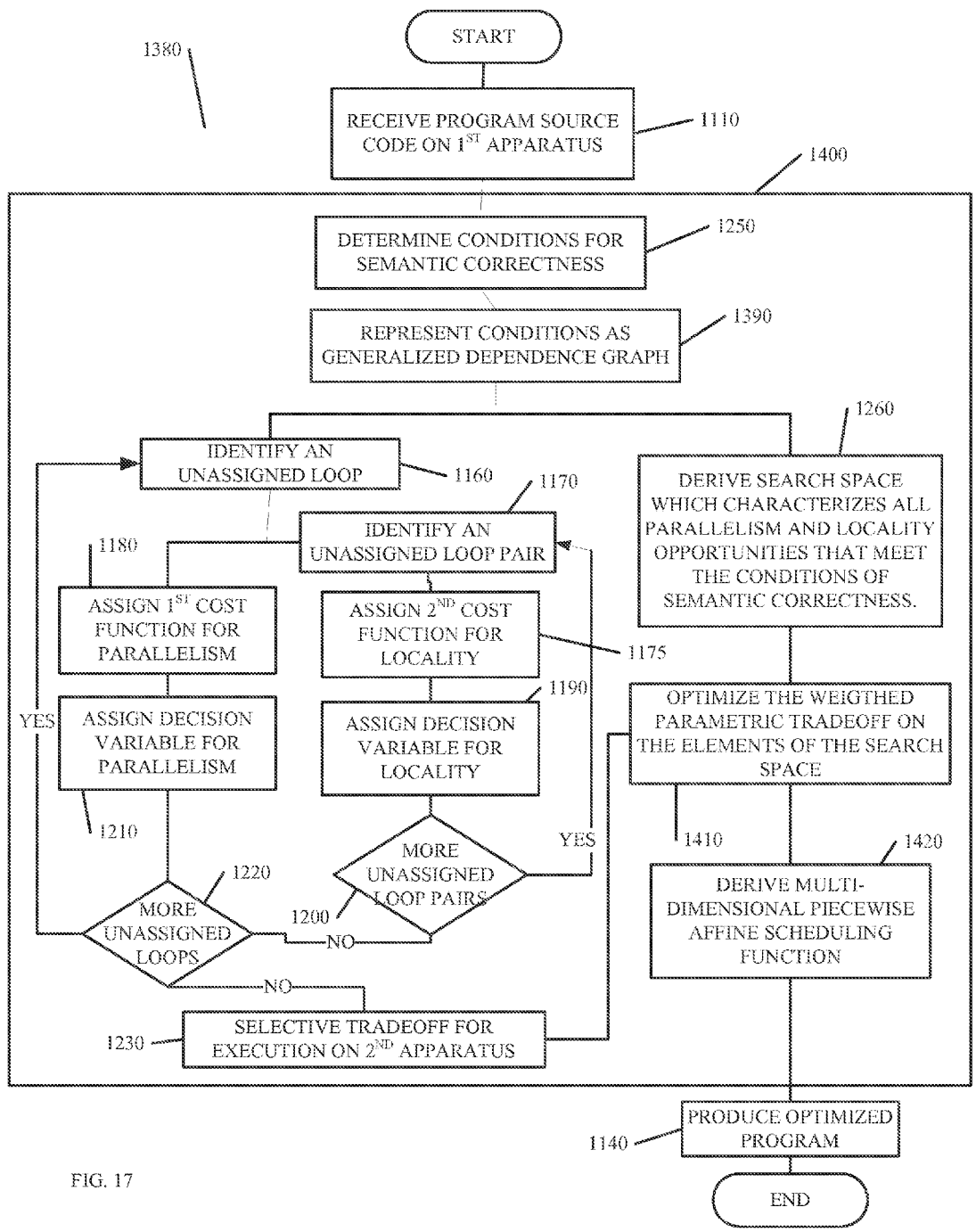
FIG. 17 illustrates an embodiment of a provided method.

The flow of a further provided embodiment of a method 1380 for optimization of source code on a first custom computing apparatus 1010(*a*) for execution on a second computing apparatus 1010(*b*) is illustrated in FIG. 17. In this embodiment, flow begins in block 1110 where source code is received in memory 1050 on a custom first computing apparatus 1010(*a*). Flow continues to block 1400 where the source code is optimized in terms of both locality and parallelism for execution on a second computing apparatus 1010(*b*). In this embodiment, block 1400 contains additional functional blocks. Flow continues from block 1110 to block 1250 where the conditions for semantic correctness are determined from the received code. Flow then continues to block 1390 where these conditions are represented as a generalized dependence graph. Flow then continues to two paths.

On a first path, flow continues to block 1260 where a search space is derived that meet the conditions for semantic correctness. In this embodiment, the search space characterizes all parallelism and locality opportunities that meet the conditions of semantic correctness. Flow then continues to block 1410 where a weighted parametric tradeoff is derived and optimized on the elements of the search space. On the second path, flow begins with block 1160 where an unassigned loop is identified. Flow then continues on two additional paths. In a first path flow continues to block 1180 where a first cost function is assigned in block 1180. This first cost function is related to a difference in execution speed between parallel and sequential operations of the statements within the unidentified loop on second computing apparatus 1010(*b*). Flow then continues to block 1210 where a decision variable is assigned to the loop under consideration, this decision variable indicating whether the loop is to be executed in parallel in the optimized program. In some embodiments the cost is determined through static evaluation of a model of the execution cost of the instructions in the loop under consideration. In other embodiments, the cost is determined through a dynamic execution on the second computing apparatus of at least a set of instructions representative of the code in the loop under consideration. In a further embodiment, the cost is determined by an iterative refining process consisting of at least one static evaluation of a model of the execution cost and at least one dynamic execution on the second computing apparatus of at least a set of instructions representative of the code in the loop under consideration. Flow then continues to decision block 1220 where it is determined if there are additional unassigned loops.

Returning to block 1160 where an unassigned loop is identified. On the second path flow continues to block 1170 where an unassigned loop pair is identified. Flow then continues to block 1175 where a second cost function is assigned for locality optimization. This second cost function is related to a difference in execution speed between operations where the loops of the pair of loops are executed together on the second computing apparatus, and where the loops of the pair of loops are not executed together on the second computing apparatus. Flow then continues to block 1190 where a decision variable is assigned for locality. This second decision variable specifying if the loops of the loop pair under consideration is to be executed together in the optimized program. In one embodiment, the second cost is determined through static evaluation of a model of the execution cost of the instructions in the at least one loop pair. In another embodiment, the second cost is determined through of a dynamic execution on the second computing apparatus of at least a set of instructions representative of the code in the at least one loop pair. In a further embodiment, the cost is determined through an iterative refining process consisting of at least one static evaluation of a model of the execution cost and at least one dynamic execution on the second computing apparatus of at least a set of instructions representative of the code in the at least one loop pair. Flow then continues to decision block 1200 where it is determined if additional unassigned loop pairs exist. If additional unassigned loop pairs exist, flow continues back to block 1170 and the process iterates until no additional unassigned loop pairs are found. When decision block 1200 determines no additional loop pairs are present, flow continues to decision block 1220. If in decision block 1220 it is determined that additional unassigned loops exist, flow continues back to block 1160 and the process iterates until no additional unassigned loops may be identified. Flow then continues to block 1230 where a selective trade-off is created for locality and parallelism during the execution on second computing apparatus 1010(*b*).

In this embodiment, flow then continues to block 1410 where as discussed, a weighted parametric tradeoff is derived and optimized on the elements of the search space. Flow then continues to block 1420 where a multi-dimensional piecewise affine scheduling function is derived that optimizes the code for execution on second computing apparatus 1010(*b*). Flow then continues to block 1140 where the optimized program is produced.

Figure 18:
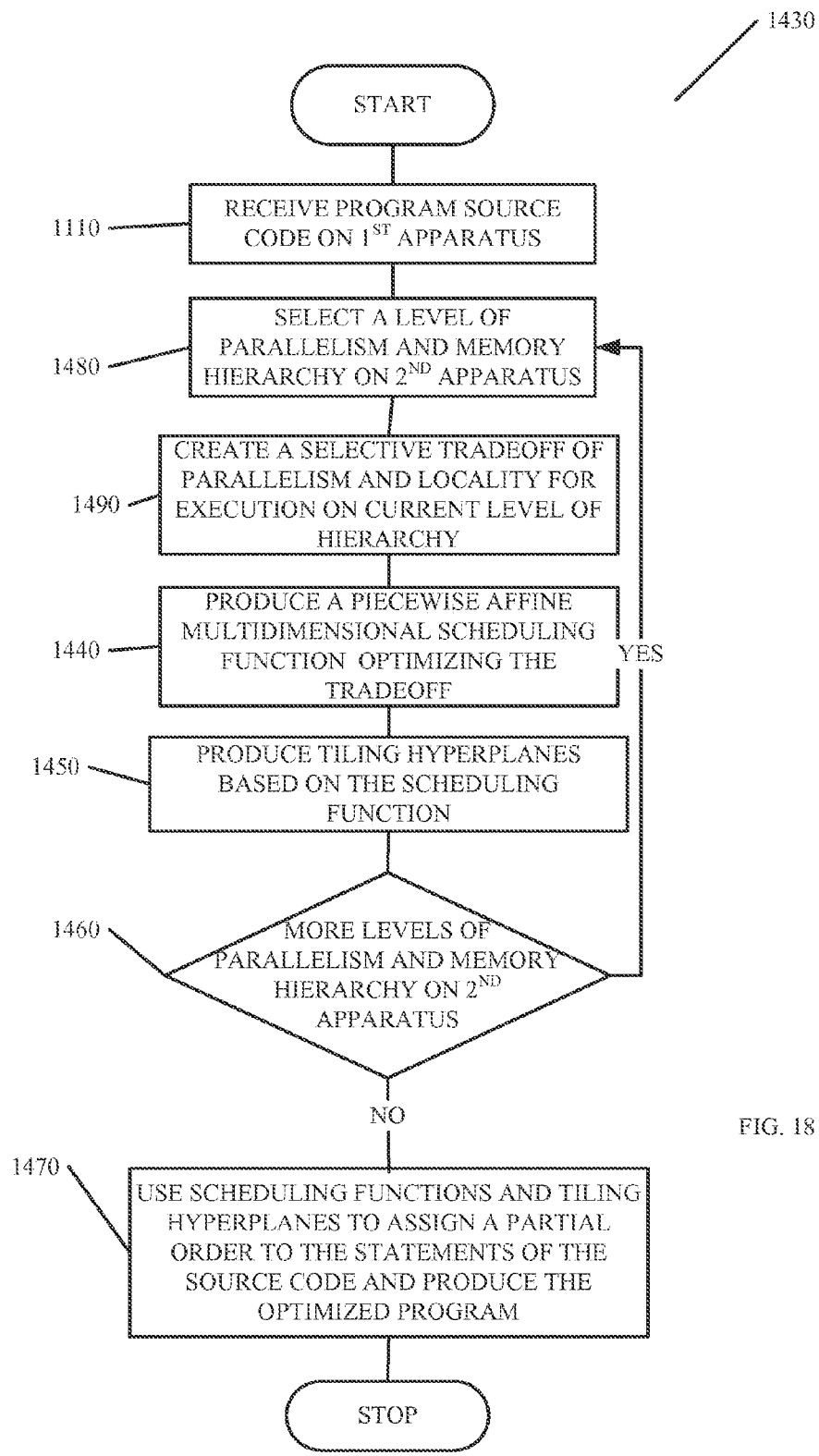
FIG. 18 illustrates an embodiment of a provided method.

The operational flow of a further provided method 1430 for source code optimization is illustrated in FIG. 18. In this embodiment, flow begins in block 1110 where source code is received in memory 1050 on a custom first computing apparatus 1010(*a*). Flow continues to block 1480 where the a level of parallelism and memory hierarchy in the second computing apparatus are selected. Flow then continues to block 1490 where a selective tradeoff for parallelism and locality for execution of that level of hierarchy is created. Flow then continues to block 1440 where a piecewise affine multi-dimensional scheduling function is derived that optimizes the specific tradeoff. Flow then continues to block 1450 where tiling hyper-planes are produced based on the scheduling function. Flow then continues to decision block 1460 where it is determined if additional levels of parallelism and memory hierarchy exist on second computing apparatus 1010(*b*). If additional levels exist, flow continues back to block 1480 and the process iterates until it is determined that no additional levels exist. Flow then continues to block 1470 where the scheduling functions and tiling hyper-planes are used to assign a partial order to the statements of the source code and an optimized program is produced. In some embodiments, a global weighted parametric function is used to optimize each level of parallelism and hierarchy on second computing apparatus 1010(*b*).

Figure 19A:
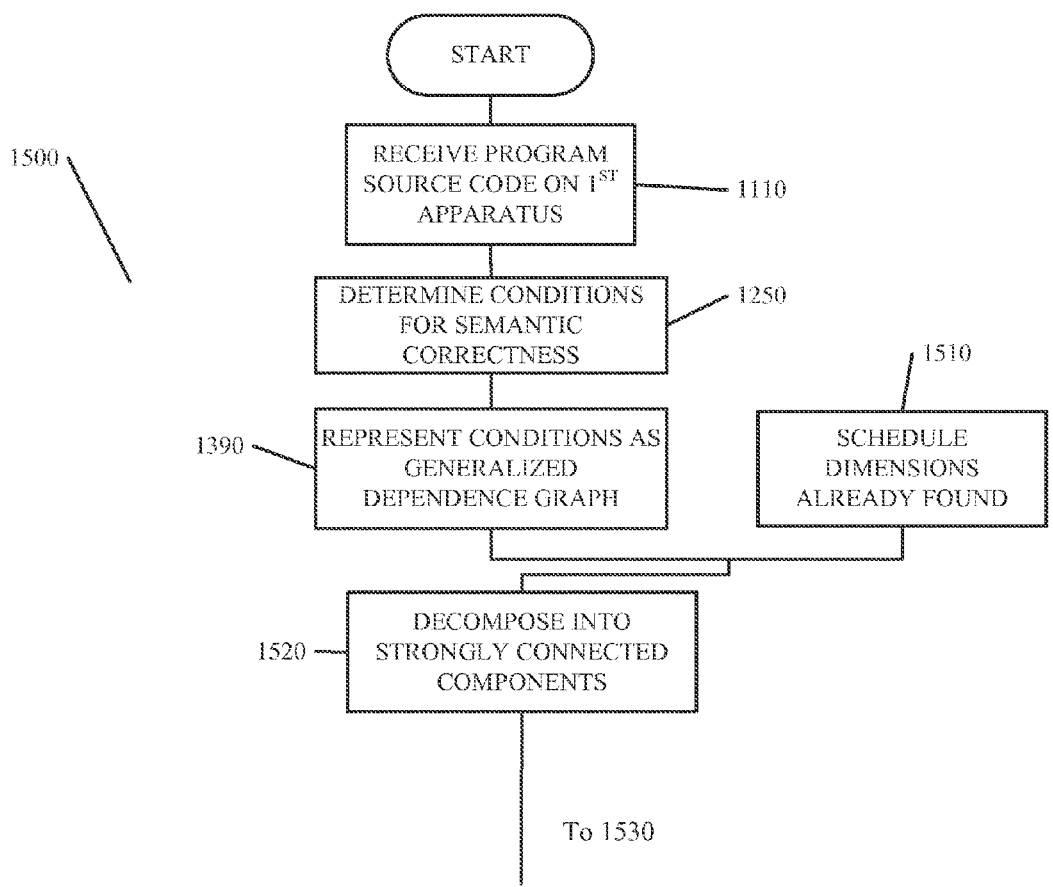
FIGS. 19A-C illustrate an embodiment of a provided method.
Figure 19B:
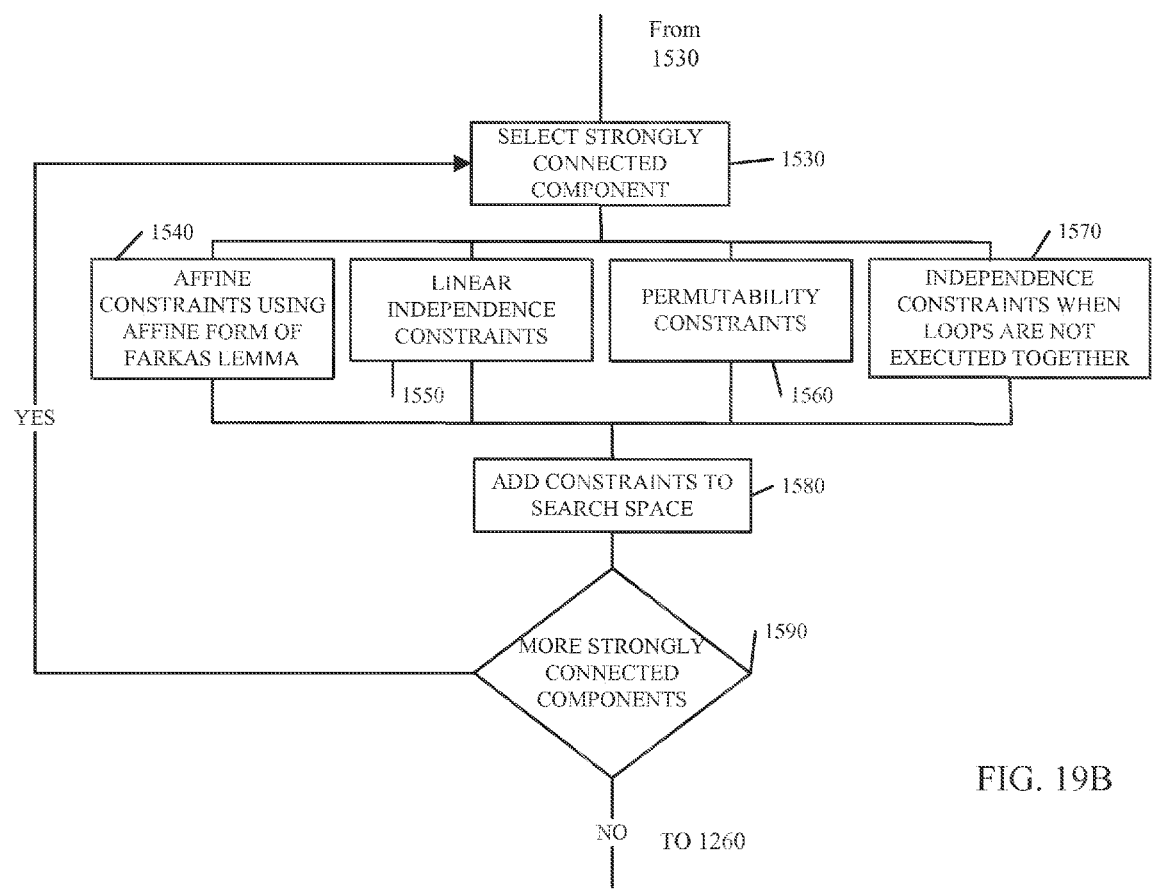
Figure 19C:
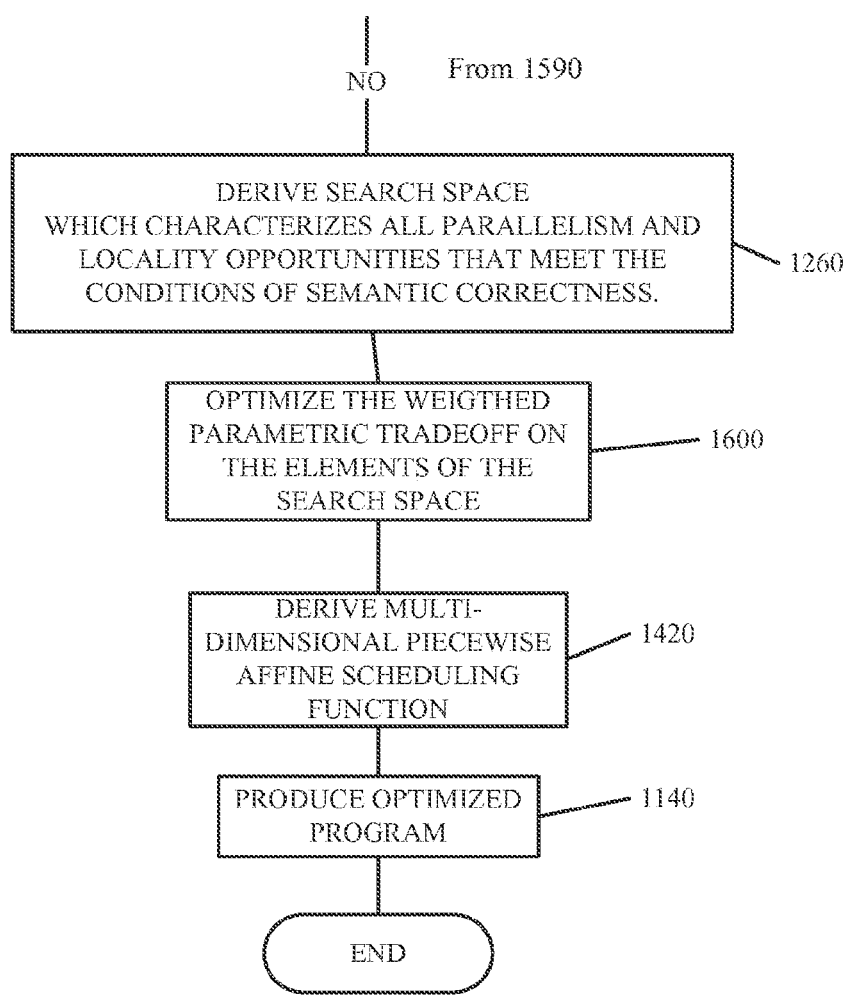

The operational flow of a further provided method 1500 for source code optimization is illustrated in FIGS. 19A-C. In this embodiment, flow begins in block 1110 where source code is received in memory 1050 on a custom first computing apparatus 1010(*a*). Flow continues to block 1250 where the conditions for semantic correctness are determined for the program. Flow then continues to block 1390 where these conditions are represented as a generalized dependence graph. Alternatively as indicated in block 1510 schedule dimensions may have been found through the methods disclosed in other embodiments. Flow continues to block 1520 where the generalized dependence graph is decomposed into at least one strongly connected component. Flow then continues to block 1530 where a strongly connected component is selected. Flow then continues to a number of independent paths.

In the first path, flow continues to block 1540 where a set of affine constraints are derived using the affine form of Farkas lemma. On the second path, flow continues to block 1550 where linear independence constraints are derived and used to ensure the successive scheduling dimensions are linearly independent. In some embodiment, these linear independence constraints are derived using orthogonally independent subspaces. In another embodiment, these constraints are formed using a Hermite Normal form decomposition. In the third path, flow continues to block 1560 where a set of schedule difference constraints are derived and used to enforce dimensions of schedules of loops belonging to the same strongly connected component are permutable. In the last path, a set of loop independence constraints are derived and used to ensure that dimensions of schedules of loops that are not executed together do not influence each other. In one embodiment, this set of constraints includes a large enough constraint to cancel an effect of constraints on statements that are not executed together in the optimized program.

Flow then continues to block 1580 where these derived constraints are added to the search space. Flow then continues to decision block 1590 where it is determined if there are additional strongly connected components. If there are additional strongly connected components, flow continues back to block 1530 and the process iterates until there are no further strongly connected components. Flow then continues to block 1260 where a search space is derived that characterizes all parallelism and locality opportunities that meet the conditions of semantic correctness. Flow then proceeds to block 1600 where a weighted parametric tradeoff is optimized on the elements of the search space. Flow continues to block 1420 where a multi-dimensional piecewise affine scheduling function is derived from the optimization and to block 1140 where this function is used to create an optimized program for execution on second computing apparatus 1010(*b*). In one embodiment, the optimization can reach any legal multi-dimensional affine scheduling of the received program. In another embodiment, the legal multi-dimensional affine scheduling of the received program includes loop reversals.

Figure 20A:
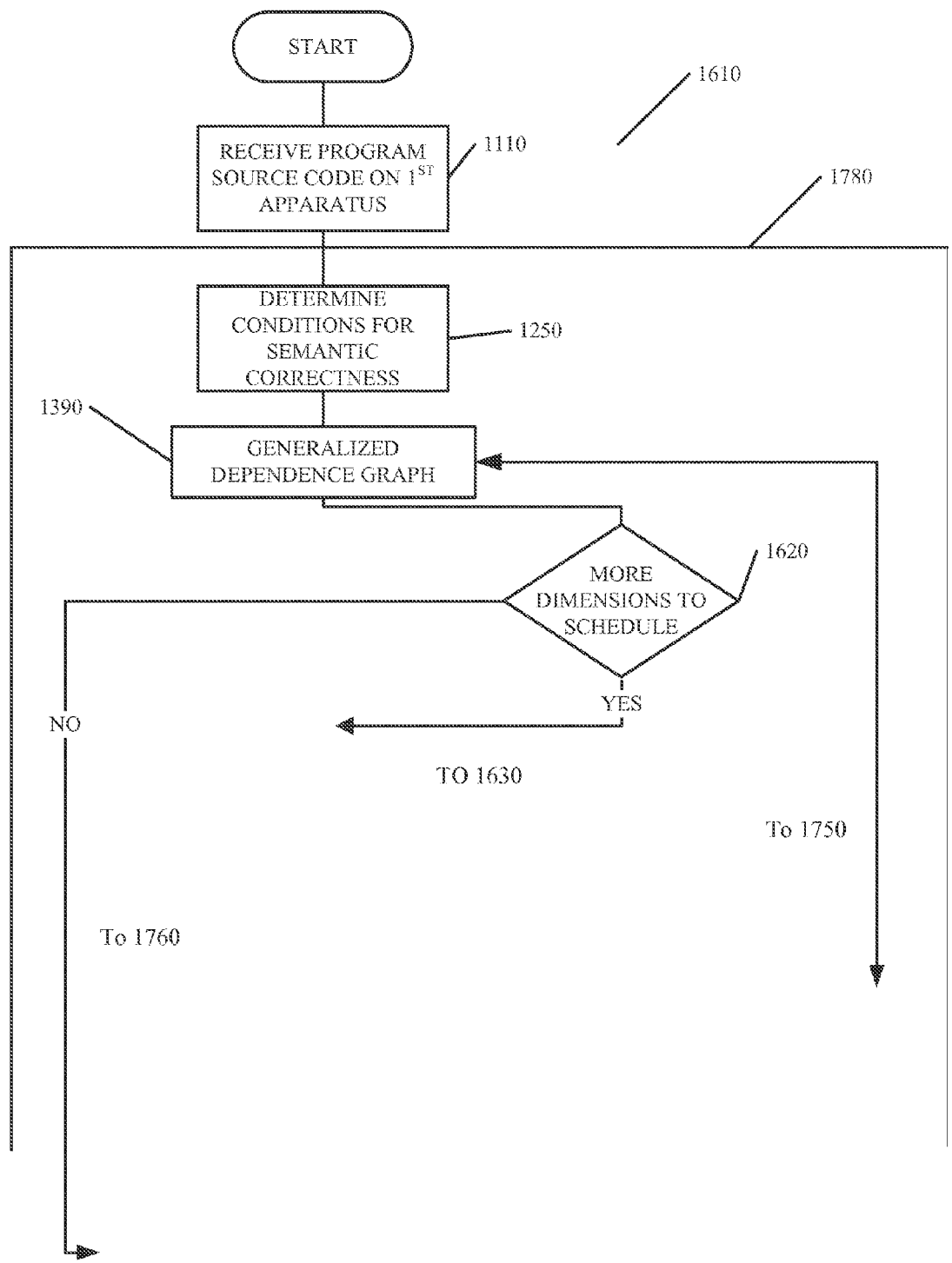
FIGS. 20A-B illustrate an embodiment of a provided method.
Figure 20B:
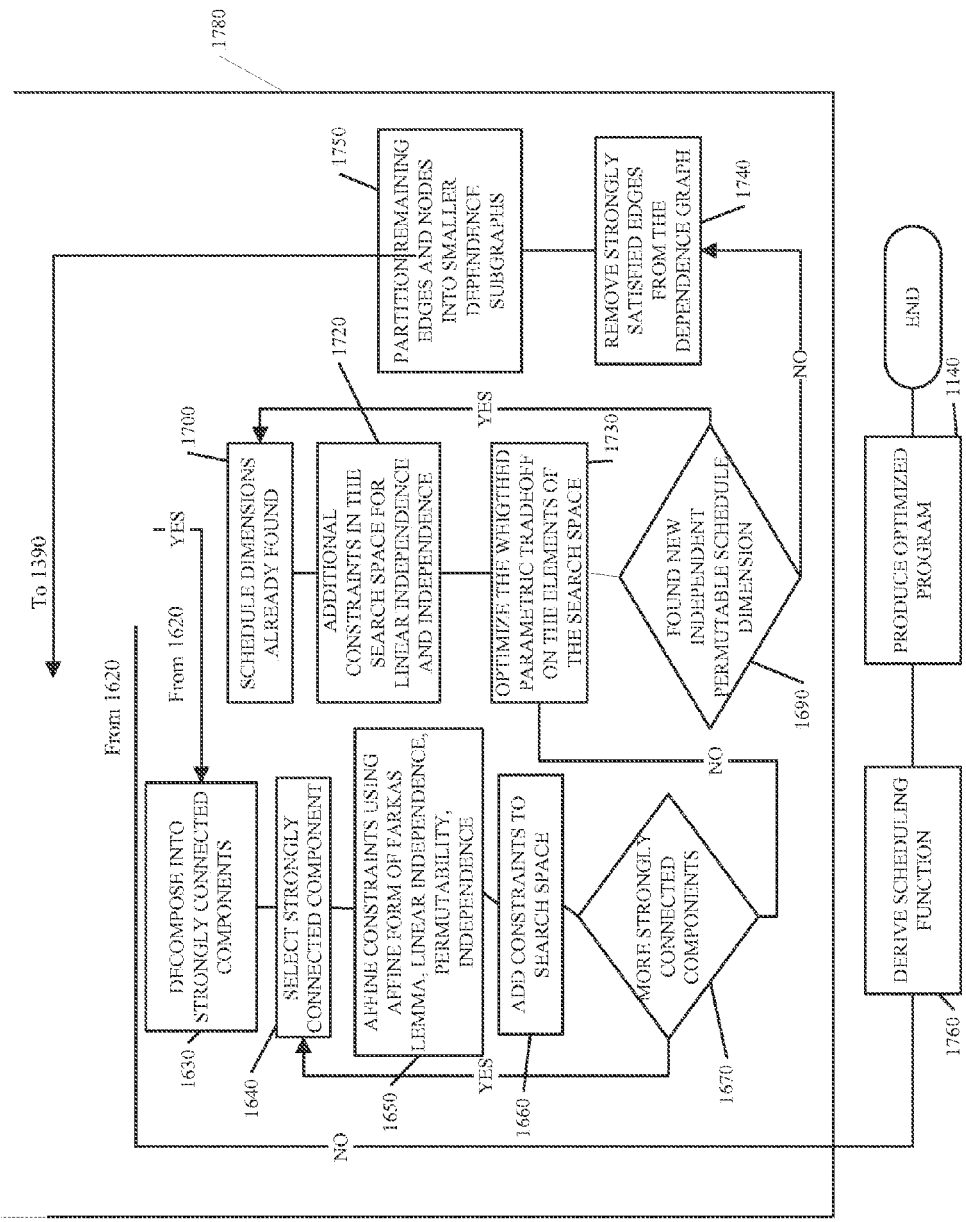

The operational flow of a further provided method 1610 for source code optimization is illustrated in FIGS. 20A and 20B. As with other embodiments, this embodiment may be used in conjunction with other provided methods. In this embodiment, flow begins in block 1110 where source code is received in memory 1050 on a custom first computing apparatus 1010(*a*). Flow continues to block 1780 which contains additional functionality. Flow continues to block 1250 where the conditions for semantic correctness are determined for the program. Flow then continues to block 1390 where these conditions are represented as a generalized dependence graph. Flow then continues to decision block 1620 where it is determined if there are additional dimensions to schedule. If there are no additional dimensions, flow continues to block 1760 where a scheduling function is derived and to block 1140 where an optimized program is produced for second computing apparatus 1010(*b*).

If at decision block 1620 determines that there are additional scheduling dimensions, flow continues to block 1630 where the generalized dependence graph is decomposed into at least one strongly connected component. Flow continues to block 1640 where a strongly connected component is selected. Flow then continues to block 1650 where affine constraints are derived using the affine form of Farkas lemma, linear independence constraints permutability constraints, and independence constraints are derived as previously discussed. Flow then continues to block 1660 where these constraints are added to the search space. Flow then continues to decision block 1670 where it is determined if additional strongly connected components exits. If others exist, flow continues back to 1640 and the process iterates until there are no remaining strongly connected components.

When decision block 1670 indicates that there are no remaining strongly connected components, flow continues to block 1730 where a weighted parametric tradeoff function is optimized on the search space. Flow then continues to decision block 1690 where it is determined if new independent permutable schedule dimensions exist. If they exist flow continues to block 1700 where an existing scheduling dimension is selected. Flow continues to block 1720 where additional constraints are added to the search space for independence and linear independence. From block 1720 flow continues to block 1730 where a weighted parametric tradeoff function is optimized on the search space. Flow then continues back to decision block 1690 and this part of the process iterates until no new independent permutable schedule dimensions are found. Flow then continues to block 1740 where satisfied edges are removed from the dependence graph and to block 1750 where the remaining edges and nodes are partitioned into smaller dependence graphs. Flow then continues back to block 1390 and the process is iterated on these smaller dependence graphs until decision block 1620 determines there are no additional dimensions to schedule.

The flow of a further provided embodiment of a method 1760 for optimization of source code on a first custom computing apparatus 1010(*a*) for execution on a second computing apparatus 1010(*b*) is illustrated in FIGS. 21A-D. In this embodiment, flow begins in block 1110 where source code is received in memory 1050 on a custom first computing apparatus 1010(*a*). On a first path flow continues to block 1120 where a selective tradeoff of parallelism and locality for execution of the program on second computing apparatus 1010(*b*) is created. Flow continues to block 1250 where the conditions for semantic correctness are determined. Flow continues to block 1770 where a single multi-dimensional convex space of all legal schedules is derived. Additional information on block 1770 is provided in FIGS. 21C and 21D. Like some previous embodiments, flow then continues on alternate three paths. On the first path flow continues to block 1790(*a*) where a element from the search space is selected. Flow then continues to block 1800(*a*) where a scheduling function is derived for the selected element. Flow then continues to block 1810(*a*) where the scheduling function is evaluated for its performance on the optimized program. Flow continues to decision block 1820(*a*). If it is determined that there are additional elements in the search space, flow continues back to block 1790(*a*) where another element is selected. The process iterates until no additional elements remain in the search space.

On the second path flow continues to block 1790(*b*) where an element of the search space is selected. Flow then continues to block 1800(*b*) where a scheduling function is derived for the selected element. Flow then continues to block 1810(*b*) where the performance of the scheduling function is evaluated. Flow then continues to block 1830 where the search space is refined using the performance of evaluated schedules. Flow then continues to decision block 1820(*b*). If there are additional elements remaining in the search space flow continues back to block 1790(*b*) and another element is selected from the search space. The process iterates until there are no remaining elements in the search space.

On the third path flow continues to block 1840 where the selective tradeoff is directly optimized using a mathematical solver. Flow then continues to block 1850 where an element is selected from the search space that is a solution to the optimization. Flow then continues to block 1860 where the performance of the selected element is evaluated. Flow then continues to block 1870 which selects the element with the best evaluated performance for all of its inputs. Flow then continues to block 1880 which produces a scheduling function from the selective tradeoff and the selected element. Flow then continues to block 1890 where the scheduling function is used to assign a partial order to the statements of the source code and an optimized program is produced.

Figure 21A:
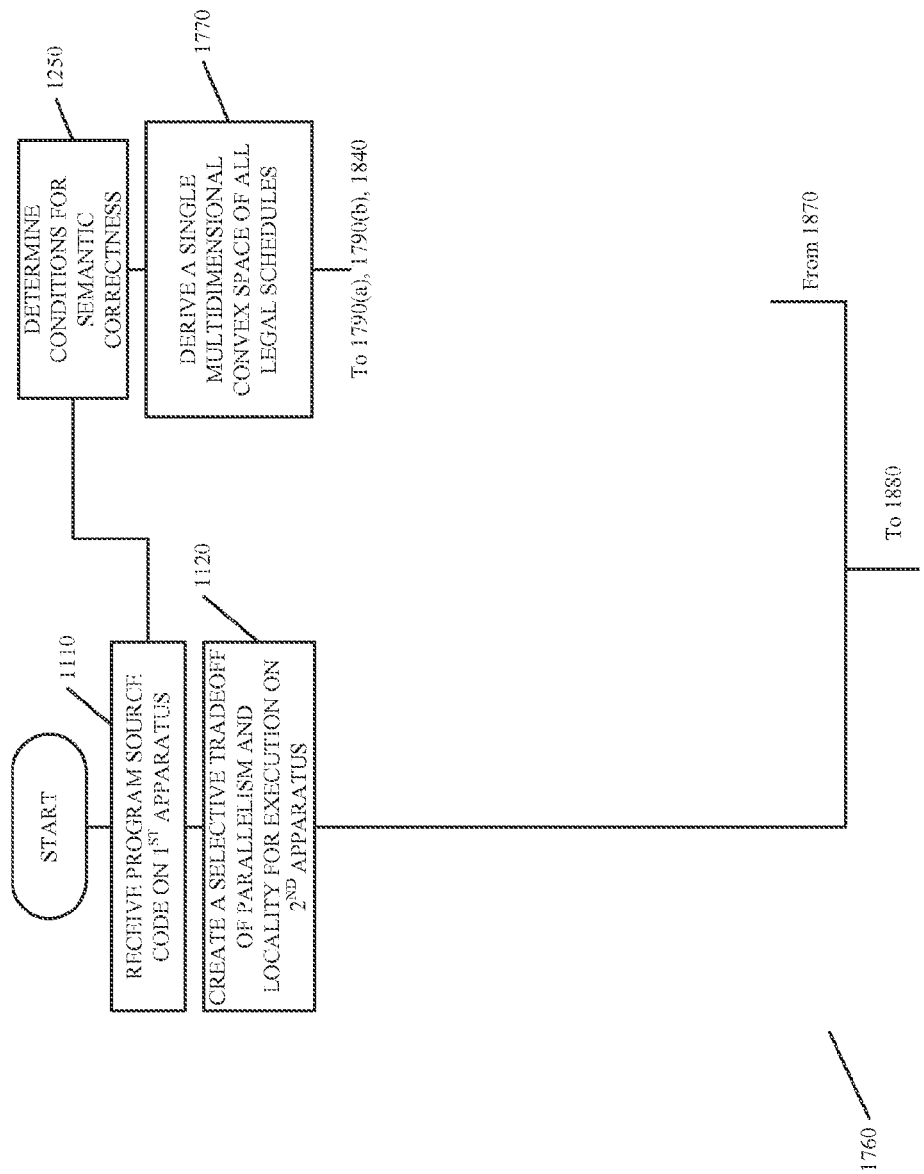
Figure 21B:
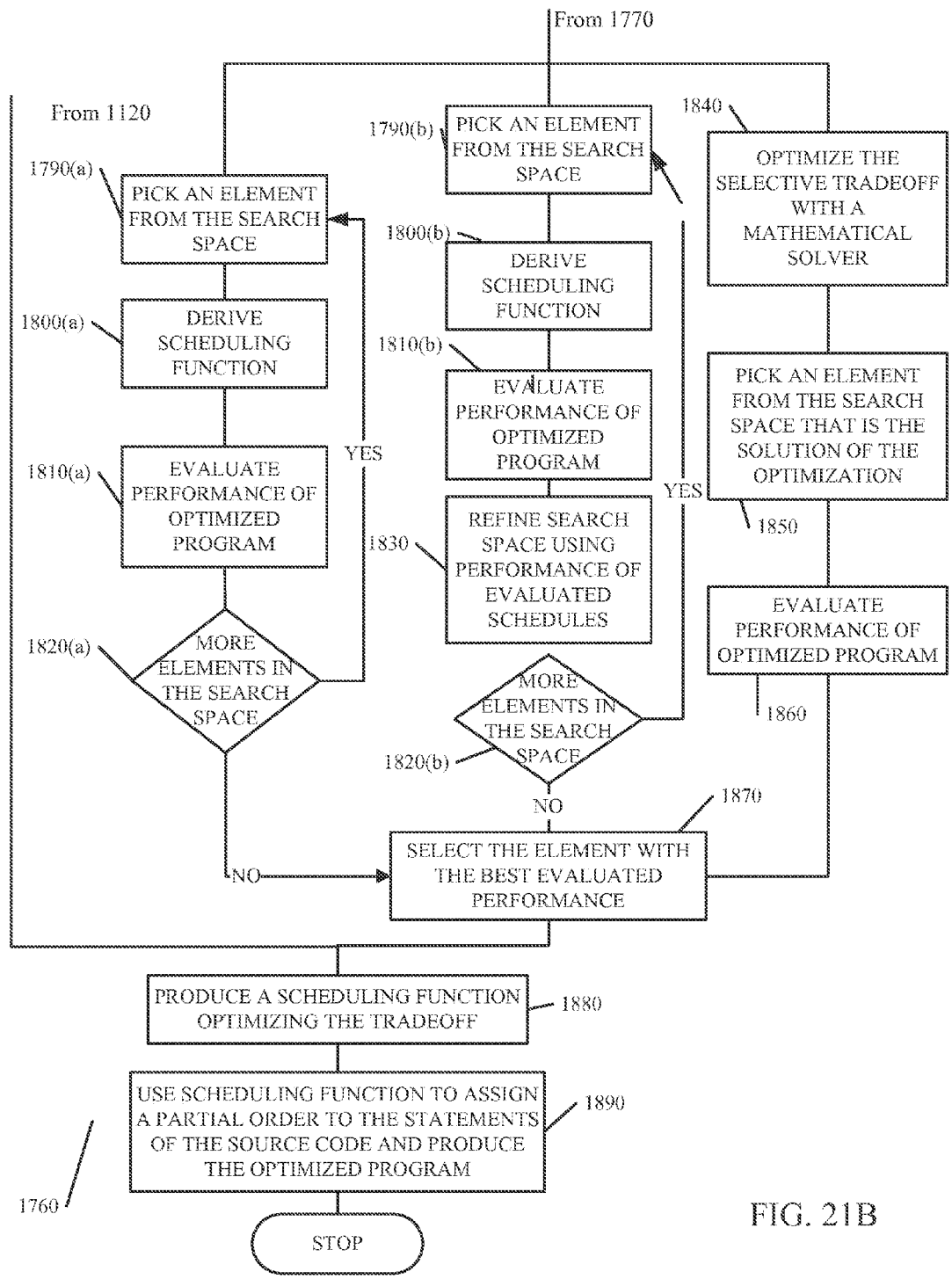
Figure 21D:
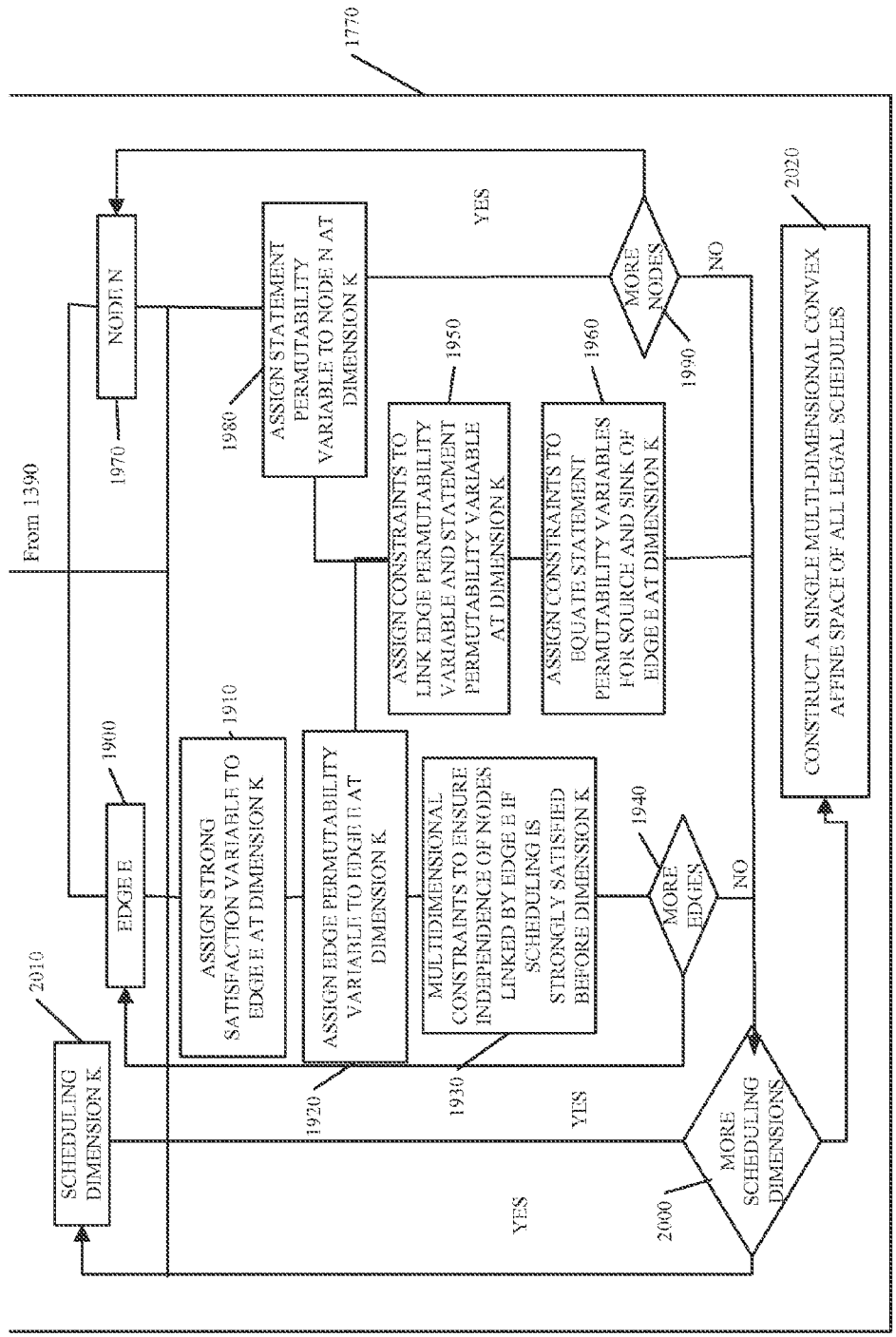

An exemplary embodiment of block 1770 is illustrated in FIGS. 21C and 21D. In this embodiment, flow from block 1250 continues to block 1390 where the conditions for semantic correctness are represented as a generalized dependence graph. Flow continues on two parallel paths. On the first path an edge E is selected from the dependence graph in block 1900. Flow then continues to block 1910 where a strong satisfaction variable is assigned to edge E at dimension K. Block 1910 receives the current dimension K from block 2010. Flow then continues to block 1930 where multi-dimensional constraints are derived to ensure independence of the nodes linked by edge E if scheduling is satisfied before dimension K. Flow then continues to decision block 1940. If there are additional edges in the dependence graph flow continues back to block 1900 where another edge is selected and the process iterates until no additional edges exist.

On the second path, flow continues from block 1390 to block 1970 where a node N is selected. Flow continues to block 1980 where a statement permutability variable is assigned to node N at dimension K. Block 1980 receives dimension K from block 2010. Flow continues to decision block 1990. If there are remaining nodes in the dependence graph flow continues back to block 1970 where another node N is selected. The process iterates until no additional nodes exist in the graph. Block 1950 receives input from blocks 1920 and 1980 and assigns constraints to link edge permutability variable and statement permutability variable at dimension K. Flow then continues to block 1960 where constraints to equate statement permutability variables for source and sink of edge E at dimension K are assigned. Flow then continues to decision block 2000. If additional scheduling dimensions exist, flow continues back to block 2010 the next scheduling dimension is selected and the entire process repeated for all dimensions. When all dimensions have been scheduled, flow continues to block 2020 where a single multi-dimensional convex affine space is constructed from all of the legal schedules.

The flow of another provided method 2070 for program code optimization is illustrated in FIG. 22. In this method, flow begins in block 1110 where program source code is received in memory 1050 on a custom first computing apparatus 1010(*a*). Flow continues to block 2080 where a level of parallelism and memory hierarchy is selected from the second computing apparatus 1010(*b*). Flow then continues to block 1780 which is illustrated in FIG. 20 and discussed in detail above. Flow then continues to decision block 2020. If the performance of the scheduling function is not satisfactory for the current level, flow continues to block 2030 where a partial evaluation of the code produced for the current level of parallelism and memory hierarchy is performed and used to iteratively refine the schedule. Flow continues back to block 1780 a iterates until the performance of the schedule is satisfactory for the level. Flow then continues to block 2040 where tiling hyper-planes are produced based on the scheduling function. Flow then continues to decision block 2050. If there are additional levels of parallelism and memory hierarchy flow continues back to block 2080 and the process iterates. Once no additional levels exist, flow continues to block 2060 where the scheduling functions and tiling hyper-planes are used to assign a partial order to the statements of the source code and an optimized program is produced.

Contiguity Constraints

In further embodiments, a selective tradeoff of the cost of parallelism, locality and contiguity of memory references is provided. In one embodiment, a memory reference to an array A in the program is denoted by $\mathcal{F}$. When a statement accessing the reference $\mathcal{F}$ has d enclosing loops and the array referenced by $\mathcal{F}$ has r dimensions, $\mathcal{F}$ is an (r)×(d)-matrix with r rows and d columns. In the most general formulation, we express contiguity along any dimension of access to array A. Let $0<=k<r$ denote this dimension. In this formulation any memory reference accessing array A is optimized for contiguity along dimension k of the array. We denote by $\mathcal{F}_s$ the (r−1)×d submatrix composed of the (r−1) rows of $\mathcal{F}$ excluding row k. In the $\alpha/\beta/\gamma$ convention, we denote by $\alpha_s$ the (d−1)×d submatrix composed of the (d−1) first rows of $\alpha$. For a reference to be considered for contiguity optimization, it must satisfy rank $(\mathcal{F}_s) < \text{rank}(\mathcal{F})$. If it is not the case, such a reference is always marked as non-contiguous along dimension k in the optimization problem (by enforcing a corresponding Boolean decision variable is set to 1). To ensure contiguity of a reference along dimension k, we encode the following additional constraint into the affine fusion formulation: $\text{im}(\mathcal{F}_s) \subseteq \text{im}(\alpha s)$. In some embodiments, we encode a set of scheduling, fusion and contiguity constraints as follows. For each loop p in the program, we introduce an additional Boolean variable $\rho_r \in \{0,1\}$ for each reference r in the program. The main objective function is generalized into:

$$\min \sum_p w_p \Delta_p + \sum_{p,q} u_{pq} f_{pq} + \sum_r s_r \rho_r$$

where $s_r$ are additional costs, one per memory reference and are architecture- and problem-specific weights. In this global formulation, $w_p$ is the relative benefit of executing loop p in parallel, $u_{pq}$ is the relative benefit of fusing loops p and q, and $s_r$ is the relative benefit of accessing reference r with contiguous memory accesses. In further embodiments, we also minimize the magnitude of the coefficients of $\delta$ and $\phi$ in the secondary objectives. The variables $\rho_r$ are related to the rest of the constraints as follows. Let $a_v$ denote the coefficients in the linear part of $\phi_v(i,y)$. Let $\mathcal{F}_r$ denote the linear part of the access function in reference r. Let $R_r$ denote the column basis vectors such that $\text{im}(R_r)=\text{im}((\mathcal{F}_r)s)$. We enforce the following constraints:

$$p_r \in \{0,1\}, r \in \text{all refs} \qquad (26)$$

$$a_v - R_r \lambda_r + N_\alpha p_r \geq 0, r \in \text{all refs}, v \text{ contains } r \qquad (27)$$

$$-a_v + R_r \lambda_r + N_\alpha p_r \geq 0, r \in \text{all refs}, v \text{ contains } r \qquad (28)$$

where $\lambda_r$ are new variables introduced for each reference r. These $\lambda_r$ variables are otherwise left unconstrained.

Figure 23:
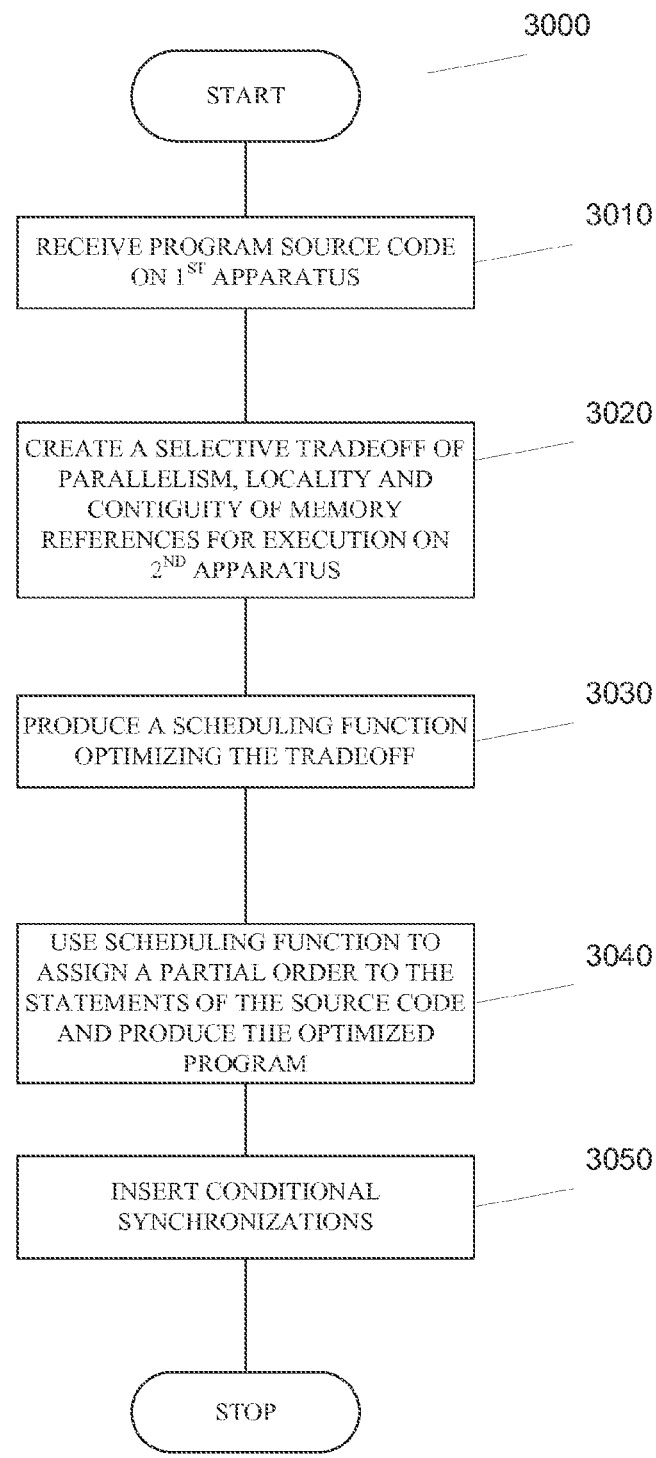
FIG. 23 illustrates embodiments of provided methods.

A further embodiment of a provided method 3000 is illustrated in FIG. 23. In this embodiment, flow begins at block 3010 where a program source code is received in a memory on a first computing apparatus. Flow then continues to block 3020 where a selective tradeoff between parallelism, locality and contiguity of memory references is created for execution on a second computing apparatus. In block 3030 a scheduling function is products that optimizes the tradeoff. Flow continues to block 3040 where the scheduling function is used to assign a partial order to the statements of the source code and an optimized program is produced. In some embodiments where the second computing apparatus contains multiple execution units, flow may continue to block 3050 where conditional synchronizations between a plurality of execution units are inserted into the code.

In further embodiments, we also require that a loop accessing a contiguous reference must also be parallel. In which case we write the additional constraints $\Delta_p \leq p_r$ for all loops p and all references r accessed by loop p.

In other embodiments, enumerate for each memory array the possible set of values $0 <= k < r$ and optimize along the best contiguity dimension. One skilled in the art of integer programming constraints building will appreciate that such an enumeration can be achieved by standard techniques involving the introduction of disjunctive constraints.

Optimizing a Plurality of Selective Tradeoffs.

A further embodiment applies multiple optimizations using successive parallelism, locality and contiguity optimizations. In one embodiment, each tradeoff in the plurality of tradeoffs is optimized using different costs corresponding to the costs of parallelism, locality and contiguity for the particular level of the hardware hierarchy. Example is provided for architectures with a hierarchy of coarse grained parallel execution units, each of them featuring fine grained parallel execution units. One such architecture is the Intel Pentium E 5300, another example of such architecture is the NVIDIA Geforce GTX 280 Graphics Processing Unit (GPU), and a further example of such architecture is any custom configuration of traditional x 86 processors with GPUs attached to them. The following example illustrates how an embodiment of the invention computes schedules used to devise multilevel tiling hyperplanes and how a further embodiment of the invention computes different schedules for different levels of the parallelism and memory hierarchy of the second computing apparatus.

Figure 24:
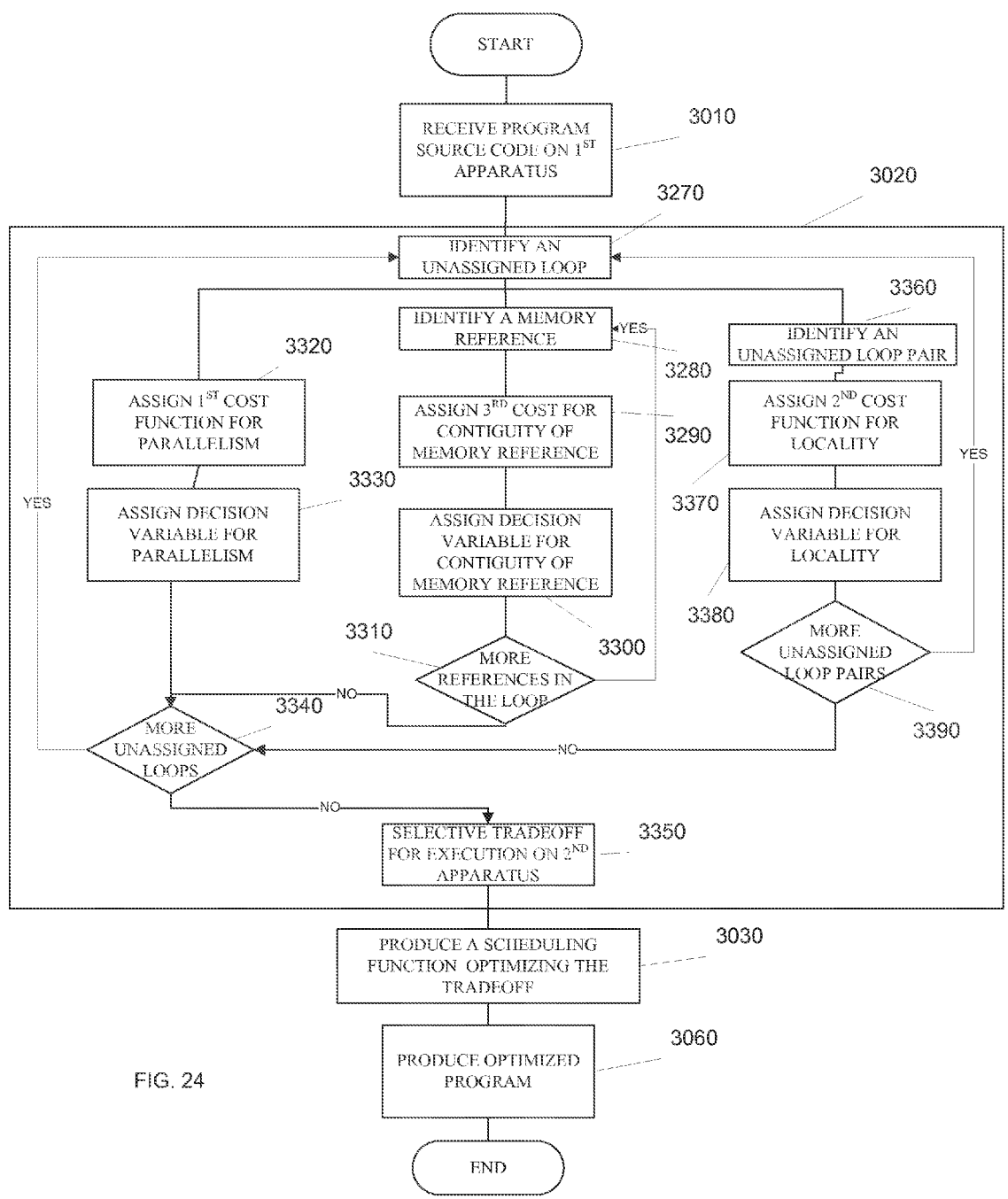
FIG. 24 illustrates other embodiments of provided methods.

The flow of additional source code optimization embodiments are illustrated in FIG. 24. In this illustration, flow begins at block 3010 where source code is received in memory on a first computing apparatus. Flow then continues to block 3020 where a selective tradeoff between parallelism, locality and contiguity of memory references is created for execution on a second computing apparatus. In this illustration, block 3020 is expanded to illustrate various embodiments. In some embodiments, flow continues to block 3270 where an unassigned loop is identified in the code. Flow then continues along three paths. In the first path flow continues to block 3320 where a first cost function is assigned. In this illustration, the first cost function is related to the cost of parallel execution on the second computing apparatus. Flow then continues to block 3330 where a decision variable for parallelism is assigned, then to conditional block 3340.

In the second path a memory reference is identified in block 3280 and flow continues to block 3290 where a third cost is assigned. In some embodiments, the third cost is related to the cost of contiguous storage and access of the memory reference. Flow then continues to block 3300 where a decision variable is assigned to this cost then on to decision block 3310 where it is determined if additional memory references are present within the loop under consideration. If additional memory references exist, flow continues back to block 3280 and the process iterates until decision block 3310 determines that no additional memory references are present. Flow then continues to decision block 3340.

In the third path flow begins at block 3360 where an unassigned loop pair is identified. Flow then continues to block 3370 where a second cost function is assigned. In some embodiments, this second cost function is related to locality. Flow then continues to block 3380 where a locality decision variable is assigned to the loop pair and on to decision block 3390 where a determination is made on the existence of additional unassigned loop pairs. If additional unassigned loop pairs are present, flow continues back to block 3360 and the process iterates until no additional loop pairs are found. Flow then continues to block 3340 where it is determined if additional unassigned loops are present in the code. If so, flow continues back to block 3270 and the process iterates until no unassigned loops are present. Flow then continues to block 3350 where the selective tradeoffs are formulated for the execution of the code on the second computing apparatus. Flow then continues to block 3030 where a scheduling function is produced which optimizes the selective tradeoff and to block 3060 where an optimized program is produced.

Figure 26A:
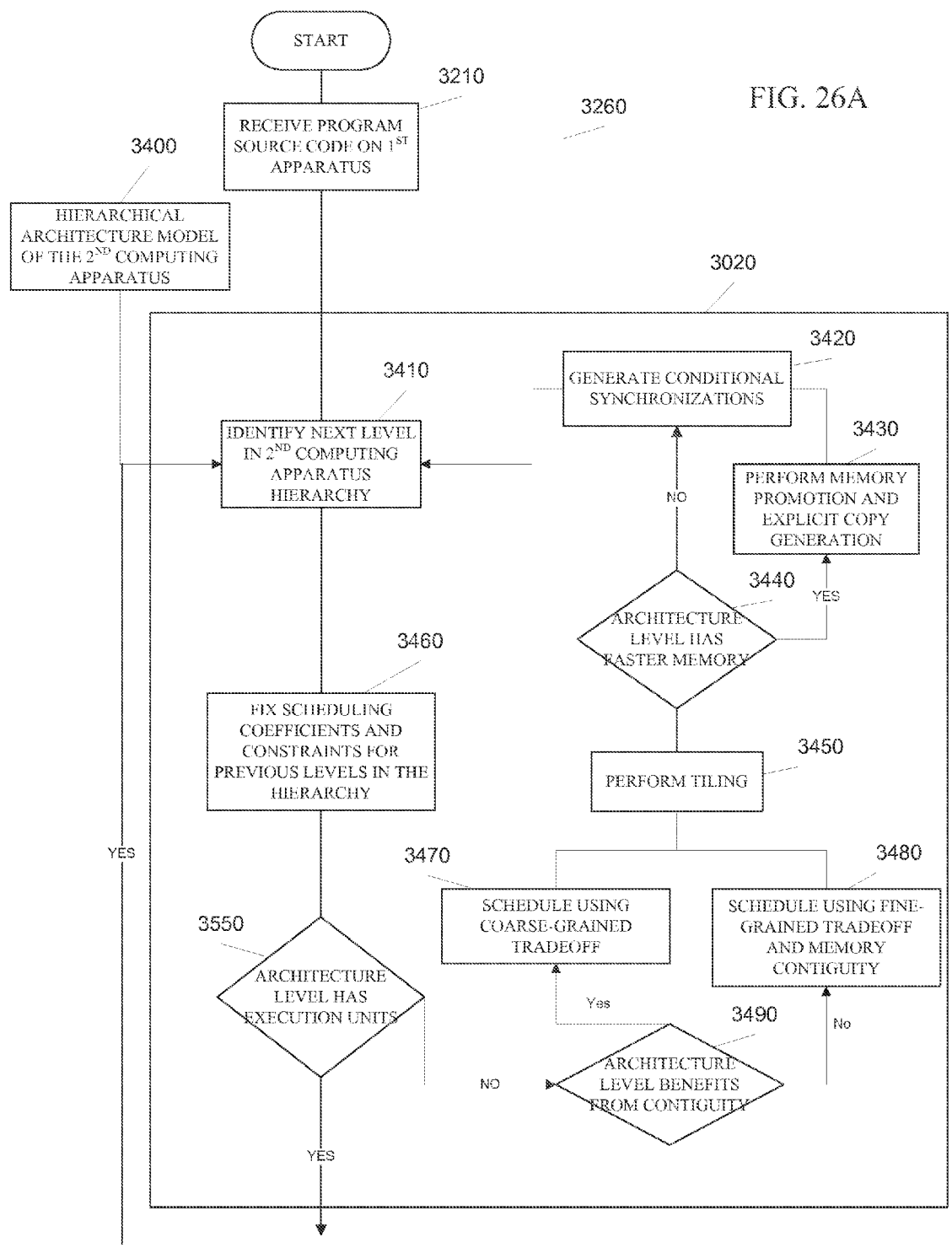
FIGS. 26A and 26B illustrate other embodiments of provided methods.
Figure 26B:
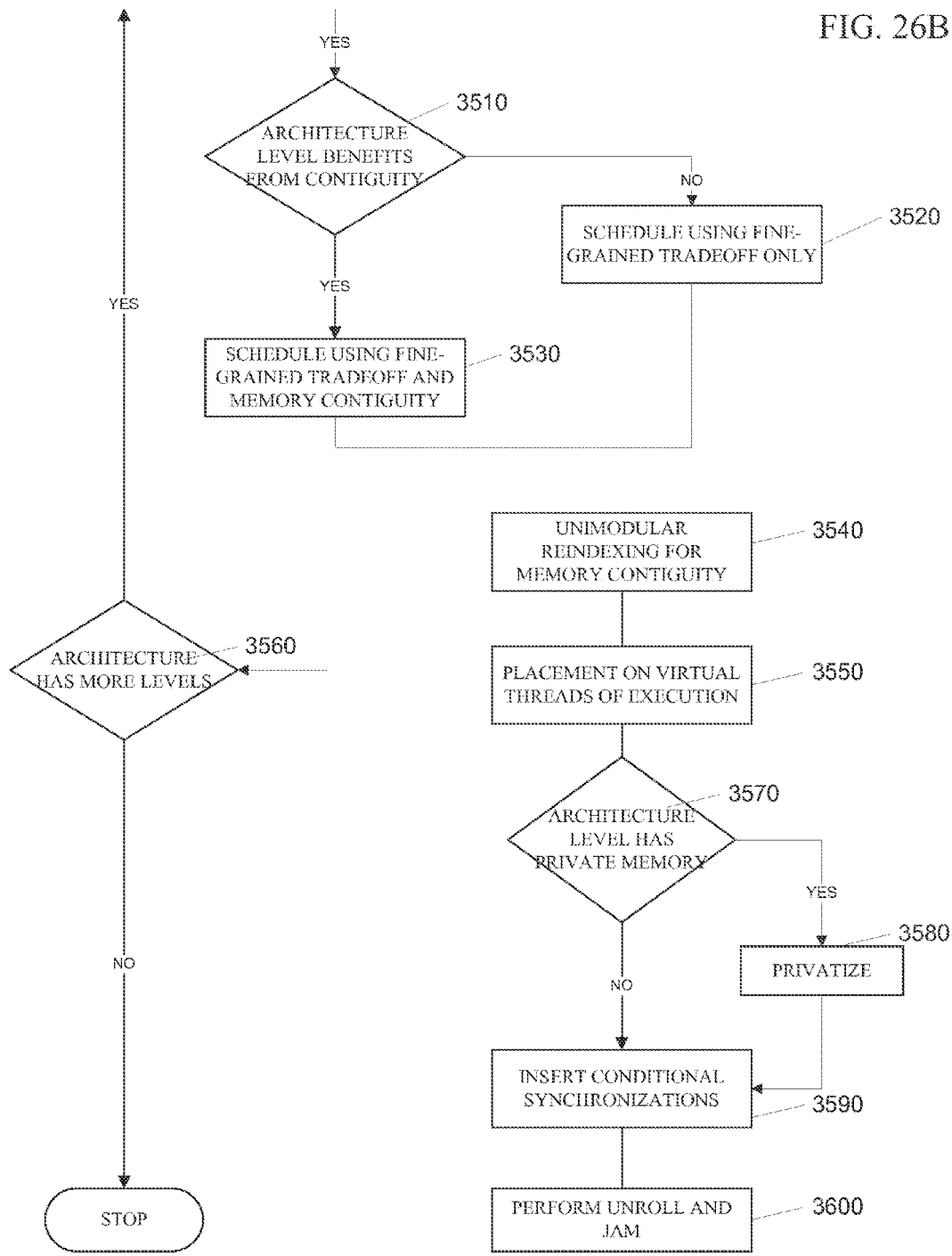

Various provided embodiments of method 3260 are illustrated in FIGS. 26A and 26B. In these embodiments, flow begins in block 3210 where program source code is received in a memory on a first computing apparatus. In block 3400 the hierarchical architecture of a second computing apparatus is provided to the first computing apparatus, or in some embodiments derived by the first computing apparatus. Flow continues to block 3410 where the next level of computing hierarchy of the second computing apparatus is identified. Flow then continues to block 3460 where scheduling coefficients and constraints are fixed for the prior level of hierarchy under consideration. Flow then continues to decision block 3500 where it is determined if the architecture level under consideration contains execution units. If no execution units are present at the level under consideration, flow continues to block 3490 where it is determined if the architecture at that level can benefit from contiguity. If so flow continues to block 3480 where scheduling is performed using fine grained tradeoff and memory contiguity. If not, flow continues to block 3470 where scheduling is performed using a coarse grained tradeoff. Flow then continues to block 3450 where tiling is performed. At decision block 3440 it is determined if the architecture contains faster memory than the one currently targeted at the level under consideration. If so, memory promotion and explicit copy operations are performed in block 3430. If not, flow continued to block 3420 where conditional synchronizations are generated. Flow then continues back to block 3410 and iterates through the remaining levels of hierarchy.

Returning to decision block 3500 if it is determined that the level under consideration contains execution units, flow continues to block 3510 where it is determined whether the current level under consideration benefits from contiguity. If so flow continues to block 3530 where scheduling is performed using fine-grained tradeoff and memory contiguity. If not flow continues to block 3520 where scheduling is performed using fine grained tradeoff only. Flow then continues to block 3540 where unimodular re-indexing for memory contiguity is performed. Flow then continues to block 3550 where placement of code onto the virtual execution threads is performed. Flow then continues to decision block 3570 where it is determined if the level under consideration contains private memory. If so, some embodiments, privatize the tasks and associated data in block 3580 and flow continues to block

3590. If the level under consideration does not contain private memory, flow continues directly to block 3590 where conditional synchronizations are inserted. Flow then continues to block 3600 where unroll and jam operations are performed, then to decision block 3560 where it is determined if the architecture on the second computing apparatus contains additional levels. If there are additional levels of hierarchy, flow continues back to block 3410 and iterates until all levels have been considered.

For example, consider the following code representing a 3-dimensional Jacobi iteration stencil. In a first loop, the array elements A[i][j][k] are computed by a weighted sum of the 7 elements, B[i][j][k], B[i−1][j][k], B[i+1][j][k], B[i][j−1][k], B[i][j+1][k], B[i][j][k−1] and B[i][j][k+1]. In a symmetrical second loop, the array elements B[i][j][k] are computed by a weighted sum of 7 elements of A. The computation is iterated Titer times.

```
for (t=0; t<Titer; t++) {
  for (i=1; i<N-1; i++) {
    for (j=1; j<N-1; j++) {
      for (k=1; k<M-1; k++) {
        A[i][j][k] = C0*B[i][j][k] + C1*(sum(B[...][...][...])); // S0(i,j,k);
}}}
  for (i=1; i<N-1; i++) {
    for (j=1; j<N-1; j++) {
      for (k=1; k<M-1; k++) {
        B[i][j][k] = C0*A[i][j][k] + C1*(sum(A[...][...][...])); // S1(i,j,k);
}}}}
```

When computing a schedule for the first level of parallelism (the multiple cores) embodiments may produce the following optimized code in which permutable loops are marked as such.

```
for (i=0; i<=Titer-1; i++) /* perm*/ {
  for (j=0; j<=254; j++) /* perm */ {
    for (k=max(j-253, 2*i); k<=min(2*i+254,j+253); k++) /* perm */ {
      for (l=max(2*i, k+-253, j-253); l<=min(j+254, 2*i+255,
        k+254); l++) /* perm */ {
        if (j<=253 && 2*i-k>=-253 && 2*i-l>=-254) {
          S0(j+1, k-2*i+1, l-2*i+1);
        }
        if (j>=1 && -2*i+k>=1 && -2*i+l>=1) {
          S1(j, k-2*i, l-2*i);
}}}}}
```

In this form, the loops have been fused at the innermost level on loop l and the coarse-grained parallelism and locality are optimized by a first scheduling function that orchestrates the operations in the program as coarse-grained tasks of parallel execution. More specifically, the schedule represented by the following α/β/γ components correspond to one possible outcome of provided embodiments that generate the code above, after the first optimization: for statement S0: α=(i, j, 2*i+k, 2*i+l), β=(0, 0, 0, 0, 0) and γ=(0, 0, 0, 0); for statements S1: α=(i, j, 2*i+k, 2i+l), β=(0, 0, 0, 0, 1) and γ=(0, 1, 1, 1).

Loop tiling by tiling factors (16, 8, 8, 1) may be applied to further improve locality and the program would have the following form, where the inner loops m, n, o are permutable.

```
for (i=0; i<=floorDiv(Titer -1, 16); i++) { /* perm*/
  for (j=2*i; j<=min(2*i+17, floorDiv(Titer+126, 8)); j++) { /* perm*/
    for (k=max(2*i, j-16); k<=min(floorDiv(Titer+126,8),j+16,2*i+17);
      k++) { /*perm*/
      for (l=max(16*i, 8*k-127, 8*j-127); l<=min(Titer-1, 16*i+15,
        8*j+7); l++) {
/* perm*/
        for (m .....) /* perm */
          for (n .....) /* perm */
            for (o .....) /* perm */
              if (condition1) {
                S0(m,n,o)
              }
              if (condition2) {
                S1(m,n,o); }}}}}}}
```

Without further optimization, the loops are fused on all loops i,j,k,l,m,n and o. In this form, the program does not take advantage of fine grained parallelism and contiguity on each fine grained parallel execution unit along the loops m, n and o. More specifically, the following α/β/γ components correspond to one possible outcome of provided embodiments that generate the code above, after tiling optimization: for statement S0: α=(i, j, k, l, m, 2*m+n, 2*m+o), β=(0, 0, 0, 0, 0, 0, 0, 0) and γ=(0, 0, 0, 0, 0, 0, 0); for statements S1: α=(i, j, k, l m, 2*m+n, 2*m+o), β=(0, 0, 0, 0, 0, 0, 0, 1) and γ=(0, 0, 0, 0, 1, 1, 1). It is a further object to perform a second optimization of another selective tradeoff to express maximal innermost parallelism and contiguity at the expense of fusion. The selective tradeoff gives a much more important cost to parallelism than locality and in some aspects may find a different schedule for the intra-tile loops that result in a program that may display the following pattern:

```
for (i=0; i<=floorDiv(Titer -1, 16); i++) { /* perm */
  for (j=2*i; j<=min(2*i+17, floorDiv(Titer+126, 8)); j++) { /* perm */
    for (k=max(2*i, j-16); k <= min(floorDiv(Titer+126, 8), j+16, 2*i+17);
      k++) {
/* perm */
      for (l=max(16*i, 8*k-127, 8*j-127); l<=min(Titer-1, 8*k+7, 16*i+15,
        8*j+7); l++) {
/* perm */
        if (-8*k+l>=-126) {
          doall (m = max(0, 16 * j -2 * l); m <= min(16 * j -2 * l + 15, 253);
            m++) {
            doall (n = max(0, 16 * k -2 * l); n <= min(16 * k -2 * l + 15, 253);
              n++) {
              doall (o = 0; o <= 254; o++) {
                S0(1 + m,1 + n,1 + o);
}}}}
        doall (m=max(0, 16*j-2*l-1); m<=min(16*j-2*l+14, 253); m++) {
          doall (n=max(16*k-2*l-1, 0); n <= min(253, 16*k-2*l+14); n++) {
            doall (o=0; o<=254; o++) {
              S1(1 + m,1 + n,1 + o);
}}}}}}}
```

The innermost doall dimensions traverse memory with contiguous accesses. It is a further object to allow this successive optimizations. We do as follows using the provided generalized tradeoff of parallelism, locality and contiguity formulation. In a first step one embodiment, we may give a very low priority to contiguity constraints. In a further embodiment, we may achieve this goal by setting all the costs of contiguity references to zero. In a second step of some embodiments, tiling may be performed to create coarse grained tasks of execution. Performing tiling to create tasks of execution is a well-known process to an engineer skilled in the art. In a third step of this embodiment, we may give a very low priority to fusion constraints. In another embodiment, we may achieve this goal by setting all the costs of fusion to zero. It is a further object to explicitly force the α/β/γ component values of the statements S0 and S1 to retain the values optimized during the first optimization on a certain number of dimensions. This corresponds to fixing schedule coefficients to enforce invariance of parallelism, locality and contiguity of memory references across the plurality of selective tradeoffs. For statement S0 we may enforce: α=(i, j, k, 1, ?, ?, ?), β=(0, 0, 0, 0, ?, ?, ?, ?) and γ=(0, 0, 0, 0, ?, ?, ?); for statements S1: α=(i, j, k, 1, ?, ?, ?), β=(0, 0, 0, 0, ?, ?, ?, ?) and γ=(0, 0, 0, 0, ?, ?, ?); where "?" mean no additional constraint is enforced. After a second application of provided embodiments, the following schedules may be generated: for statement S0: α=(i, j, k, 1, m, n, o), β=(0, 0, 0, 0, 0, 0, 0, 0) and γ=(0, 0, 0, 0, 0, 0, 0); for statements S1: α=(i, j, k, 1 m, n, o), β=(0, 0, 0, 0, 1, 0, 0, 0) and γ=(0, 0, 0, 0, 0, 0, 0).

In a further embodiment, the schedules that produce the innermost doall dimensions may be further used to produce another level of multi-level tiling hyperplanes. The engineer skilled in the field will appreciate multi-level tiling will be useful to perform transformations such as register tiling. The resulting code may have the following structure:

```
for (i=0; i<=floorDiv(Titer -1, 16); i++) { /* perm */
  for (j=2*i; j<=min(2*i+17, floorDiv(Titer+126, 8)); j++) { /* perm */
    for (k=max(2*i, j-16); k <= min(floorDiv(Titer+126, 8), j+16, 2*i+17); k++) {
      /* perm */
      for (l=max(16*i, 8*k-127, 8*j-127); l<=min(Titer-1, 8*k+7, 16*i+15, 8*j+7); l++) {
        /* perm */
        if (-8*k+l>=-126) {
          doall (m ...) {
            doall (n ...) {
              doall (o ...) {
                doall (p ...) {
                  doall (q ...) {
                    doall (r ...) {
                      S0(1 + p,1 + q,1 + r);
          }}}}}}}
          doall (m ...) {
            doall (n ...) {
              doall (o ...) {
                doall (p ...) {
                  doall (q ...) {
                    doall (r ...) {
                      S1(1 + p,1 + q,1 + r);
}}}}}}}}}}}
```

It is a further object to represent the target architecture using a representative model and to exploit this model in the different steps of the optimization. Different embodiments may use different machine models for the same architecture and explore different tradeoffs based on features of the machine model. Machine models can be composed hierarchically and the smallest machine model granularity for which embodiments optimize a program is denoted as a morph. In some embodiments, the machine model for a single GPU has one single morph, and only represents the GPU level of the machine model. In one embodiment, the GPU-specific attributes for a GeForce 9800GX2 are:

```
<entry key="gpu.gpu.major_revision">1</entry>
<entry key="gpu.gpu.minor_revision">1</entry>
<entry key="gpu.gpu.multi_processors">16</entry>
<entry key="gpu.gpu.cores">128</entry>
<entry key="gpu.gpu.registers_per_block">8192</entry>
<entry key="gpu.gpu.warp_size">32</entry>
<entry key="gpu.gpu.max_threads_per_block">512</entry>
<entry key="gpu.gpu.max_thread_sizes">[512,512,64]</entry>
<entry key="gpu.gpu.max_grid_sizes">[65536,65536]</entry>
```

The GeForce 9800GX2 has 32K of shared memory. However, allocating the full 32K for shared memory arrays will leave not enough room for other GPU resources. Other embodiments may restrict the shared memory size to only 16K to affect the tiling and the local memory compaction phases of the mapper.

```
<entry key="mem.local_gpu.size">[16K]</entry>
```

Automatic Optimization for Massively Multi-Threaded Architectures.

Figure 25A:
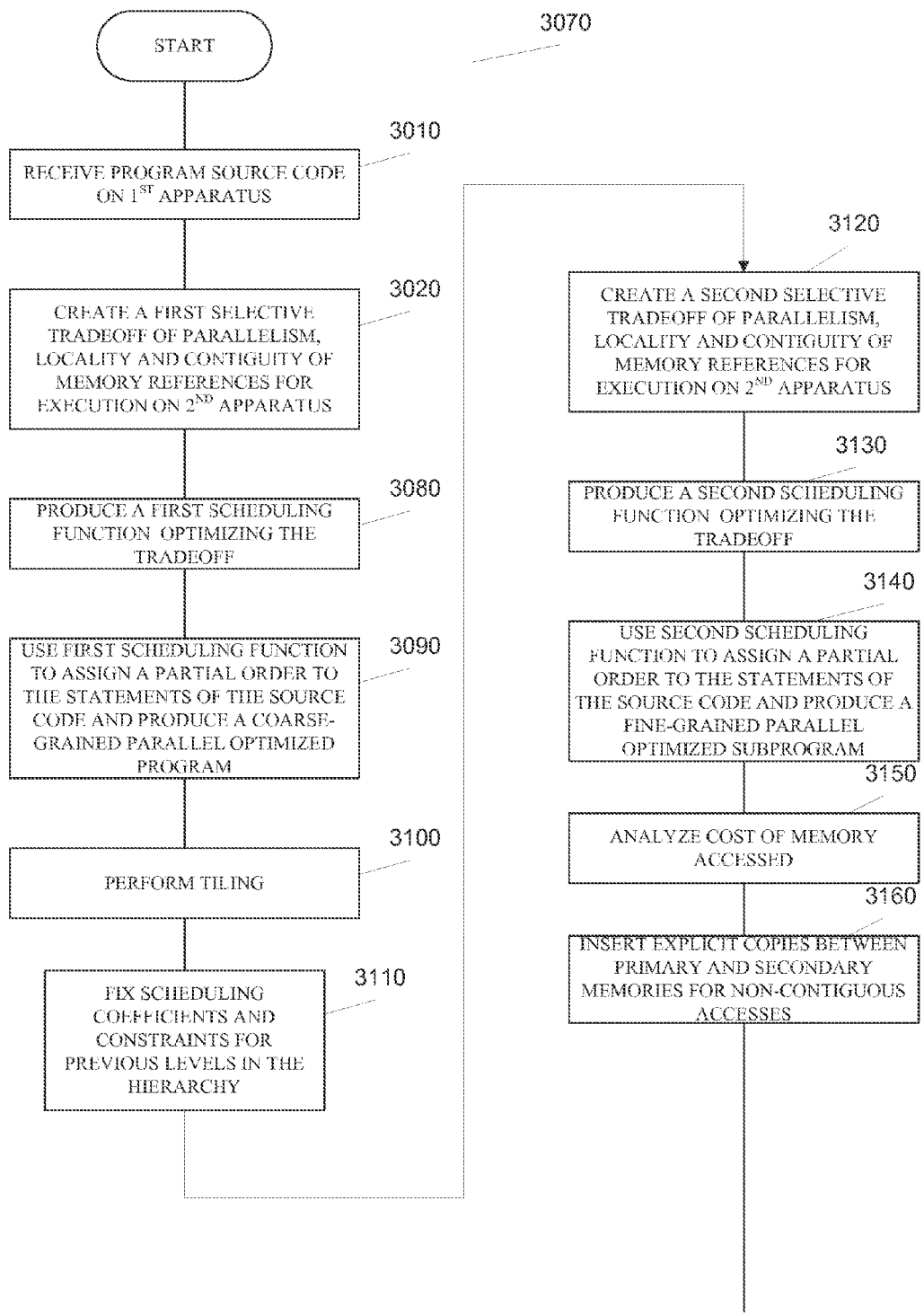
FIGS. 25A and 25B illustrate other embodiments of provided methods.
Figure 25B:
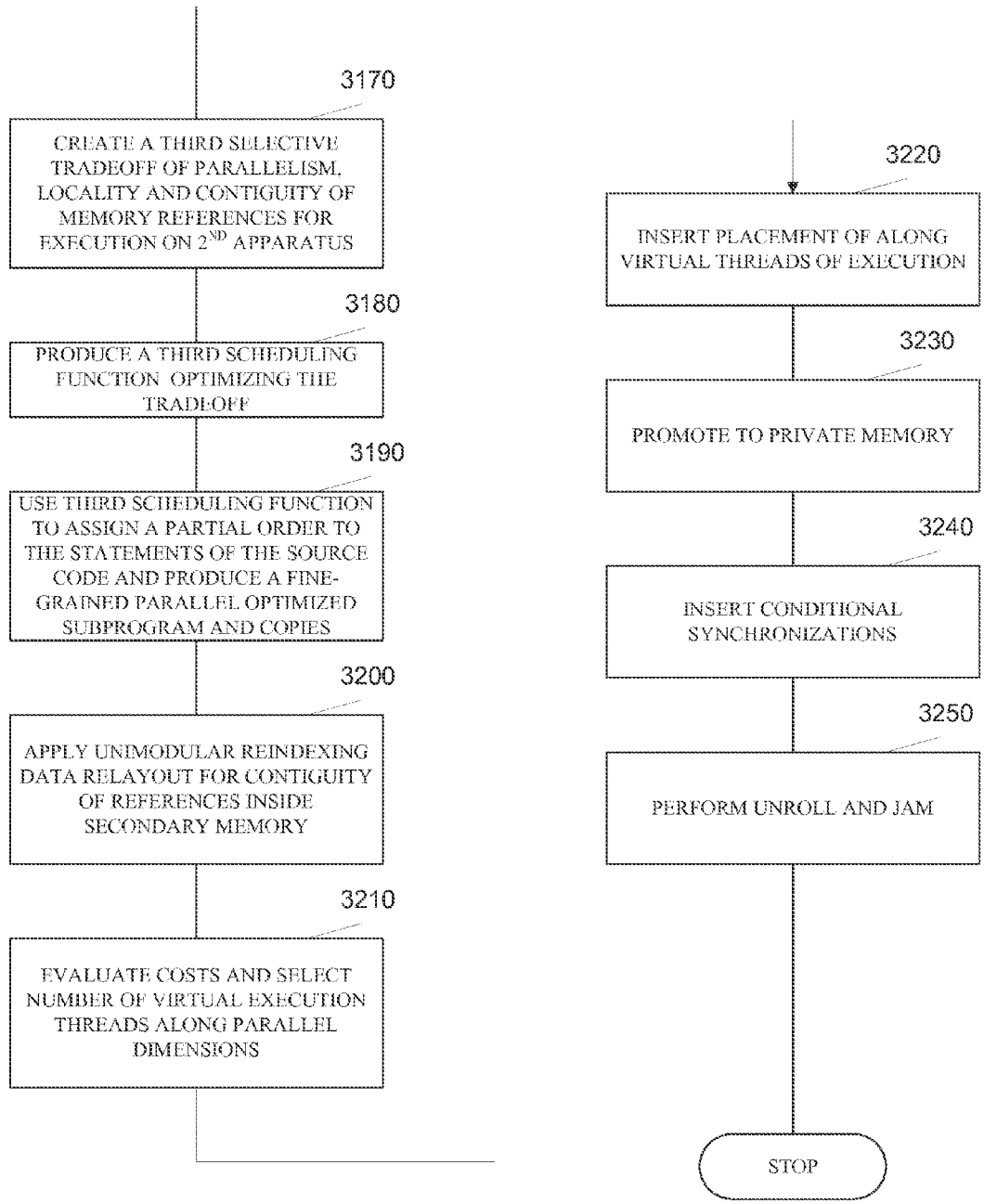

Another provided embodiment of an optimization method is illustrated in FIGS. 25A and 25B. In this illustration flow begins at block 3010 where source code is received in a memory on a first computing apparatus. Flow then continue to block 3020 where a first selective tradeoff of parallelism, locality, and contiguity of memory references for execution of the code on a second computing apparatus is created. Flow then continues to block 3080 where a first scheduling function is produced that optimizes the first selective tradeoff. Flow then continues to block 3090 where the first scheduling function is used to assign a partial order to the statements of the source code and produce a coarse grained parallel optimized program. Flow then continues to block 3100 where tiling is performed. Flow then continues to block 3110 where scheduling coefficients and constraints are fixed for the previous levels in the hierarchy.

Flow then continues to block 3120 where a second selective tradeoff of parallelism, locality, and contiguity of memory references for execution of the code on the second computing apparatus is created. In block 3130 a second scheduling function is produced that optimizes the second tradeoff and flow continues to block 3140 where the second scheduling function is used to assign a partial order of statements in the code and produce a fine grained parallel optimized program. Flow then continues to block 3150 where the costs of memory access in the program are analyzed. In block 3160 explicit copies of memory accessed are inserted between primary and secondary memory memories for non-contiguous access.

Flow then continues to block 3170 where a third selective tradeoff of parallelism, locality, and contiguity of memory references for execution of the code on the second computing apparatus is created. In block 3180 a third scheduling function is used to assign a partial order to the statements of the source code and to produce a fine grained parallel optimized subprogram and copies. Flow then continues to block 3200 where a unimodular re-indexing data re-layout transformation is applied for contiguity of references inside the second memory. Flow then continues to block 3210 costs are evaluated and a number of virtual execution threads along parallel dimensions is selected. Flow then continues to block 3220 where the code is placed along the virtual execution threads. In block 3230 the referenced memory is promoted to private memory, conditional synchronizations between the virtual execution threads are inserted in block 3240 an unroll and jam transformation is then performed in 3250.

It is a further object to automatically optimize programs for execution on massively multi-threaded hardware. Massively multi-threaded hardware is defined as hardware that exhibits more virtual threads of execution than physical threads of execution. The hardware (or sometimes the runtime layer) manages the physical scheduling of virtual threads to the actual physical processing units during execution. For the purpose of illustration we will use the CUDA programming model for execution on GPGPUs. Modern General Purpose Graphics Processing Units (GPGPUs) are massively parallel multiprocessors capable of high floating point operations performance and large memory bandwidth. While GPGPU programming is eased by the introduction of higher level data parallel languages such as CUDA, maximizing the performance of an application still requires the precise balancing of many different types of constraints in the GPU architecture, including the utilization of SIMD and coarse-grained data parallelism, and the management of the memory hierarchy. The typical architecture of modern GPUs consists of array SIMD multiprocessors that share a global address space, subdivided into multiple types of memories. The execution model of such architecture is the following: each GPU multiprocessor executes a set of parallel threads (typically 32) as a single "warp" in a SIMD manner. Multithreading between large a number of cores is used to hide the latency of memory transfers and thread synchronization. Given such architectural constraints, a CUDA kernel generated by embodiments and executed on the GPU may exhibit the following standard (pseudo code) form: a set of perfectly nested parallel doall-loops divided in a set of outer synchronization-free threads blocks (blocks for short), then further subdivided into a set of inner parallel threads. The tripcounts for the block (B1, B2, B3) and thread dimensions (T1, T2, T3) are limited by architectural resources. Threads belonging to the same block can synchronize with each other and access their own subset of shared memory. Each thread also contains its own private local memory and registers, which can be used to hold thread-private data.

```
doall_block (i = 0; i < B1; i++)
 doall_block (j = 0; j < B2; j++)
  doall_block (k = 0; k < B3; k++) {
   ____shared____ shared memory
   doall_threads (ii = 0; ii < T1; ii++)
    doall_threads (jj = 0; jj < T2; jj++)
     doall_threads (kk = 0; kk < T3; kk++)
      local memory
      S;
  }
```

It is a further objective to take programs written in a high-level language such as C and automatically transform them into programs in CUDA by performing loop and data transformations, alleviating all the resource management and assignment tasks that are necessary to program in CUDA. It is another objective to perform "system level mapping", in which the program's data is in the main memory of a system and has to be explicitly transferred to/and from the GPU and the CPU. In further embodiments the general structure of the code produced by various embodiments may be related to the tripcounts for the GPU cards (C1, C2); limited by architectural resources look like:

```
doall_card (ii = 0; ii < C1; ii++)
 doall_card (jj = 0; jj < C2; jj++) {
  ____device____ device memory
  doall_block (i = 0; i < B1; i++)
   doall_block (j = 0; j < B2; j++)
    doall_block (k = 0; k < B3; k++) {
     ____shared____ shared memory
     doall_threads (ii = 0; ii < T1; ii++)
      doall_threads (jj = 0; ii < T2; jj++)
       doall_threads (kk = 0; kk < T3; kk++)
        local memory
        S;
    }
 }
```

To clarify the presentation of various embodiments, we shall illustrate them using a simple 4096×4096 single precision matrix multiply kernel as our standard running example.

```
#define N 4096
float A[N][N], B[N][N], C[N][N];
void kernel( ) {
 for (i = 0; i < N; i++) {
  for (j = 0; j < N; j++) {
   C[i][j] = 0;
   for (k = 0; k < N; k++) {
    C[i][j] = C[i][j] + A[i][k] * B[k][j];
}}}}
```

In one embodiment the standard target is one core of the GeForce 9800GX21. While we disclose embodiments on a very simple kernel, mapping it onto a massively multi-threaded architecture is already a non-trivial task, and the mapping process will demonstrate many of the benefits of various embodiments.

One embodiment solves two main problems in CUDA mapping: (i) assigning the available set of parallelism to blocks and threads, and (ii) managing the memory hierarchies. The problems are currently handled by various embodiments using the following sub-phases:

a. Expose parallelism via affine scheduling,
b. Use tiling (aka blocking) to divide the iteration space into tiles, such that each tile fits within the constraints of a thread block.
c. Promote variables in device memory to shared memory via shared memory promotion.
d. Finally, perform CUDA kernel formation. This phase extracts and transforms loops that can be put into the form of a CUDA kernel.

The kernel formation task can be further decomposed into a set of sub-tasks:

e. Block and thread placement—determine the loop dimensions that can be mapped onto the block and thread grids of the GPU.
f. Privatization—promote shared memory to thread-local memory.
g. Unroll and jam—to reduce control overhead.
h. Thread synchronization insertion—insert thread synchronization to preserve the original semantics of the program.

It is an objective to perform a selective tradeoff of fusion, parallelism and contiguity costs to expose all the available parallelism in the program, including both coarse-grained and fine-grained parallelism. In one embodiment, the strategy consists of transforming coarse-grained parallelism into the thread block parallelism in a CUDA kernel, and fine-grained parallelism into SIMD parallelism within a thread block. In the running example, the available amount of parallelism is easy to expose, and the resulting loop nests are as follows:

```
doall (i = 0; i < 4096; i++)
 doall (j = 0; j < 4096; j++) {
  C[i][j] = 0;
  reduction (k = 0; k < 4096; k++)
   C[i][j] = C[i][j] + A[i][k] * B[k][j];
}}
```

In further embodiments, tiling is applied as the next step. Tiling is of common knowledge for the engineer knowledgeable in the art. The tiling algorithm chooses a tile size that satisfies the following criteria:

i. The footprint of the tile does not exceed the size of the shared memory.
j. The tile size balances the amount of computation and communication between tiles.

The first constraint ensures that the all the memory storage within one tile after tiling can be fit within the local memory of the GPU. In other embodiments, a tile size of 32×32×32 is chosen, and the resulting loop nests loop is:

```
doall (i = 0; i <= 127; i++) {
   doall (j = 0; j <= 127; j++) {
      doall (k = 32 * i; k <= 32 * i + 31; k++) // intra-tile starts here
         doall (l = 32 * j; l <= 32 * j + 31; l++)
            C[k][l] = 0;
      reduction_for (k = 0; k <= 127; k++)
         doall (l = 32 * i; l <= 32 * i + 31; l++) // intra-tile starts here
            doall (m = 32 * j; m <= 32 * j + 31; m++)
               reduction_for (n = 32 * k; n <= 32 * k + 31; n++)
                  C[l][m] = C[l][m] + A[l][n] * B[n][m];
   }
}
```

It is a further object to perform a shared memory promotion step and to promote the memory used within a tile to the secondary shared memory. Copies between the device memory and shared memory are inserted during this transformation. It is another object to perform Local Memory Compaction of the shared memory as disclosed in a previously filed patent application. It is yet another object of to insert explicit copies between memory locations in the primary and memory locations in the secondary memory. In the following pseudo-code, the _device_memory corresponds to the original primary memory and the _shared_memory to the memory locations in the secondary memory. In some embodiments, the result is:

```
____shared____ float C__l[32][32];
____shared____ float A__l[32][32];
____shared____ float B__l[32][32];
____device____ float A[4096][4096];
____device____ float B[4096][4096];
____device____ float C[4096][4096];
doall (i = 0; i <= 127; i++) {
   doall (j = 0; j <= 127; j++) {
      doall (k = 0; k <= 31; k++)
         doall (l = 0; l <= 31; l++)
            C__l[k][l] = 0;
      reduction_for (k = 0; k <= 127; k++) {
         doall (l = 0; l <= 31; l++)
            doall (m = 0; m <= 31; m++)
               B__l[l][m] = B[32 * k + l][32 * j + m];
         doall (l = 0; l <= 31; l++)
            doall (m = 0; m <= 31; m++)
               A__l[l][m] = A[32 * i + l][32 * k + m];
         doall (l = 0; l <= 31; l++)
            doall (m = 0; m <= 31; m++)
               reduction_for (n = 0; n <= 31; n++)
                  C__l[l][m] += A__l[l][n] * B__l[n][m];
      }
      doall (l = 0; l <= 31; l++)
         doall (m = 0; m <= 31; m++)
            C[32 * i + l][32 * j + m] = C__l[l,m];
   }
}
```

It is a further object to transform code of the previous form into CUDA kernels. This step in general involves a sequence of "orthogonal" loop and data transformations, including, loop fusion, fission, interchange, stripmining, and data permutation. The first step of this process is block and thread placement, i.e., determining the set of loop dimensions to be used for block and thread dimensions. This first step is related to the contiguity properties of the optimized program. Modern GPUs implements memory coalescing, whereby aligned stride-1 array accesses assigned to adjacent threads are merged into a single memory transaction. By taking advantage of this hardware feature, programs can drastically improve their memory transfer rate. However, memory coalescing interacts with data layout and thread placement in non-trivial way, and so the two optimizations must be determined together.

As an illustration, consider the following parallel loop nests with one single reference of interest:

```
doall (i = 0; i < 32; i++)
   doall (j = 0; j < 32; j++)
      ... A[i,j] ...
```

To optimize the reference so that the each successive thread accesses adjacent elements of the data array, some embodiments may interchange loops i and j, and designate the j loop as the thread dimension. The resulting transformation is shown below:

```
doall_threads (j = 0; j < 32; j++)
   for (i = 0; i < 32; i++)
      ... A[i,j] ...
```

Similarly, consider the following parallel loop nests with also one single reference of interest:

```
doall (i = 0; i < 32; i++)
   doall (j = 0; j < 32; j++)
      ... A[i,2*j] ...
```

In row major storage mode, data dimension 1 of A, accessed via a non-stride 1 access (2*j), cannot be optimized via memory coalescing. It is a further object to devise a data layout transformation that transposes the data layout of A and destinates loop i as the thread dimension:

```
doall_threads (i = 0; i < 32; i++)
   for (j = 0; j < 32; j++)
      ... A_t[2*j,i] ...
```

It is a further object to perform the following tasks:
Analyze memory coalescing costs; and
Perform a scheduling where contiguity of memory references is given the most weight; and
Assign the proper loop iterations to the thread and block dimensions of a GPU kernel via strip-mining and loop interchanges; and
Transform imperfect loop nests into a perfectly nested loop nests CUDA kernel via strip-mining, fusion and loop interchanges; and
Optimize the data layout of arrays
Memory coalescing analysis
For each array reference A[f(x)], define a coalescing tuple (A, d, j,w) as follows:
A is an array; and
d is an array dimension of A, indexed from 0; and
j is a potential thread loop dimension (i.e., it must be a parallel intra-tile loop dimension); and
w is the weight, which measures how much benefit there is if the given reference is coalesced.
Intuitively, a coalescing tuple (A, d, j,w) for a reference A[f (x)] means that if data dimension d of A is made the right-most data dimension 2 and if j is made the outer-most thread dimension, we gain a performance benefit of w in the program.

In some embodiments, the weight w of non-contiguous access is computed via the following estimate:
k. The total trip-count of reference is used as the initial estimate of w.
l. A reference is device memory is slower to execute than from shared memory, the slowing factor related to the relative speed of the load/store from device and shared memory. In further embodiments, this value is determined by the runtime cost of a code representative of load and stores to and from the device and shared memories.

As an illustration of various embodiments, consider this loop nest:

```
doall (j = 0; j < Q; j++)
    doall (i = 0; i < P; i++)
        doall (k = 0; k < R; k++)
            ... A[i,j] + A[i,k] + A[i+j,32*i+j] // S
```

The tuples produced for all the references are as follows: for A[i,j], the triples are [(A, 0, i, PQR), (A, 1, j, PQR)]; for A[i,k], the triples are [(A, 0, i, PQR), (A, 0, k, PQR)]; and for A[i+j,32\*i+j], the triples are [], (i.e., no memory coalescing is possible)

In some embodiment, unified parallelism, locality and contiguity optimization finds the following loop structure with contiguity along dimension i:

```
doall (i = 0; i < P; i++)
    doall (j = 0; j < Q; j++)
        doall (k = 0; k < R; k++)
            ... A[i,j] + A[i,k] + A[i+j,32*i+j] // S
```

This loop structure corresponds to α/β/γ component values given by: α=(j, i, k), β=(0, 0, 0, 0) and γ=(0, 0, 0). Assuming C-style data layout, a simple exhaustive algorithm finds it is beneficial to transpose the layout of array A to enforce as much contiguity as possible along the innermost dimension of A:

```
doall (i = 0; i < P; i++)
    doall (j = 0; j < Q; j++)
        doall (k = 0; k < R; k++)
            ... A[j, i] + A[k, i] + A[32*i+j, i+j] // S
```

The triples for the statement S can be computed by merging the triples for its references. In this case we have: [(A, 0, i, 2PQR), (A, 1, j, PQR), (A, 0, k, PQR)]. By exhaustive inspection, a further embodiment finds it is most beneficial to choose loop i as the outermost thread dimension. The resulting code is:

```
doall_threads (i = 0; i < P; i++)
    for (j = 0; j < Q; j++)
        for (k = 0; k < R; k++)
            ... A_t[j,i] + A_t[k,i] + A_t[32*i+j,i+j] // S
```

The first two references are optimized to take advantage of coalescing.

Costs of Synchronizations

In further embodiments, additional costs for the synchronizations between threads are introduced to account for non-parallel loop dimensions. This is because using an inner doall loop as a thread dimension can increase the amount of synchronization that we require in the final CUDA kernel. For example, consider the following loop nest with two parallel and one interleaved sequential loop dimensions:

```
doall (i = 0; i < 16; i++)
    for (j = 0; j < 16; j++)
        doall (k = 0; k < 128; k++)
            S;
```

If the dimension i is chosen as the thread dimension, then no synchronization code is required:

```
doall_threads (i = 0; i < 16; i++)
    for (j = 0; j < 16; j++)
        for (k = 0; k < 128; k++)
            S;
```

On the other hand, some embodiments may choose loop k as the thread dimension. In such embodiments, a _syncthreads_ call is inserted in the output code to preserve the semantics of the original program as follows:

```
doall_threads (k = 0; k < 128; k++)
    for (i = 0; i < 16; i++)
        for (j = 0; j < 16; j++) {
            S;
            __syncthreads__( );
        }
```

Since the loop i was originally a doall loop, the selective tradeoff of parallelism, locality and contiguity can also sink it below the loop j, and hoist the thread synchronization call. This results in the following improved code with fewer number of synchronizations:

```
doall_threads (k = 0; k < 128; k++)
    for (j = 0; j < 16; j++) {
        for (i = 0; i < 16; i++)
            S;
        __syncthreads( );
    }
```

It is an object of provided embodiments to deduct a thread synchronization penalty from the weight of a coalescing tuple. Thread synchronization code is required if a loop dimension is nested under a sequential loop within a tile. In some embodiments, the total penalty of the synchronization is proportional to the trip count of the sequential loops, which is an estimate of the minimal amount of thread synchronization calls that the program has to execute per block.

It is another object of provided embodiments to reflect the cost of the synchronizations in the selective tradeoff for locality, parallelism and contiguity. In some embodiments, this is achieved by multiplying the benefit of outermost doall loops by constants proportional to the inverse of the depth of the loop.

Computing Memory Coalescing for Arbitrary Loop Nests

It is an object of provided embodiments to generalize the previous analysis to imperfectly nested loops with multiple statements. Consider two coalescing tuples (A, d, j,w) and (A0, d0, j0,w0) for statements S and S0 respectively (S could be equal to S0.) We say that the two tuples are compatible if:
m. If A=A0, then d=d0. Intuitively, this means that the two tuples must describe compatible data layout.
n. If l loop in S and j0-loop in S0 are nested under some common loop nests; and if the j-loop or the j0-loop belongs to this common part, then j=j0.

The meaning of the second condition can best be explained via an example. Consider the following loop nests:

```
doall (i = 0; i < 32; i++) {
    doall (j = 0; j < 32; j++)
        ... A[i,j] ...; // S1
    doall (k = 0; k < 32; k++)
        doall (l = 0; l < 32; k++)
            ... A[i,k] + B[k,l] ...; // S2
}
```

Statement S1 and S2 have the i-loop in common. The condition (2) states that if this embodiment chooses the i-loop for a thread dimension of S1, then it also has to use it for the thread dimension of S2. On the other hand, if the embodiment chooses the j-loop for the thread dimension for S1, then it has the freedom to use the k- or l-loop for the thread dimension of S2.

Given the definition of compatibility, it is another object of provided embodiments to optimize memory coalescing as follows: given a set of coalescing tuples T, find a compatible subset of T, Topt, such that the weight of Topt is maximized. The pseudo-code of an algorithm achieving this optimization is as follows:

```
for i = 1 ... 3 do
    if i = 1 then enable coalescing heuristics end if
    Find a new thread dimension from the intra-tile loops
    if too many threads are used then
        break;
    end if
end for
for i = 1 ... 3 do
    Find a new block dimension from the inter-tile loops
    If enough blocks are used then
        break;
    end if
end for
```

Choosing Other Thread and Block Dimensions

The previous method is used, in some embodiments, to determine the threads and block dimensions. In further embodiments, we find one dimension at a time, starting from the first thread dimension. During the selection of the first thread dimension, memory coalescing optimization is considered. When choosing other thread and block dimensions (where memory coalescing is no longer a concern), some embodiments may use the following heuristics instead:
  a. Choose the loop dimensions with the maximum trip-count. This ensures the trip count is maximized.
  b. For a thread, the loop dimensions j and j0 of any two statements S and S0 must be thread-compatible: i.e., either j=j0, or else j is not nested under j0 or vice versa.
  c. For a block, the loop dimensions j and j0 of any two statements S and S0 must be block-compatible: i.e., j=j0.
This last restriction for block-compatibility can be clarified by the following example. Suppose we have the following inter-tile loop dimensions:

```
doall (i = ...) {
    doall (j = ...) {
        S1;
    }
    doall (k = ...) {
        S2;
    }
}
```

In further embodiments, can only choose loop-i as the block dimension for S1 and S2, i.e., it is illegal to choose j as the block dimension for S1 and k for S2. This is because the merging transformation cannot be applied to parallel block loops, only to parallel thread loops; i.e., blocks must be synchronization-free. The result of block and thread placement on the running example is shown in the following loop nests. The first thread dimension has a trip count of 32. Since we are only allowed a maximum of 512 threads on the 9800GX2, the second thread dimension is limited to 16. The second selected thread dimension has a trip count of 32. To maintain the limit of 512 threads, we stripmine the loop nest by 16 and use the stripmined loop as the second thread dimension. After this, we have exhausted the number of threads. We then proceed to select the block dimensions, which are loops i and j. Both block dimensions have trip counts of 128.

```
__shared__ float C_l[32][32];
__shared__ float A_l[32][32];
__shared__ float B_l[32][32];
__device__ float A[4096][4096];
__device__ float B[4096][4096];
__device__ float C[4096][4096];
doall__block (i = 0; i <= 127; i++) { // blockIdx.x
    doall__block (j = 0; j <= 127; j++) { // blockIdx.y
        doall (k = 0; k <= 1; k++)
            doall__threads (l = 0; l <= 15; l++) // threadIdx.y
                doall__threads (m = 0; m <= 31; m++) // threadIdx.x
                    C_l[16 * k + l][m] = 0;
        reduction__for (k = 0; k <= 127; k++) {
            doall (l = 0; l <= 1; l++)
                doall__threads (m = 0; m <= 15; m++) // threadIdx.y
                    doall__threads (n = 0; n <= 31; n++) // threadIdx.x
                        B_l[16 * l + m][n] = B[32 * k + 16 * l + m][32 * j + n];
            doall (l = 0; l <= 1; l++)
                doall__threads (m = 0; m <= 15; m++) // threadIdx.y
                    doall__threads (n = 0; n <= 31; n++) // threadIdx.x
                        A_l[16 * l + m,n] = A[32 * i + 16 * l + m][32 * k + n];
            doall (l = 0; l <= 1; l++)
                doall__threads (m = 0; m <= 15; m++) // threadIdx.y
                    doall__threads (n = 0; n <= 31; n++) // threadIdx.x
                        reduction__for (o = 0; o <= 31; o++)
                            C_l[16 * l + m][n] += A_l[16 * l + m][o] * B_l[o][n];
        }
        doall (l = 0; l <= 1; l++)
            doall__threads (m = 0; m <= 15; m++) // threadIdx.y
                doall__threads (n = 0; n <= 31; n++) // threadIdx.x
                    C[32 * i + 16 * l + m][32 * j + n] = C_l[16 * l + m][n];
    }
}
```

Specialized Kernel Formation

The above set loop nests is still not in the standard CUDA kernel form. Further embodiments may use the following merging heuristics to transform arbitrary loop nests into the standard form:
  o. Loop dimensions that are assigned to a block or thread are made implicit.
  p. Outer-loop dimensions that surround a block dimension are executed on the host processor, i.e., executed on the CPU outside of the CUDA kernel.
  q. Loop dimensions that are below block dimensions can be sunken into the CUDA kernel and executed sequentially (doing so may require addition synchronizations to be inserted).

In the present running example, the loop dimensions i and j are used as the block dimensions. Since there are no loop dimensions above i in this example, the entire loop nests may be executed in the CUDA kernel, and the host-side code contains only a kernel launch. The reduction loop dimension k can be sunken into the CUDA kernel; doing so requires the introduction of _syncthreads_( ) calls to sequentialize the execution within this loop.

The resulting transformed loop nests are as follows (we use th for thread Idx and bI for blockIdx to reduce clutter in the pseudo code):

```
__shared__ float C__l[32][32];
__shared__ float A__l[32][32];
__shared__ float B__l[32][32];
__device__ float A[4096][4096];
__device__ float B[4096][4096];
__device__ float C[4096][4096];
doall (i = 0; i <= 1; i++)
    C__l[16 * i + th.y][th.x] = 0;
__syncthreads( );
reduction_for (i = 0; i <= 127; i++) {
    doall (j = 0; j <= 1; j++)
        B__l[16 * j + th.y][th.x] = B[32 * i + 16 * j + th.y,32 * bl.y + th.x];
    doall (j = 0; j <= 1; j++)
        A__l[16 * j + th.y][th.x] = A[16 * j + 32 * bl.x + th.y,32 * i + th.x];
    __syncthreads( );
    doall (j = 0; j <= 1; j++)
        reduction_for (k = 0; k <= 31; k++)
            C__l[16 * j + th.y][th.x] += A__l[16 * j + th.y][k] * B__l[k][th.x];
    __syncthreads( );
}
doall (j = 0; j <= 1; j++)
    C[16 * j + 32 * bl.x + th.y][32 * bl.y + th.x] = C__l[16 * j + th.y][th.x];
```

Privatization

It is a further objective of some embodiments to further optimize the memory usage of the above program by recognizing that each thread writes to its own disjoint set of locations in C_l. In some embodiments, the following transformation on references is possible: C_l[16*j+th.y][th.x]→C_l[j] and C_l[16*j+th.y][th.x]→C_l[i]. The resulting loop nests after privatization is as follows. In this example, each thread keeps around 2 running sums for inside the local array C_l.

```
float C__l[2]; // local private memory
__shared__ float A__l[32][32];
__shared__ float B__l[32][32];
__device__ float A[4096][4096];
__device__ float B[4096][4096];
__device__ float C[4096][4096];
doall (i = 0; i <= 1; i++)
    C__l[i] = 0;
__syncthreads( );
reduction_for (i = 0; i <= 127; i++) {
    doall (j = 0; j <= 1; j++)
        B__l[16 * j + th.y][th.x] = B[32 * i + 16 * j + th.y,32 * bl.y + th.x];
    doall (j = 0; j <= 1; j++)
        A__l[16 * j + th.y][th.x] = A[16 * j + 32 * bl.x + th.y,32 * i + th.x];
    __syncthreads( );
    doall (j = 0; j <= 1; j++)
        reduction_for (k = 0; k <= 31; k++)
            C__l[j] += A__l[16 * j + th.y][k] * B__l[k][th.x];
    __syncthreads( );
}
doall (j = 0; j <= 1; j++)
    C[16 * j + 32 * bl.x + th.y][32 * bl.y + th.x] = C__l[j];
```

In one embodiment, the following pseudo-code describes how certain embodiments may implement privatization:

```
Input { List of array references,
        List of processor dimensions,
        List of processor grid sizes}
Aim:  1. Given a list of references, check if they are privatizable,
      i.e., all accesses from one processor is disjoint from all accesses
      from another processor.
      2. For each privatizable reference, compute a privatized
      access function.
```

-continued

```
Step 1: Check if all processor dimensions are present in each of the
        access function.
        If NOT, Mark as NOT PRIVATIZABLE
Step 2: Check if the coefficients of processor dimensions in all the
        access functions are the same.
        If NOT, Mark as NOT PRIVATIZABLE
Step 3: Check if the non-processor coefficients are a multiple of the
        processor grid sizes.
        If NOT, Mark as NOT PRIVATIZABLE
Step 4: Mark as PRIVATIZABLE
Step 5: Find privatized access function
        for each array access function in the list
            for each processor dimension
                for each data dimension of the array access
                    1. zero out the co-efficient of processor dimension
                    2. divide other coefficients by processor grid size
                end for
            end for
        end for
```

Fine Grained Scheduling of Communications

It is another object to optimize a third weighted parametric function of parallelism, locality and contiguity of the operations in the program after explicit memory copy operations have been inserted by some embodiments between memory locations in a primary memory and memory locations in a secondary memory. Generally, various embodiments may fix schedule coefficients to enforce invariance of parallelism, locality and contiguity of memory references across the plurality of selective tradeoffs as described above. Embodiments then may compute dependences between communication and computation statements using techniques well-known by engineers knowledgeable in the field. A selective tradeoff is further derived and optimized which comprises communication and computation statements. Costs are determined as described above. As an illustration, embodiments may produce the following pseudo-program before the third weighted parametric function is optimized. In this pseudo-program, pr stands for private memory, C_I

```
float C__l[16][2]; // local private memory
__shared__ float A__l[16][16];
float B__l[16][2]; // local private memory
__device__ float A[1024][1024];
__device__ float B[1024][1024];
__device__ float C[1024][1024];
doall (i = 0; i <= 15; i++) {
    doall (j = 0; j <= 1; j++) {
        C__l[i,j] = 0.0f;
    }
}
for (i = 0; i <= 63; i++) {
    if (th.x <= 15) {
        doall (j = 0; j <= 15; j++) {
            A__l[j,th.x] = A[j + 16 * bl.x, 16 * i + th.x];
            doall (k = 0; k <= 1; k++) {
                B__l[j,k] = B[16 * i + j,64 * k + 128 * bl.y + th.x];
            }
        }
    }
    if (th.x >= 16) {
        doall (j = 0; j <= 15; j++) {
            doall (k = 0; k <= 1; k++) {
                B__l[j,k] = B[16 * i + j,64 * k + 128 * bl.y + th.x];
            }
        }
    }
    doall (j = 0; j <= 15; j++) {
        doall (k = 0; k <= 1; k++) {
            reduction_for (l = 0; l <= 15; l++) {
                C__l[j,k] += A__l[j,l] * B__l[l,k];
            }
        }
    }
}
```

```
            }
        }
    }
    doall (i = 0; i <= 15; i++) {
        doall (j = 0; j <= 1; j++) {
            C[i + 16 * bl.x,64 * j + 128 * bl.y + th.x] = C__l[i,j]
        }
    }
```

Optimizing the third weighted function may completely modify the schedule of the computations and the interleaving of communications. In the following example, communications between the primary memory for B and the non-primary (secondary or third) memory are interleaved with computations:

```
float C__l[16][2]; // local private memory
__sharedfloat A__l[16][16];
float B__l[16][2]; // local private memory
__device__ float A[1024][1024];
__device__ float B[1024][1024];
__device__ float C[1024][1024];
doall (i = 0; i <= 15; i++) {
    doall (j = 0; j <= 1; j++) {
        C__l[i,j] = 0.0f;
    }
}
for (i = 0; i <= 63; i++) {
    if (th.x <= 15) {
        doall (j = 0; j <= 15; j++) {
            A__l[j,th.x] = A[j + 16 * bl.x,16 * i + th.x];
        }
```

```
        }
    }
    doall (j = 0; j <= 1; j++) {
        doall (k = 0; k <= 15; k++) {
            B__l[k,j] = B[16 * i + k,64 * j + 128 * bl.x];
        }
        doall (k = 0; k <= 15; k++) {
            reduction_for (l = 0; l <= 14; l += 2) {
                C__l[k,j] += A__l[k,l] * B__l[l,j];
                C__l[k,j] += A__l[k,l + 1] * B__l[l + 1,j];
            }
        }
    }
}
doall (i = 0; i <= 15; i++) {
    doall (j = 0; j <= 1; j++) {
        C[i + 16 * bl.x,64 * j + 128 * bl.y + th.x] = C__l[i,j];
    }
}
```

It is a further object of provided embodiments to explore different costs that produce different weighted tradeoffs and result in different optimized programs.
Insertion of Synchronizations.

It is a further object of various embodiments to automatically insert synchronizations between a plurality of execution units. It is another object to minimize a weighted function of the cost of the synchronization depending for instance on the number of synchronizations, their nesting depth and the number of threads synchronized. In one embodiment, synchronizations are inserted as follows, where >lex, =lex and <lex denote lexicographic ordering:

```
Input {   List of array references,
          List of processor dimensions,
          List of privatized references}
Aim:      1. Given a pair of references, compute dependences.
          2. For each dependence, insert a synchronization.
          3. Superimpose synchronizations to minimize the overall synchronization cost
Step 1:   Compute dependences
          for each pair of references (R1,R2) accessing the same array A in the list,
if array A is not marked PRIVATIZED
if R1 and R2 access the same location of A at depth d by different execution units
add a synchronization at depth at least d between statements (S, T) referencing (R1,R2).
attach the type of dependence (loop independent OR loop carried)
attach the minimum dependence distance (min__dist)
Step 2:   Construct an optimization problem to place synchronizations
          for each synchronization Sync of depth d between statements S and T
              add the constraint beta(Sync) =lex beta(S1) up to depth d
              add the constraint beta(Sync) =lex beta(S2) up to depth d
              if dependence is loop independent
                  add the constraint beta(S) <lex beta(Sync) < lex beta(T) after depth d
              if dependence is loop carried
                  if beta(S) >lex beta(T) and min__dist is equal to 1
                      add the constraint
beta(S) < lex beta(Sync) OR beta(Sync) < lex beta(T)
after depth d
Step 3:   Construct an optimization function whose optimization determines the placement of
synchronizations.
          for each synchronization Sync
              for each statement Stm in {S, T} related to Sync
                  for each depth d
                      insert a Boolean decision variable beta__eq(Sync, Stm, d) such
that
                          beta__eq(Sync, Stm, d) == 1 iff beta(Sync)[d] ==
beta(Stm)[d]
              for each synchronization Sync1
                  for each synchronization Sync2
                      insert an integer variable q such that
                          for each depth d
                              q > beta(Sync1)[d] – beta(Sync2)[d] and
                              q > beta(Sync2)[d] – beta(Sync1)[d]
          create cost function F by associating proper costs to variables, for instance:
              F = Sum(10^d*(1-beta__eq[d])) + Sum (2^d*(q[d]))
```

```
Step 4:   Solve optimization problem by minimizing the cost function
Step 5:   Insert synchronizations into program
             for each synchronization Sync1
                 for each synchronization Sync2 different from Sync1
                     if beta(Sync1) =lex beta(Sync2)
merge Sync2 into Sync1
for each remaining synchronization
             create a new synchronization operation at the proper beta
             attach the domain formed by the convex union of the domains of the attached
statements
```

Embodiments allow the generation of multiple program version with different synchronization properties depending on the associated cost model.

Consider the following pseudoprogram before synchronizations have been inserted:

```
__shared__ float A__l[16][16];
float C__l[16][2];
float B__l[16][2];
__device__ float A[*][1024];
__device__ float B[*][1024];
__device__ float C[*][1024];
doall (i = 0; i <= 15; i++) {
    doall (j = 0; j <= 1; j++) {
        S0(pr__>C__l[i,j]);
    }
}
reduction__for (i = 0; i <= 63; i++) {
    if (th.x <= 15) {
        doall (j = 0; j <= 15; j++) {
            S2(>A__l[j,th.x],<A[j + 16 * bl.x,16 * i + th.x]);
            doall (k = 0; k <= 1; k++) {
                S3(pr__>B__l[j,k],<B[16 * i + j,64 * k + 128 * bl.y + th.x]);
            }
        }
    }
    if (th.x >= 16) {
        doall (j = 0; j <= 15; j++) {
            doall (k = 0; k <= 1; k++) {
                S3(pr__>B__l[j,k],<B[16 * i + j,64 * k + 128 * bl.y + th.x]);
            }
        }
    }
    doall (j = 0; j <= 15; j++) {
        doall (k = 0; k <= 1; k++) {
            reduction__for (l = 0; l <= 15; l++) {
                S1(pr__<>C__l[j,k],<A__l[j,l],pr__<B__l[l,k]);
            }
        }
    }
}
doall (i = 0; i <= 15; i++) {
    doall (j = 0; j <= 1; j++) {
        S4(>C[i + 16 * bl.x,64 * j + 128 * bl.y + th.x],pr__<C__l[i,j]);
    }
}
```

Without synchronization optimization, the output could resemble:

```
__shared__ float A__l[16][16];
float C__l[16][2];
float B__l[16][2];
__device__ float A[*][1024];
__device__ float B[*][1024];
__device__ float C[*][1024];
doall (i = 0; i <= 15; i++) {
    doall (j = 0; j <= 1; j++) {
        S0(pr__>C__l[i,j]);
    }
}
__syncthread( );
reduction__for (i = 0; j <= 63; i++) {
    if (th.x <= 15) {
        doall (j = 0; j <= 15; j++) {
            S2(>A__l[j,th.x],<A[j + 16 * bl.x,16 * i + th.x]);
            __syncthread( );
            doall (k = 0; k <= 1; k++) {
                S3(pr__>B__l[j,k],<B[16 * i + j,64 * k + 128 * bl.y + th.x]);
            }
            __syncthread( );
        }
    }
    if (th.x >= 16) {
        doall (j = 0; j <= 15; j++) {
            __syncthread( );
            doall (k = 0; k <= 1; k++) {
                S3(pr__>B__l[j,k],<B[16 * i + j,64 * k + 128 * bl.y + th.x]);
            }
            __syncthread( );
        }
    }
    doall (j = 0; j <= 15; j++) {
        doall (k = 0; k <= 1; k++) {
            reduction__for (l = 0; l <= 15; l++) {
                S1(pr__<>C__l[j,k],<A__l[j,l],pr__<B__l[l,k]);
            }
        }
    }
    __syncthread( );
}
doall (i = 0; i <= 15; i++) {
    doall (j = 0; j <= 1; j++) {
        S4(>C[i + 16 * bl.x,64 * j + 128 * bl.y + th.x],pr__<C__l[i,j]);
    }
}
__syncthread( );
```

One possible result of applying various embodiments results in a pseudoprogram with fewer synchronizations. Intuitively, multiple synchronizations have been superimposed by provided methods and collapse in a single __syncthread operation.

```
__shared__ float A__l[16][16];
float C__l[16][2];
float B__l[16][2];
__device__ float A[*][1024];
__device__ float B[*][1024];
__device__ float C[*][1024];
doall (i = 0; i <= 15; i++) {
    doall (j = 0; j <= 1; j++) {
        S0(pr__>C__l[i,j]);
    }
}
for (i = 0; i <= 63; i++) {
    if (th.x <= 15) {
        doall (j = 0; j <= 15; j++) {
            S2(>A__l[j,th.x],<A[j + 16 * bl.x,16 * i + th.x]);
            doall (k = 0; k <= 1; k++) {
                S3(pr__>B__l[j,k],<B[16 * i + j,64 * k + 128 * bl.y + th.x]);
            }
        }
    }
```

-continued

```
}
if (th.x >= 16) {
    doall (j = 0; j <= 15; j++) {
        doall (k = 0; k <= 1; k++) {
            S3(pr__>B__l[j,k],<B[16 * i + j,64 * k + 128 * bl.y + th.x]);
        }
    }
}
__syncthread( );
doall (j = 0; j <= 15; j++) {
    doall (k = 0; k <= 1; k++) {
        reduction_for (l = 0; l <= 15; l++) {
            S1(pr__<>C__l[j,k],<A__l[j,l],pr__<B__l[l,k]);
        }
    }
}
__syncthread( );
}
doall (i = 0; i <= 15; i++) {
    doall (j = 0; j <= 1; j++) {
        S4(>C[i + 16 * bl.x,64 * j + 128 * bl.y + th.x],pr__<C__l[i,j]);
    }
}
```

Unroll and Jam

In a further provided embodiment a complementary unroll-and-jam transformation is applied. Unroll-and-jam is common knowledge for an engineer knowledgeable in the art. In one embodiment it is implemented as a simple stripmining transformation of a doall loop followed by an interchange to sink the loop at the innermost level. A late unrolling duplicates the code and results in the following code:

```
float C__l[2];
__shared__float A__l[32][32];
__shared__float B__l[32][32];
__device__float A[4096][4096];
__device__float B[4096][4096];
__device__float C[4096][4096];
C__l[0] = 0;
C__l[1] = 0;
__syncthreads( );
reduction_for (i = 0; i <= 127; i++) {
    B__l[th.y][th.x] = B[32 * i + th.y][32 * bl.y + th.x];
    B__l[16 + th.y][th.x] = B[16 + 32 * i + th.y][32 * bl.y + th.x];
    A__l[th.y][th.x] = A[16 + 32 * bl.x + th.y][32 * i + th.x];
    A__l[16 + th.y][th.x] = A[16 + 32 * bl.x + th.y][32 * i + th.x];
    __syncthreads( );
    reduction_for (k = 0; k <= 31; k++) {
        C__l[0] += A__l[th.y][k] * B__l[k][th.x];
        C__l[1] += A__l[16 + th.y][k] * B__l[k][th.x];
    }
    __syncthreads( );
}
C[32 * bl.x + th.y][32 * bl.y + th.x] = C__l[0];
C[16 + 32 * bl.x + th.y][32 * bl.y + th.x] = C__l[1];
```

In some embodiments, unroll-and-jam on the outermost block dimensions, has the effect to further improve the reuse within the innermost kernels by keeping more than 2 running sums in the local array C_I. However, since unrolling the outer dimensions increases the sizes of A_I and/or B_I, there is a need to limit the unrolling factor to avoid running out of secondary memory limits. In further embodiments, we try successive unroll-and-jam factors of 2, 4, 8 and further powers of 2 until we run out of secondary memory. We keep the highest such admissible factor.

The CUDA kernel output in some embodiments is very similar to the pseudo-code above. Two additional and trivial adjustments are made to the output code:

r. The kernel launch call _kernel_PE<<<. . . >>> with the proper block and thread dimensions are inserted into the host-side of the code.

s. #pragma unroll are inserted into the CUDA kernel to further enable unrolling by the NVIDIA nvcc compiler.

```
void kernel( ) {
    __kernel_PE<<<dim3(128, 128), dim3(32, 16)>>>( );
}
static void __global____kernel_PE(void) {
    float C__l[2];
    float __shared__A__l[32][32];
    float __shared__B__l[32][32];
    int i;
    C__l[0] = 0.0f;
    C__l[1] = 0.0f;
    __syncthreads( );
    #pragma unroll
    for (i = 0; i <= 127; i++) {
        int j;
        B__l[threadIdx.y][threadIdx.x] = B_1[32 * i + threadIdx.y][32 * blockIdx.y + threadIdx.x];
        A__l[threadIdx.y][threadIdx.x] = A_1[32 * blockIdx.x + threadIdx.y][32 * i + threadIdx.x];
        B__l[16 + threadIdx.y][threadIdx.x] = B_1[16 + (32 * i + threadIdx.y)][32 * blockIdx.y + threadIdx.x];
        A__l[16 + threadIdx.y][threadIdx.x] = A_1[16 + (32 * blockIdx.x + threadIdx.y)][32 * i + threadIdx.x];
        __syncthreads( );
        #pragma unroll
        for (j = 0; j <= 31; j++) {
            C__l[0] = C__l[0]+ A__l[threadIdx.y][j] * B__l[j][threadIdx.x];
            C__l[1] = C__l[1]+ A__l[16 + threadIdx.y][j] * B__l[j][threadIdx.x];
        }
        __syncthreads( );
    }
    C_1[32 * blockIdx.x + threadIdx.y][32 * blockIdx.y + threadIdx.x] = C__l[0];
    C_1[16 + (32 * blockIdx.x + threadIdx.y)][32 * blockIdx.y + threadIdx.x] = C__l[1];
}
```

Thus, it is seen that methods and an apparatus for optimizing source code on a custom first computing apparatus for execution on a second computing apparatus are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of optimizing the execution of a program on a multi-execution unit computing apparatus, the method comprising:
receiving a computer program in a memory on a first computing apparatus, the first computing apparatus comprising the memory, a storage medium and at least one processor, the at least one processor containing at least one multi-stage execution unit, the computer program comprising at least one arbitrary loop nest; and optimizing the computer program for execution on a second computing apparatus, the second computing apparatus comprising at least two execution units, the optimization further comprising:

optimizing a selective tradeoff of the cost of parallelism, locality and contiguity of arbitrary memory accesses, using a cost function based on, at least in part, each of: (i) a benefit of executing a loop in parallel, relative to executing the loop sequentially, (ii) a benefit of fusing a pair of loops to improve locality, relative to distributing loops of pair, and (iii) a benefit of accessing a memory reference with contiguous memory accesses, relative to accessing the memory reference with non-contiguous memory access, to orchestrate the computations; and producing an optimized computer program for execution on the second computing apparatus.

2. The method of claim 1, wherein the at least two execution units on the second computing apparatus are a plurality of execution units, the method further comprising generating conditional synchronizations between the plurality of execution units.

3. The method of claim 1, wherein a scheduling function is used to orchestrate the operations in the optimized program; the scheduling function assigning a partial execution order between the operations of the optimized program.

4. The method of claim 1, further comprising:

assigning a first cost to at least one loop of the at least one arbitrary loop nest, in the program, the first cost related to a difference in execution speed between sequential operations of the at least one loop on a single execution unit in the second computing apparatus and parallel operations of the at least one loop on more than one of the at least two execution units in the second computing apparatus;

assigning a second cost to at least one pair of loops, the at least one pair of loops contained within the at least one arbitrary loop nest, the second cost related to a difference in execution speed between operations where the pair of loops are executed together on the second computing apparatus, and where the pair of loops are not executed together on the second computing apparatus; and assigning a third cost to at least one arbitrary memory reference, the at least one arbitrary memory reference contained within the at least one arbitrary loop nest, the third cost related to a difference in execution speed between operations where the memory is accessed contiguously on the second computing apparatus, and where the memory is not accessed contiguously on the second computing apparatus.

5. The method of claim 4, further comprising:

assigning each loop within the at least one arbitrary loop nest a decision variable that specifies if the loop is executed in parallel in the optimized program;

assigning each pair of loops within the at least one arbitrary loop nest a decision variable that specifies if the loops are executed together in the optimized program; and assigning each memory reference within the at least one arbitrary loop nest a decision variable that specifies if memory is accessed contiguously in the optimized program.

6. The method of claim 4, further comprising determining at least one of the costs through static evaluation of a model of the execution cost of the instructions in the program.

7. The method of claim 4, further comprising determining at least one of the costs through the cost of a dynamic execution on the second computing apparatus of at least a set of instructions representative of code in the program.

8. The method of claim 4, further comprising determining at least one of the costs through an iterative refining process consisting of at least one static evaluation of a model of the execution cost and at least one dynamic execution on the second computing apparatus of at least a set of instructions representative of code in the program.

9. The method of claim 1, wherein the second computing apparatus comprises a plurality of execution units and memories, the method further comprising:

representing the architecture, of the second computing apparatus, as a hierarchy of execution units and memories; a level of the hierarchy consisting of a primary execution unit, a plurality of secondary execution units, a primary memory and a plurality of secondary memories;

optimizing a plurality of selective tradeoffs using a plurality of costs; the tradeoffs determining a plurality of schedules; a schedule determining the orchestration of operations on a level of hierarchy of execution units and memories of the second computing apparatus;

generating conditional memory transfers between primary and secondary memories; and generating conditional synchronizations between a plurality of execution units.

10. The method of claim 9, wherein at least one scheduling coefficient of the at least one loop is fixed to enforce invariance of parallelism, locality and contiguity of memory references across a plurality of selective tradeoffs.

11. The method of claim 9, further comprising determining a first scheduling function orchestrating the operations as coarse-grained tasks of parallel execution.

12. The method of claim 11, further comprising determining a second scheduling function orchestrating the operations in the program into fine grained parallel execution with optimized contiguous accesses to the primary memory.

13. The method of claim 12, wherein accesses to non-contiguous primary memory locations are promoted in a new location in a secondary memory, shared by multiple execution units.

14. The method of claim 13, further comprising applying unimodular reindexing to at least one promoted memory reference to optimize the amount of storage needed in the secondary memory.

15. The method of claim 13, further comprising inserting copy instructions into the program, the copy operations to transfer data between primary and secondary memories.

16. The method of claim 15, wherein one of the inserted copy instructions comprises an instruction involving sequential access to contiguous memory locations.

17. The method of claim 15, wherein the inserted copy instructions comprises an instruction involving memory access aligned modulo on an architecture specific factor.

18. The method of claim 15, further comprising determining a third scheduling function orchestrating the operations in the program and the explicit copy instructions, wherein the third scheduling function interleaves the copy instructions with instructions in the program.

19. The method of claim 18, wherein said third scheduling function optimizes contiguity of memory references along an arbitrary array dimension.

20. The method of claim 19, further comprising applying a unimodular reindexing function to at least one of the memory references to further optimize the contiguity of the memory accesses along the innermost array dimension.

21. The method of claim 1, wherein the second computing apparatus is a massively multi-threaded multi-execution unit heterogeneous computing apparatus, the method further comprising:
    optimizing a first global weighted parametric tradeoff of parallelism, locality and memory access contiguity costs of the operations in the program;
    optimizing a second weighted parametric tradeoff of parallelism, locality and memory access contiguity costs of the operations in the program;
    promoting references accessing memory locations of a primary memory into a secondary memory shared by multiple execution units;
    generating optimized data transfer operations between primary and secondary memories;
    optimizing a third weighted parametric function of parallelism, locality and memory access contiguity costs of the data transfer operations and the operations in the program;
    optimizing the computer program for execution on a second computing apparatus, the second computing apparatus comprising at least two physical execution units, each physical execution unit executing at least two virtual threads of execution, the optimization further comprising allocating computations to virtual threads of execution and generating synchronizations for execution on the at least two physical execution units; and
    producing an optimized computer program for execution on the second computing apparatus.

22. The method of claim 21, further comprising:
    performing an evaluation of a cost of contiguous memory accesses;
    performing an evaluation of a cost of synchronizations between dependent operations;
    selecting a number of virtual execution threads in a range comprised between the number of physical execution units and the maximal number of virtual threads of execution; and
    selecting at least one parallel dimension to be executed by virtual threads of execution.

23. The method of claim 21, further comprising:
    performing a stripmine transformation on the selected parallel dimension; inserting a global parameter representing the virtual thread of execution; and
    adding a constraint to equate the value of the stripmined parallel dimension and said global parameter.

24. The method of claim 21, further comprising inserting conditional synchronizations between dependent operations.

25. The method of claim 21, further comprising minimizing a weighted function of the synchronization costs.

26. The method of claim 21, further comprising promoting at least one memory reference into a third memory, said third memory being private to only one virtual thread of execution.

27. The method of claim 21, further comprising performing unroll-and-jam on at least one parallel dimension, the at least one parallel dimension not involved in an equality with said at least one parallel dimension to be executed by virtual threads of execution.

28. A custom computing apparatus comprising:
    at least one multi-stage processor;
    at least one memory coupled to the at least one multi-stage processor; and
    a storage medium coupled to the at least one memory, the storage medium comprising a set of processor executable instructions sufficient that, when executed by at least one of the multi-stage processors configure the computing apparatus to optimize program code for execution, the configuration comprising a configuration to:
    receive a computer program in a memory on a first computing apparatus, the first computing apparatus comprising the memory, a storage medium and at least one processor, the at least one processor containing at least one multi-stage execution unit, the computer program comprising at least one arbitrary loop nest; and
    optimize the computer program for execution on a second computing apparatus, the second computing apparatus comprising at least two execution units, the configuration to optimize further comprising a configuration to:
        optimize a selective tradeoff of the cost of parallelism, locality and contiguity of arbitrary memory accesses, using a cost function based on, at least in part, each of: (i) a benefit of executing a loop in parallel, relative to executing the loop sequentially, (ii) a benefit of fusing a pair of loops to improve locality, relative to distributing loops of pair, and (iii) a benefit of accessing a memory reference with contiguous memory accesses, relative to accessing the memory reference with non-contiguous memory access, to orchestrate the computations; and
        produce an optimized computer program for execution on the second computing apparatus.

29. The custom computing apparatus of claim 28, wherein the at least two execution units on the second computing apparatus are a plurality of execution units, the configuration further comprising a configuration to generate conditional synchronizations between the plurality of execution units.

30. The custom computing apparatus of claim 28, wherein a scheduling function is used to orchestrate the operations in the optimized program; the scheduling function assigning a partial execution order between the operations of the optimized program.

31. The custom computing apparatus of claim 28, wherein the configuration further comprises a configuration to:
    assign a first cost to at least one loop of the at least one arbitrary loop nest, in the program, the first cost related to a difference in execution speed between sequential operations of the at least one loop on a single execution unit in the second computing apparatus and parallel operations of the at least one loop on more than one of the at least two execution units in the second computing apparatus;
    assign a second cost to at least one pair of loops, the at least one pair of loops contained within the at least one arbitrary loop nest, the second cost related to a difference in execution speed between operations where the pair of loops are executed together on the second computing apparatus, and where the pair of loops are not executed together on the second computing apparatus; and
    assign a third cost to at least one arbitrary memory reference, the at least one arbitrary memory reference contained within the at least one arbitrary loop nest, the third cost related to a difference in execution speed between operations where the memory is accessed contiguously on the second computing apparatus, and where the memory is not accessed contiguously on the second computing apparatus.

32. The custom computing apparatus of claim 31, wherein the configuration further comprises a configuration to:

assign each loop within the at least one arbitrary loop nest a decision variable that specifies if the loop is executed in parallel in the optimized program;

assign each pair of loops within the at least one arbitrary loop nest a decision variable that specifies if the loops are executed together in the optimized program; and assign each memory reference within the at least one arbitrary loop nest a decision variable that specifies if memory is accessed contiguously in the optimized program.

33. The custom computing apparatus of claim 31, wherein the configuration further comprises a configuration to determine at least one of the costs through static evaluation of a model of the execution cost of the instructions in the program.

34. The custom computing apparatus of claim 31, wherein the configuration further comprises a configuration to determine at least one of the costs through the cost of a dynamic execution on the second computing apparatus of at least a set of instructions representative of code in the program.

35. The custom computing apparatus of claim 31, wherein the configuration further comprises a configuration to determine at least one of the costs through an iterative refining process consisting of at least one static evaluation of a model of the execution cost and at least one dynamic execution on the second computing apparatus of at least a set of instructions representative of code in the program.

36. The custom computing apparatus of claim 28, wherein the second computing apparatus comprises a plurality of execution units and memories, the configuration further comprising a configuration to:

represent the architecture, of the second computing apparatus, as a hierarchy of execution units and memories; a level of the hierarchy consisting of a primary execution unit, a plurality of secondary execution units, a primary memory and a plurality of secondary memories;

optimize a plurality of selective tradeoffs using a plurality of costs; the tradeoffs determining a plurality of schedules; a schedule determining the orchestration of operations on a level of hierarchy of execution units and memories of the second computing apparatus;

generate conditional memory transfers between primary and secondary memories; and generate conditional synchronizations between a plurality of execution units.

37. The custom computing apparatus of claim 36, wherein at least one scheduling coefficient of the at least one loop is fixed to enforce invariance of parallelism, locality and contiguity of memory references across a plurality of selective tradeoffs.

38. The custom computing apparatus of claim 36, wherein the configuration further comprises a configuration to determine a first scheduling function orchestrating the operations as coarse-grained tasks of parallel execution.

39. The custom computing apparatus of claim 36, wherein the configuration further comprises a configuration to determine a second scheduling function orchestrating the operations in the program into fine grained parallel execution with optimized contiguous accesses to the primary memory.

40. The custom computing apparatus of claim 39, wherein accesses to non-contiguous primary memory locations are promoted in a new location in a secondary memory, shared by multiple execution units.

41. The custom computing apparatus of claim 40, wherein the configuration further comprises a configuration to apply unimodular reindexing to at least one promoted memory reference to optimize the amount of storage needed in the secondary memory.

42. The custom computing apparatus of claim 40, wherein the configuration further comprises a configuration to insert copy instructions into the program, the copy operations to transfer data between primary and secondary memories.

43. The custom computing apparatus of claim 42, wherein one of the inserted copy instructions comprises an instruction involving sequential access to contiguous memory locations.

44. The custom computing apparatus of claim 42, wherein the inserted copy instructions comprises an instruction involving memory access aligned modulo on an architecture specific factor.

45. The custom computing apparatus of claim 42, wherein the configuration further comprises a configuration to determine a third scheduling function orchestrating the operations in the program and the explicit copy instructions, wherein the third scheduling function interleaves the copy instructions with instructions in the program.

46. The custom computing apparatus of claim 45, wherein said third scheduling function optimizes contiguity of memory references along an arbitrary array dimension.

47. The custom computing apparatus of claim 46, wherein the configuration further comprises a configuration to apply a unimodular reindexing function to at least one of the memory references to further optimize the contiguity of the memory accesses along the innermost array dimension.

48. The custom computing apparatus of claim 28, wherein the second computing apparatus is a massively multi-threaded multi-execution unit heterogeneous computing apparatus, the configuration further comprising a configuration to:

optimize a first global weighted parametric tradeoff of parallelism, locality and memory access contiguity costs of the operations in the program;

optimize a second weighted parametric tradeoff of parallelism, locality and memory access contiguity costs of the operations in the program;

promote references accessing memory locations of a primary memory into a secondary memory shared by multiple execution units;

generate optimized data transfer operations between primary and secondary memories;

optimize a third weighted parametric function of parallelism, locality and memory access contiguity costs of the data transfer operations and the operations in the program;

optimize the computer program for execution on a second computing apparatus, the second computing apparatus comprising at least two physical execution units, each physical execution unit executing at least two virtual threads of execution, the optimization further comprising allocating computations to virtual threads of execution and generating synchronizations for execution on the at least two physical execution units; and produce an optimized computer program for execution on the second computing apparatus.

49. The custom computing apparatus of claim 48, wherein the configuration further comprises a configuration to:

perform an evaluation of a cost of contiguous memory accesses;

perform an evaluation of a cost of synchronizations between dependent operations;

select a number of virtual execution threads in a range comprised between the number of physical execution units and the maximal number of virtual threads of execution; and select at least one parallel dimension to be executed by virtual threads of execution.

50. The custom computing apparatus of claim 48, wherein the configuration further comprises a configuration to:

perform a stripmine transformation on the selected parallel dimension;

insert a global parameter representing the virtual thread of execution; and add a constraint to equate the value of the stripmined parallel dimension and said global parameter.

51. The custom computing apparatus of claim 48, wherein the configuration further comprises a configuration to insert conditional synchronizations between dependent operations.

52. The custom computing apparatus of claim 48, wherein the configuration further comprises a configuration to minimize a weighted function of the synchronization costs.

53. The custom computing apparatus of claim 48, wherein the configuration further comprises a configuration to promote at least one memory reference into a third memory, the third memory being private to only one virtual thread of execution.

54. The custom computing apparatus of claim 48, wherein the configuration further comprises a configuration to perform unroll-and-jam on at least one parallel dimension, the at least one parallel dimension not involved in an equality with said at least one parallel dimension to be executed by virtual threads of execution.

* * * * *